(12) United States Patent
Maeda et al.

(10) Patent No.: US 12,272,185 B2
(45) Date of Patent: Apr. 8, 2025

(54) VEHICLE DIAGNOSTIC DEVICE, VEHICLE DIAGNOSTIC SYSTEM, AND MOBILE BODY DIAGNOSTIC DEVICE

(71) Applicant: Panasonic Intellectual Property Management Co., Ltd., Osaka (JP)

(72) Inventors: Hikaru Maeda, Osaka (JP); Daisuke Yamahara, Osaka (JP); Koichi Mitsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 302 days.

(21) Appl. No.: 17/776,099

(22) PCT Filed: Nov. 17, 2020

(86) PCT No.: PCT/JP2020/042863
§ 371 (c)(1),
(2) Date: May 11, 2022

(87) PCT Pub. No.: WO2021/100720
PCT Pub. Date: May 27, 2021

(65) Prior Publication Data
US 2022/0383671 A1  Dec. 1, 2022

(30) Foreign Application Priority Data
Nov. 20, 2019  (JP) .................................. 2019-209705

(51) Int. Cl.
*G06F 21/56* (2013.01)
*G06F 21/52* (2013.01)
(Continued)

(52) U.S. Cl.
CPC .......... *G07C 5/0808* (2013.01); *G06F 21/52* (2013.01); *G06F 21/55* (2013.01); *G06F 21/57* (2013.01);
(Continued)

(58) Field of Classification Search
CPC .... G07C 5/0808; G07C 5/008; B64C 39/024; G06F 21/52; G06F 21/55; G06F 21/57;
(Continued)

(56) References Cited

U.S. PATENT DOCUMENTS

2014/0012435 A1  1/2014  Sugihara
2015/0336270 A1  11/2015  Storr
(Continued)

FOREIGN PATENT DOCUMENTS

JP  2005-242754 A  9/2005
JP  2006-244141 A  9/2006
(Continued)

OTHER PUBLICATIONS

International Search Report dated Dec. 28, 2020 issued in International Patent Application No. PCT/JP2020/042863, with English translation.

*Primary Examiner* — Amie C. Lin
(74) *Attorney, Agent, or Firm* — Rimon P.C.

(57) ABSTRACT

A vehicle diagnostic device includes: a communication unit that communicates with a vehicle which drives autonomously; and a diagnostic unit that performs, via the communication unit, diagnosis as to whether the vehicle is being hacked. The diagnostic unit performs the diagnosis by checking resilience of software which runs a travel system provided in the vehicle.

15 Claims, 32 Drawing Sheets

(51) Int. Cl.
  *G06F 21/55* (2013.01)
  *G06F 21/57* (2013.01)
  *G07C 5/00* (2006.01)
  *G07C 5/08* (2006.01)
  *B64U 101/26* (2023.01)
(52) U.S. Cl.
  CPC .......... *G07C 5/008* (2013.01); *B64U 2101/26* (2023.01)
(58) Field of Classification Search
  CPC ............. G06F 2221/034; G06F 21/567; B64U 2101/00; B64U 2101/26; B64D 2045/0085; B60W 50/04; B64F 1/00; B64F 5/60
  See application file for complete search history.

(56) References Cited

U.S. PATENT DOCUMENTS

| | | | | |
|---|---|---|---|---|
| 2016/0072730 A1* | 3/2016 | Jubran | .................. | H04L 47/822 709/224 |
| 2017/0023945 A1* | 1/2017 | Cavalcanti | ............... | G08G 1/04 |
| 2017/0272450 A1* | 9/2017 | Krishnamurthi | ........ | G06F 21/35 |
| 2017/0325318 A1 | 11/2017 | Wendt et al. | | |
| 2018/0295147 A1 | 10/2018 | Haga et al. | | |
| 2018/0307834 A1* | 10/2018 | Xue | ...................... | G06F 21/554 |
| 2019/0220596 A1* | 7/2019 | Lie | .......................... | G06F 18/24 |
| 2019/0260768 A1* | 8/2019 | Mestha | ............... | H04L 63/1416 |
| 2019/0347410 A1* | 11/2019 | Kesarwani | ............ | G06F 16/903 |
| 2020/0396247 A1* | 12/2020 | Soryal | ..................... | G08B 1/08 |
| 2021/0097315 A1* | 4/2021 | Carruthers | ....... | G08B 13/19645 |

FOREIGN PATENT DOCUMENTS

| | | |
|---|---|---|
| JP | 5853205 B2 | 12/2015 |
| JP | 2016-506094 A | 2/2016 |
| JP | 2017-532747 A | 11/2017 |
| JP | 2018-190465 A | 11/2018 |
| JP | 2019-035261 A | 3/2019 |
| JP | 2019-75047 A | 5/2019 |
| JP | 2019-102023 A | 6/2019 |
| WO | 2014/071465 A1 | 5/2014 |
| WO | 2016/066556 A1 | 5/2016 |

* cited by examiner

FIG. 3A

| Questions about vehicle ||
|---|---|
| Questions that are uniquely answered | Questions that are not uniquely answered |
| ·Number of occupants<br>·Destination<br>·Seat position<br>·Temperature difference between inside and outside of vehicle<br>·Presence or absence of braking operation | ·Feeling or mood of owner<br>·Criterion for determining travel route<br>·Level of satisfaction<br>·Level of happiness<br>·Weather conditions |

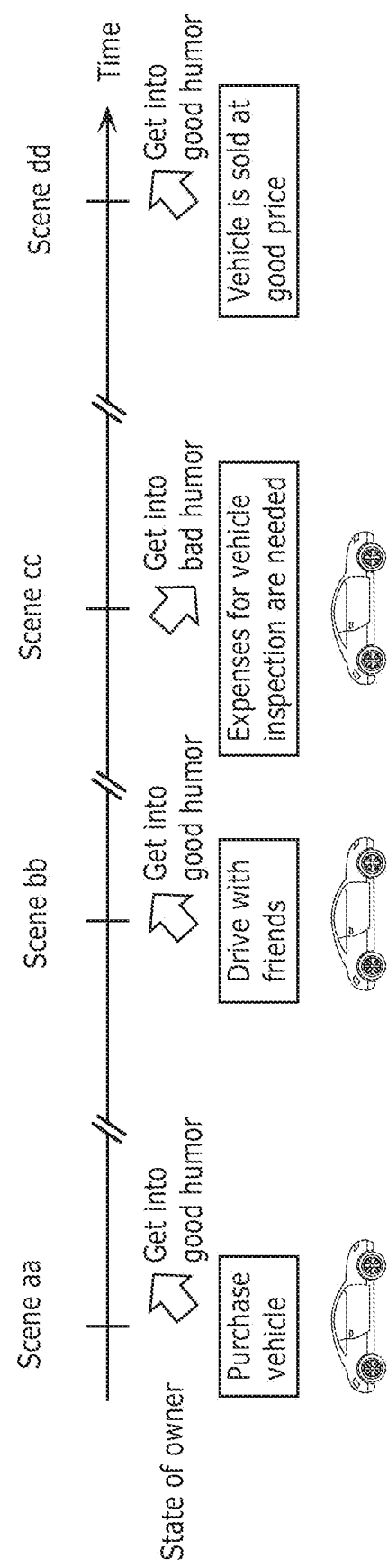

FIG. 4

| Software resilience checking action | | |
|---|---|---|
| DoS attack | Buffer overflow attack | Transmission of trap data |
| Transmit massive amount of data or requests to software of vehicle | Transmit unallowable amount of data to microprocessor of vehicle | Set trap for checking unauthorized access or unauthorized intrusion |

FIG. 5

| Operation log | | | |
|---|---|---|---|
| Date and time | Location | Speed | Steering wheel angle |
| MM/dd/ hh:mm | Latitude and longitude | X km/sec. | X degrees |
| ... | ... | ... | ... |
| | | | |

FIG. 14

| Timing | | Lighting state |
|---|---|---|
| Start of diagnosis (turn on switch) | | Fully turned on |
| During diagnosis (during communication) | | Blink |
| Diagnosis result | Not being hacked | Emit light of blue color |
| | Being hacked | Emit light of red color |

FIG. 18
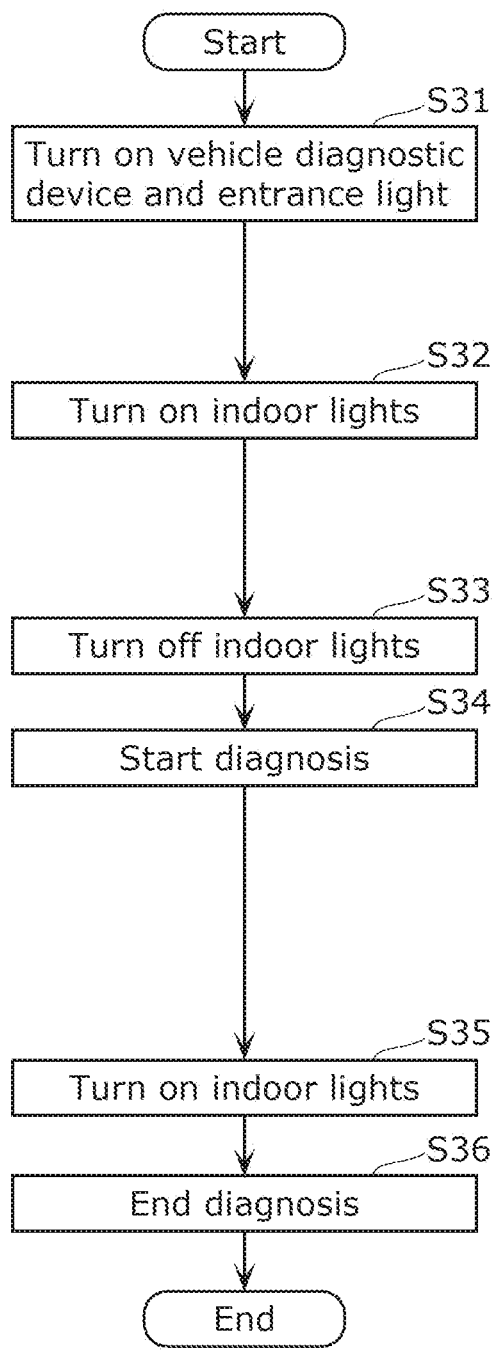
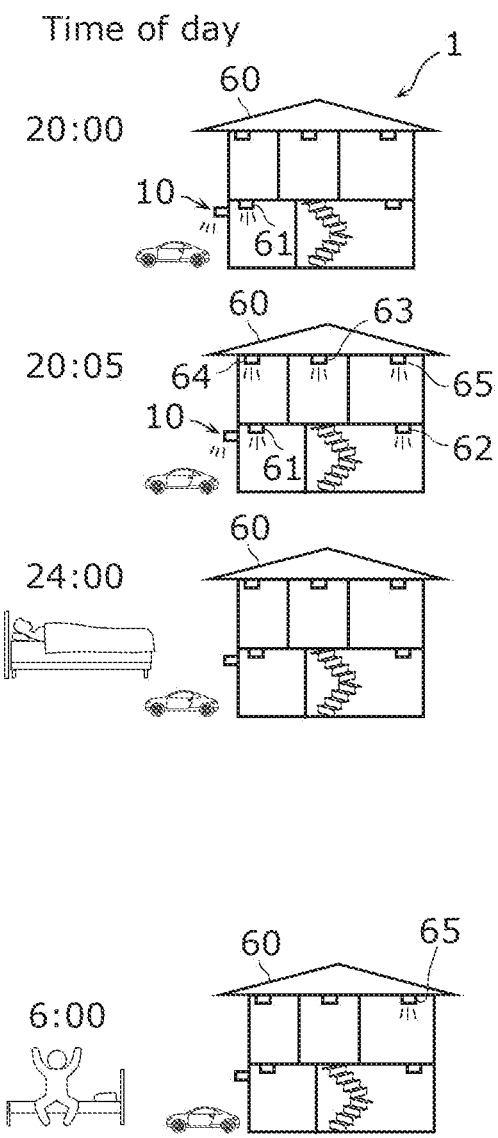

FIG. 19
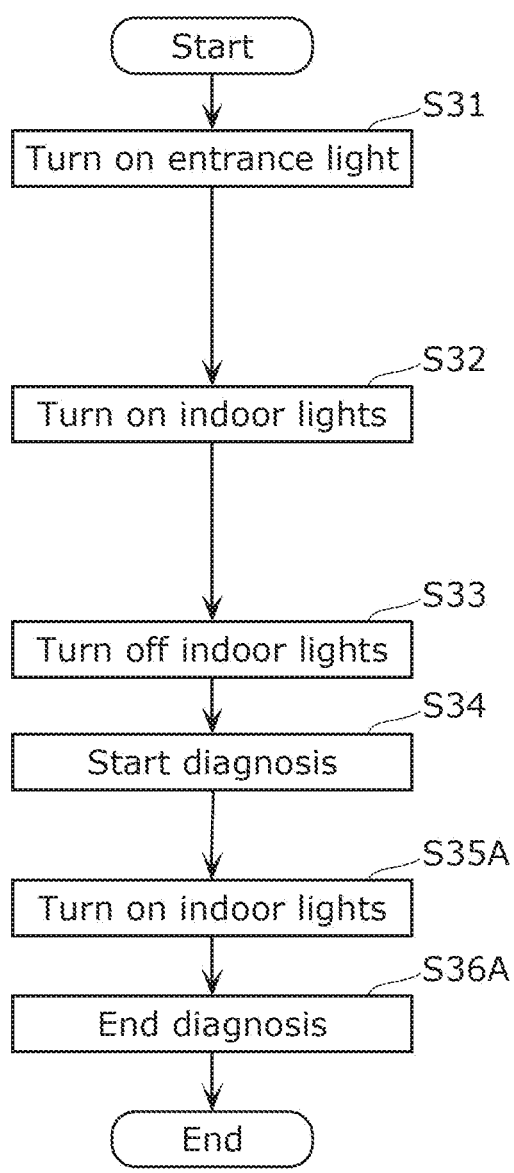
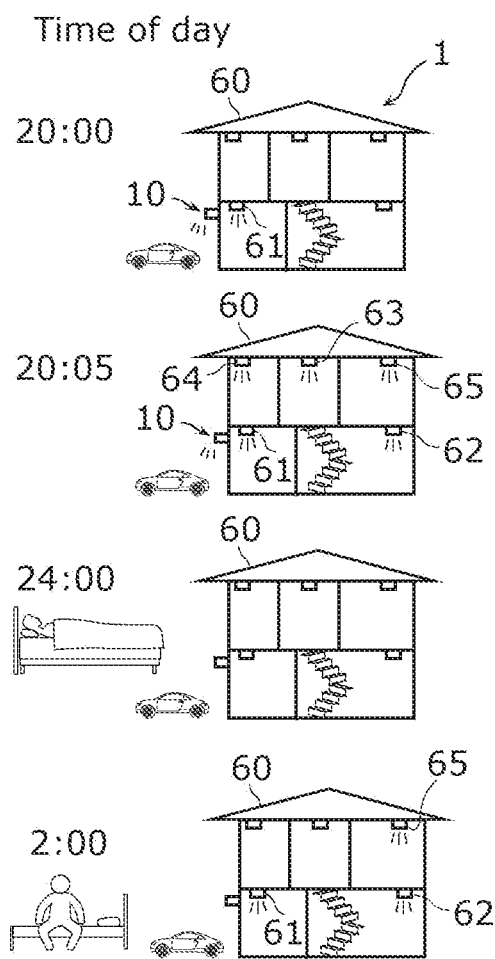

FIG. 30
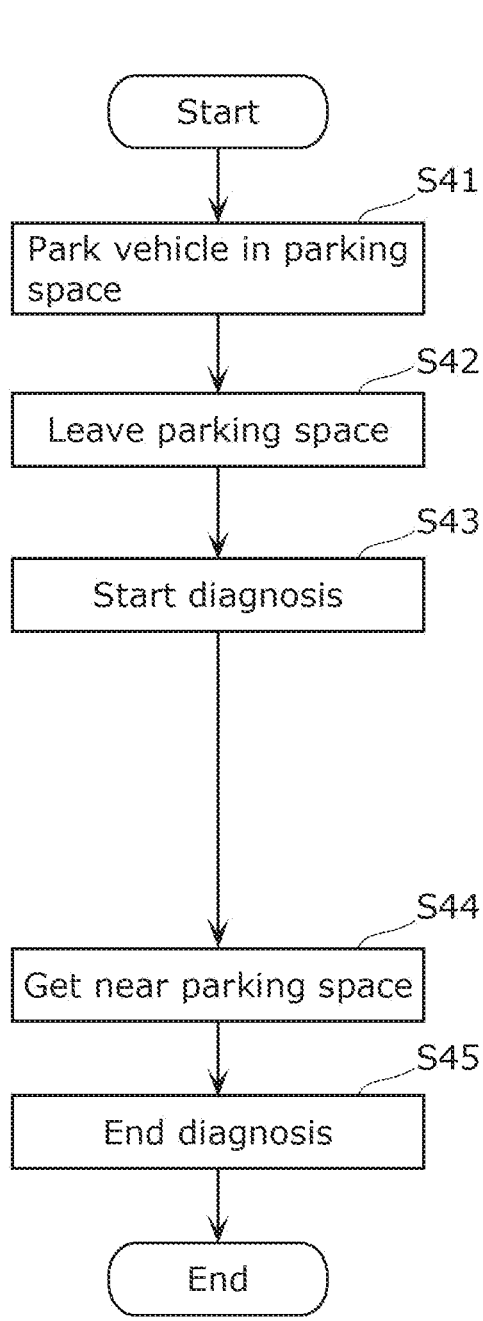
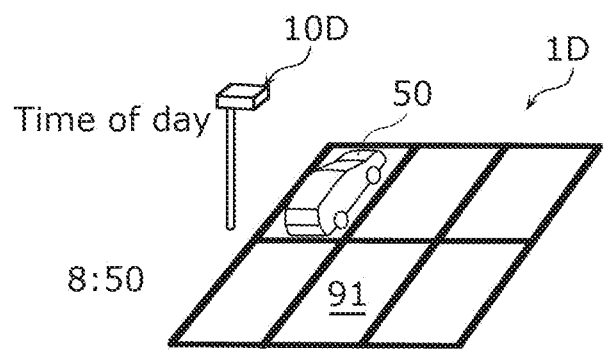
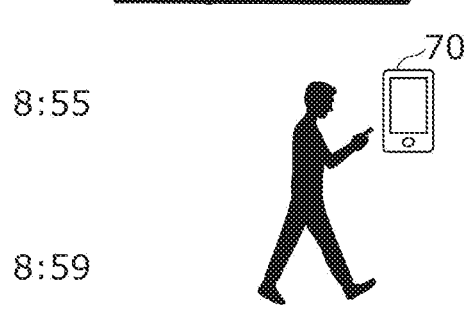
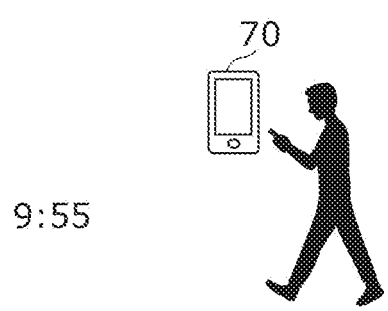

VEHICLE DIAGNOSTIC DEVICE, VEHICLE DIAGNOSTIC SYSTEM, AND MOBILE BODY DIAGNOSTIC DEVICE

CROSS-REFERENCE OF RELATED APPLICATIONS

This application is the U.S. National Phase under 35 U.S.C. § 371 of International Patent Application No. PCT/JP2020/042863, filed on Nov. 17, 2020, which in turn claims the benefit of Japanese Patent Application No. 2019-209705, filed on Nov. 20, 2019, the entire disclosures of which applications are incorporated by reference herein.

TECHNICAL FIELD

The present disclosure relates to a vehicle diagnostic device that diagnoses a vehicle, and to a mobile body diagnostic system that diagnoses a mobile body.

BACKGROUND ART

A vehicle control device that controls a vehicle is conventionally known. Patent Literature (PTL) 1 discloses a technique of switching the traveling of a vehicle to traveling according to predetermined fixed control parameters, when there is an anomaly in the behavior of the vehicle. According to this technique, the vehicle can be made to travel safely based on the predetermined fixed control parameters, even when a user erroneously sets the control parameters of the vehicle or when there is a defect in the control parameters of safety-related units of the vehicle.

CITATION LIST

Patent Literature

[PTL 1] Japanese Patent No. 5853205

SUMMARY OF INVENTION

Technical Problem

On the other hand, for example, when a vehicle is subjected to hacking (unauthorized outside operation) by a third party, there is the problem of causing damage to the hacked vehicle and to other vehicles. In response to this problem, for example, if it is possible to diagnose whether a vehicle or the like, which is a mobile body, is being hacked, damage due to hacking of the vehicle, or the like, can be reduced:

In view of this, the present disclosure has an object to provide a vehicle diagnostic device, and the like, capable of diagnosing whether a vehicle, or the like, is being hacked.

Solution to Problem

In order to achieve the aforementioned object, an aspect of the vehicle diagnostic device according to the present disclosure includes: a communication unit that communicates with a vehicle which drives autonomously; and a diagnostic unit that performs, via the communication unit, diagnosis as to whether the vehicle is being hacked, wherein the diagnostic unit performs the diagnosis by checking resilience of software which runs a travel system provided in the vehicle.

Furthermore, in order to solve the aforementioned problem, an aspect of the vehicle diagnostic system according to the present disclosure includes: the vehicle diagnostic device described above; and an information terminal that communicates with the vehicle diagnostic device.

Furthermore, in order to solve the aforementioned problem, an aspect of the vehicle diagnostic system according to the present disclosure includes: a lighting device including a communication unit that communicates with a vehicle which drives autonomously, and a light emitter that emits illumination light onto at least one of the vehicle, a road on which the vehicle travels, or a parking space in which the vehicle parks; and a vehicle diagnostic device that is communicatively connected to the communication unit and includes a diagnostic unit that performs, via the communication unit, diagnosis as to whether the vehicle is being hacked, wherein the diagnostic unit performs the diagnosis by checking resilience of software which runs a travel system provided in the vehicle.

Furthermore, in order to solve the aforementioned problem, an aspect of the vehicle diagnostic system according to the present disclosure includes: a lighting device that emits illumination light onto at least one of a vehicle which drives autonomously, a road on which the vehicle travels, or a parking space in which the vehicle parks; and a vehicle diagnostic device including a communication unit that communicates with the lighting device and the vehicle, and a diagnostic unit that performs, via the communication unit, diagnosis as to whether the vehicle is being hacked, wherein the diagnostic unit performs the diagnosis by checking resilience of software which runs a travel system provided in the vehicle.

Furthermore, in order to solve the aforementioned problem, an aspect of the mobile body diagnostic device according to the present disclosure includes: a communication unit that communicates with a mobile body which drives autonomously; and a diagnostic unit that performs, via the communication unit, diagnosis as to whether the mobile body is being hacked, wherein the diagnostic unit performs the diagnosis by checking resilience of software which runs a travel system provided in the mobile body.

Advantageous Effects of Invention

In view of this, the present disclosure has an object to provide a vehicle diagnostic device, and the like, capable of diagnosing whether a vehicle, or the like, is being hacked.

BRIEF DESCRIPTION OF DRAWINGS

FIG. 3A is a diagram illustrating an example of questions asked to a vehicle by a diagnostic unit of the vehicle diagnostic device according to Embodiment 1.

FIG. 3D is a diagram illustrating another example of states of the owner while in the vehicle.

FIG. 4 is a diagram illustrating software resilience checking actions performed on a vehicle by the vehicle diagnostic device according to Embodiment 1.

FIG. 5 is a diagram illustrating an example of an operation log of a vehicle obtained by a diagnostic unit of the vehicle diagnostic device according to Embodiment 1.

FIG. 14 is a diagram illustrating a lighting state of a light emitter of the vehicle diagnostic device according to Embodiment 2.

FIG. 18 is a flowchart illustrating an example of an operation of the vehicle diagnostic system according to Embodiment 3.

FIG. 19 is a flowchart illustrating another example of the operation of the vehicle diagnostic system according to Embodiment 3.

FIG. 30 is a flowchart illustrating an example of an operation of the vehicle diagnostic system according to Embodiment 5.

DESCRIPTION OF EMBODIMENTS

A vehicle diagnostic device according to the following embodiments has a diagnostic function of diagnosing whether a vehicle that drives autonomously is being hacked by a third party, Because the vehicle diagnostic device has the aforementioned diagnostic function, it is possible to prevent damage due to hacking of a vehicle. It should be noted that, in the subsequent embodiments, hacking refers to a stranger performing unauthorized access of a computer to cause unintended operation or preventing normal operation of the computer.

Hereinafter, embodiments will be described in detail with reference to the Drawings. Note that each of the following embodiments shows a specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims which indicate embodiments according to aspects of the present disclosure are described as optional structural components. The embodiments of the present disclosure are not limited by the current independent claims, and may also be expressed by other independent claims.

It should be noted that the respective figures are not necessarily precise illustrations. Furthermore, in the respective figures, the same reference signs are given to structural components that are substantially the same, and overlapping description thereof may be omitted or simplified.

Embodiment 1

[1-1. Configuration of Vehicle Diagnostic Device] A configuration of vehicle diagnostic device 10 according to Embodiment 1 will be described with reference to FIG. 1 to FIG. 6.

Figure 1:
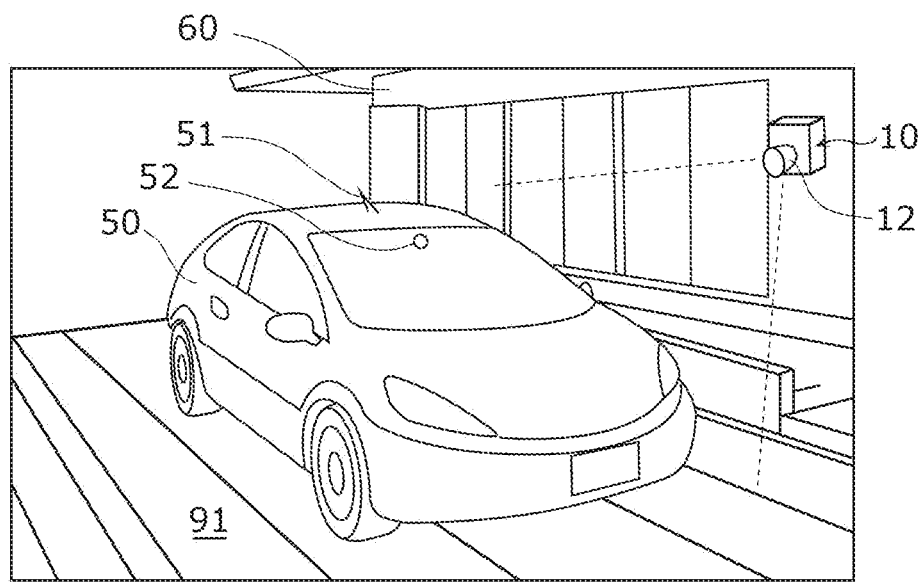
FIG. 1 is a diagram illustrating an example installation of a vehicle diagnostic device according to Embodiment 1.

FIG. 1 is a diagram illustrating an example installation of vehicle diagnostic device 10 according to Embodiment 1.

Vehicle diagnostic device 10 is installed in parking space 91 in which vehicle 50 is parked. Although vehicle diagnostic device 10 is installed on an exterior wall of a house, which is an example of building 60, in FIG. 1, the present disclosure is not limited to this, and vehicle diagnostic device 10 may be installed on a roof, a fence, a pillar or the like of the house.

Vehicle 50 is a vehicle capable of autonomous driving, such as an automobile or a motorcycle. The autonomous driving means that the vehicle drives autonomously and includes not only unmanned driving but also that the driver is assisted in steering or braking the vehicle. Vehicle 50 may be a vehicle that can switch between a manual driving mode and an autonomous driving mode. Vehicle 50 is provided with communication antenna 51 for communicating with vehicle diagnostic device 10 and camera 52 that recognizes illumination light emitted by vehicle diagnostic device 10. Vehicle 50 has an AI assistant function (a software agent). Note that vehicle 50 is an example of a mobile body, which will be described later.

Figure 2:
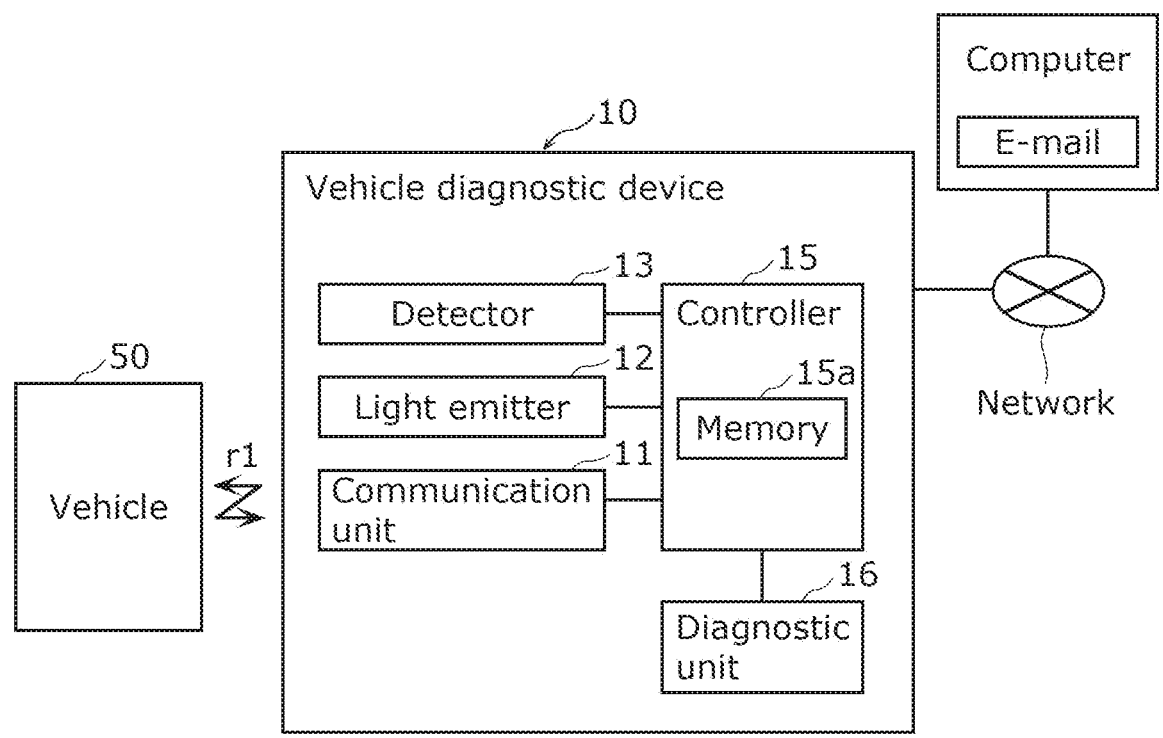
FIG. 2 is a block diagram illustrating a configuration of the vehicle diagnostic device according to Embodiment 1.

FIG. 2 is a block diagram illustrating a configuration of vehicle diagnostic device 10. FIG. 2 also illustrates a computer communicatively connected to vehicle diagnostic device 10 via a network.

As shown in FIG. 2, vehicle diagnostic device 10 includes communication unit 11 that communicates with vehicle 50, light emitter 12 that can emit illumination light, detector 13 that detects vehicle 50, and diagnostic unit 16 that diagnoses vehicle 50 as to whether an autonomous driving program of vehicle 50 is being hacked. Vehicle diagnostic device 10 further includes controller 15 that controls turning on and off, dimming, and toning of light emitter 12.

Light emitter 12 is a light source that emits illumination light, and is a liquid crystal projector that projects a static image or moving image or a light emitting diode (LED) light emitting module that emits light of red color, green color, or blue color, or synthetic light of these colors. Light emitter 12 may be a combination of separate surface mount devices (SMDs) and chips on board (COBs) of RGB, incandescent bulb color (2700K), neutral white color (5000K), and other colors. Light emitter 12 is provided at a position higher than the height of vehicle 50, in order to illuminate vehicle 50 and surroundings of vehicle 50.

Detector 13 is a sensor that detects the presence or absence of vehicle 50 in parking space 91, such as an image sensor, an infrared sensor, or a laser sensor. Detector 13 is constantly operating, and detects whether vehicle 50 is parked in parking space 91. In the present embodiment, light emitter 12 is turned on in response to detector 13 detecting vehicle 50, and diagnostic unit 16 is enabled to diagnose vehicle 50 in response to turning on of light emitter 12.

Communication unit 11 is a communication module that communicates with vehicle 50 by radio r1. The communication scheme based on radio r1 may be Bluetooth®, a specified low power radio using a frequency in the 920 MHz band, Zigbee®, or WiFi®, for example.

Controller 15 is formed by a microprocessor, memory 15a, and a program stored in memory 15a, for example. Memory 15a stores identification information on vehicle 50, such as a license plate number. An operation log and a diagnosis result of vehicle 50 described later are also recorded in memory 15a. Controller 15 controls turning on and the like of light emitter 12, and controls operations of communication unit 11, detector 13, and diagnostic unit 16.

When detector 13 detects vehicle 50, for example, controller 15 transmits, to vehicle 50, a request signal that requests for the identification information on vehicle 50 via communication unit 11. Controller 15 issues a diagnosis command to diagnostic unit 16 to make diagnostic unit 16 diagnose vehicle 50, when the identification information on vehicle 50 transmitted from vehicle 50 agrees with identification information registered in advance.

Instead of transmitting the request signal described above, controller 15 may establish a communication with vehicle 50, which is triggered by visible light communication from light emitter 12 to vehicle 50, and obtain the identification information on vehicle 50. In that case, vehicle 50 may decipher information transmitted by the visible light communication by means of camera 52, which is a signal receiver in the visible light communication, and transmit the identification information on vehicle 50 to vehicle diagnostic device 10. Controller 15 may obtain the identification information on vehicle 50 by imaging the license plate by means of detector 13.

Instead of using detector 13, controller 15 may obtain the identification information on vehicle 50 by requesting for transmission of the identification information from vehicle 50 by regularly transmitting a beacon signal from communication unit 11. That is, controller 15 may detect vehicle 50 by means of communication unit 11 and then perform diagnosis via communication unit 11.

Diagnostic unit 16 is a circuit that diagnoses, via communication unit 11, whether vehicle 50 is being hacked. When the lighting state of light emitter 12 changes, for example, diagnostic unit 16 performs diagnosis of vehicle 50 parked in parking space 91. Specifically, diagnostic unit 16 performs diagnosis of the presence of hacking of vehicle 50 when light emitter 12 changes from an off state to an on state and diagnostic unit 16 has received a diagnosis command from controller 15.

Diagnostic unit 16 may perform diagnosis of the presence of hacking of vehicle 50 not only when light emitter 12 changes from the off state to the on state but also when light emitter 12 changes from the on state to the off state or a dimmed state or when the lighting color changes. Furthermore, diagnostic unit 16 may end the diagnosis of the presence of hacking of vehicle 50 when the lighting state changes again after light emitter 12 changes from the on state to the off state or the dimmed state or after the lighting color changes. Note that the dimmed state is a state in which a toning control is being performed so that the brightness of the light is less than or equal to a predetermined brightness, for example, a state where the lighting is controlled so that the illuminance is 30%. That the lighting color changes means a state where a toning control is performed so that the color temperature changes.

Here, a vehicle diagnosis by diagnostic unit 16 will be described with regard to three diagnosis examples.

A first diagnosis example is an example in which a vehicle diagnosis is performed based on an answer to a question asked to vehicle 50 by vehicle diagnostic device 10. Diagnostic unit 16 asks vehicle 50 a plurality of questions, and determines whether vehicle 50 is being hacked based on at least one of the answering time or the answer tendency to the questions.

FIG. 3A is a diagram illustrating an example of questions asked to vehicle 50 by diagnostic unit 16 of vehicle diagnostic device 10.

For example, diagnostic unit 16 asks vehicle 50 a question having a uniquely-determined answer via communication unit 11, and diagnoses that vehicle 50 is being hacked when the answering time to the question is slower than a predetermined time.

A question that is uniquely answered is a question as to the number of the occupants of vehicle 50, the destination of vehicle 50, the seat position of the owner of vehicle 50, the temperature difference between the inside and outside of the vehicle, or the presence of a braking operation, for example. The number of the occupants of vehicle 50 can be obtained with camera 52 of vehicle 50. The destination of vehicle 50 can be obtained with a car navigation system. The temperature difference between the inside and outside of the vehicle can be obtained with a temperature sensor. The seat position of the owner can be obtained by the owner registering the seat position in vehicle 50 in advance. The presence of a braking operation can be determined by an electronic control unit (ECU) of vehicle 50.

Since vehicle 50 can instantaneously obtain the number of the occupants, the destination, the seat position, the temperature difference, and the presence of a braking operation described above, vehicle 50 can answer the question in a short time if vehicle 50 is normal. Therefore, diagnostic unit 16 determines that vehicle 50 is being hacked when the answering time to the question is longer than a predetermined time, and determines that vehicle 50 is not being hacked when the answering time falls within the predetermined time. Note that the question that is uniquely answered and the answer to the question may be a question as to a steering operation command or a braking operation command, which are inspection items of the vehicle inspection (VI), and the response to such an operation command.

Furthermore, for example, diagnostic unit 16 asks vehicle 50 questions having answers that are non-uniquely-determined via communication unit 16, and diagnoses that vehicle 50 is being hacked when an amount of variation in the answers to the questions is smaller than a predetermined amount of variation. The variation of the answers means the degree of variation of answers to similar questions.

The question that is not uniquely answered is a question as to the mood or disposition of the owner, the criterion for determining the travel route, the level of satisfaction of the owner with vehicle 50, the level of happiness of the owner, or the weather conditions of the peripheral area of vehicle 50, for example. The mood or disposition of the owner can be determined by detecting words and actions of the owner with a microphone and camera 52 in the vehicle. The criterion for determining the travel route can be obtained from a favorite travel route of the owner registered in advance. The level of satisfaction of the owner with vehicle 50 can be determined by detecting how the owner treats or handles vehicle 50 with a microphone or camera 52. The level of happiness of the owner can be determined by detecting the facial expressions of the owner with camera 52. The weather conditions of the peripheral area of vehicle 50 can be obtained with camera 52 or a weather sensor provided in vehicle 50.

For example, the level of happiness of the owner is the level of unconscious happiness of the owner, and is the level of happiness from the viewpoint of a third party of which the owner is not aware. The level of happiness can be determined by detecting a conversation, a soliloquy, the ending of a word, or the tone of voice during autonomous driving or manual driving with a camera or a microphone in vehicle 50, and processing the detection result with artificial intelligence (AI). The level of happiness of the owner may be obtained by directly asking the owner or issuing a short questionnaire or the like after driving.

The mood or disposition of the owner, the criterion for determining the travel route, the level of satisfaction, the level of happiness, and the weather conditions described above vary with the weather, the traffic conditions, the price index, the work progress, interpersonal relationships or the like, and the answer will vary if vehicle 50 is normal. However, if vehicle 50 is being hacked by a third party, the variation of the answers is often small, or the answers are often similar. In view of this, diagnostic unit 16 determines that vehicle 50 is not being hacked when the variation of the answers to a plurality of questions is greater than or equal to a predetermined variation, and determines that vehicle 50 is being hacked when the variation of the answers is smaller than the predetermined variation.

In this way, vehicle diagnostic device 10 can diagnose whether vehicle 50 is being hacked through exchange of questions and answers between vehicle diagnostic device 10 and vehicle 50.

Here, a situation where vehicle 50 determines the level of happiness of the owner will be described. The level of happiness is indicated by various states of the owner, such as a normal state, a relaxed state, tension, fatigue, or a good disposition. The state which the owner is in can be grasped by detecting words and actions of the owner, such as the tone of voice, utterance, the volume of voice, a tsk-ing sound (as when clicking one's tongue in disapproval), or humming.

Figure 36:
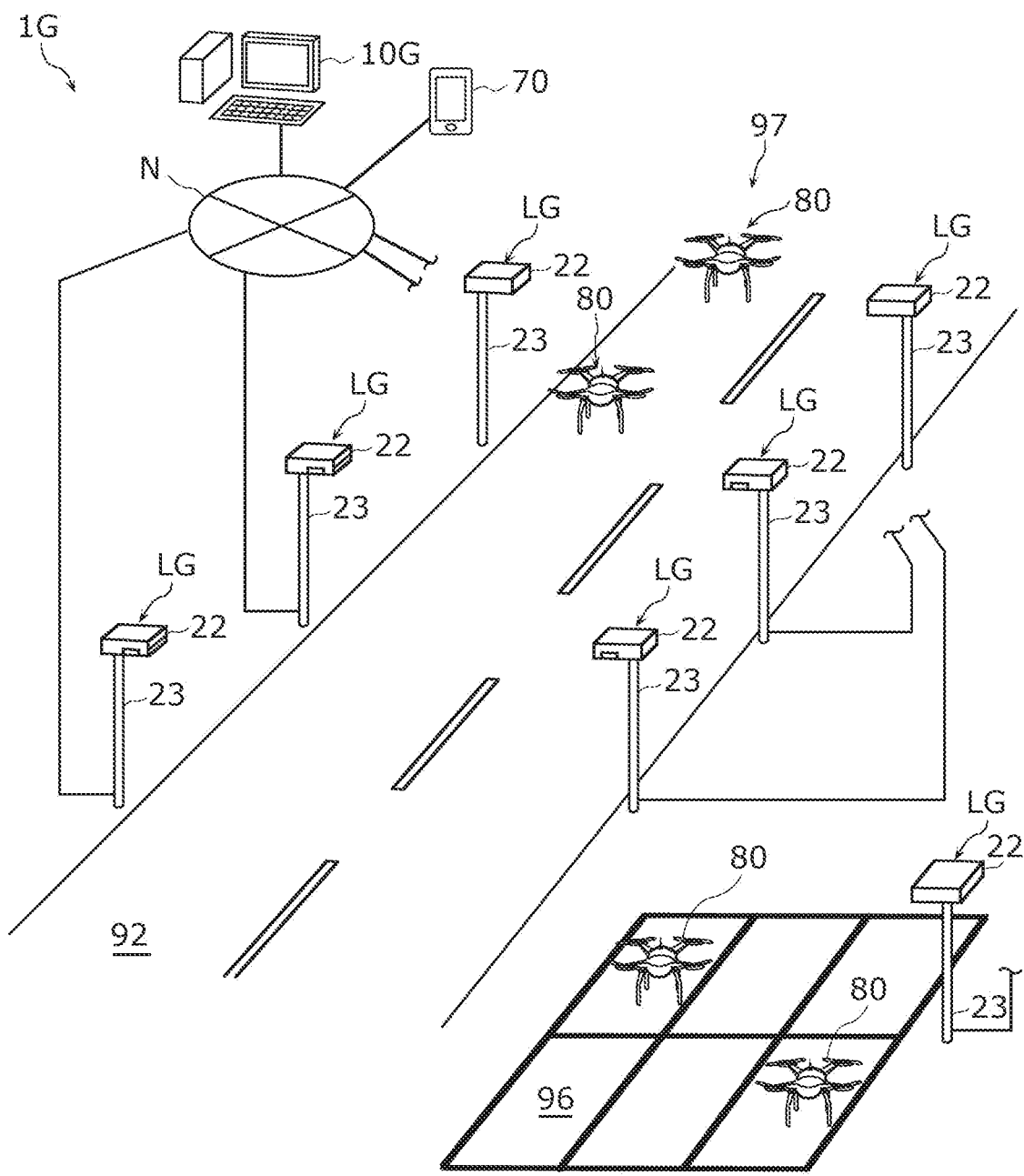
FIG. 36 is a schematic diagram illustrating mobile body diagnostic system according to Embodiment 8.

FIG. 36 is a diagram illustrating an example of states of the owner while in vehicle 50. In FIG. 36, and FIG. 3C and FIG. 3D described later, an upward arrow indicates that the mood is uplifted or otherwise changes positively, a downward arrow indicates that the mood is depressed or otherwise changes negatively, and a horizontal arrow indicates that there are no ups and downs of the mood.

Figure 3B:
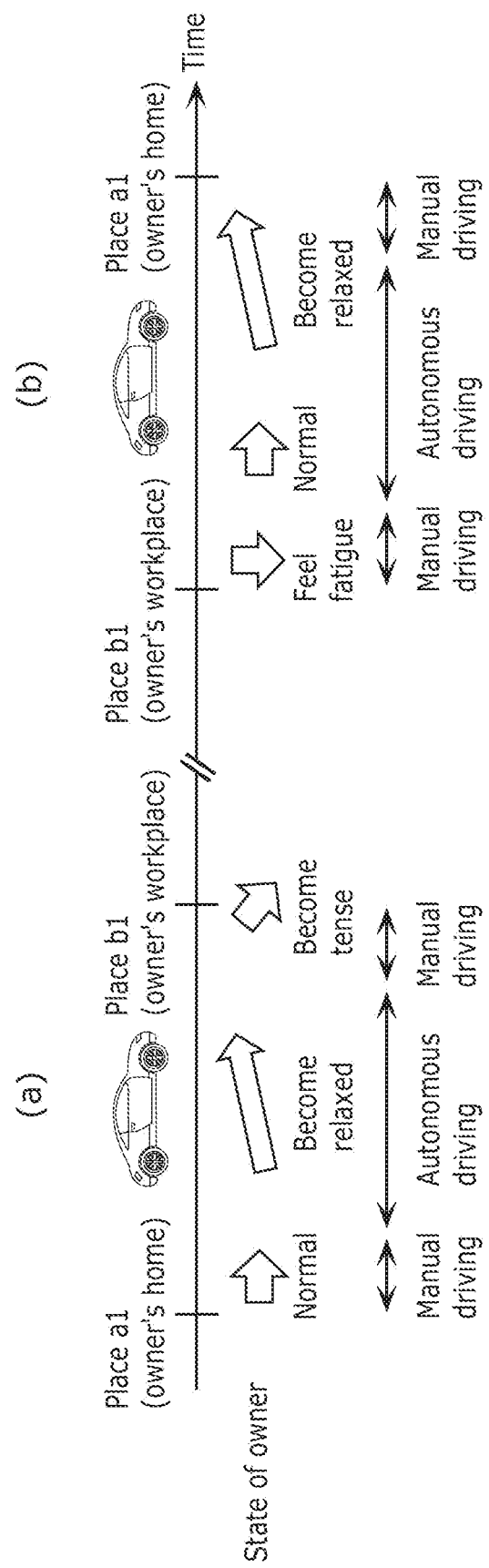
FIG. 3B is a diagram illustrating an example of states of the owner while in the vehicle.
Figure 3C:
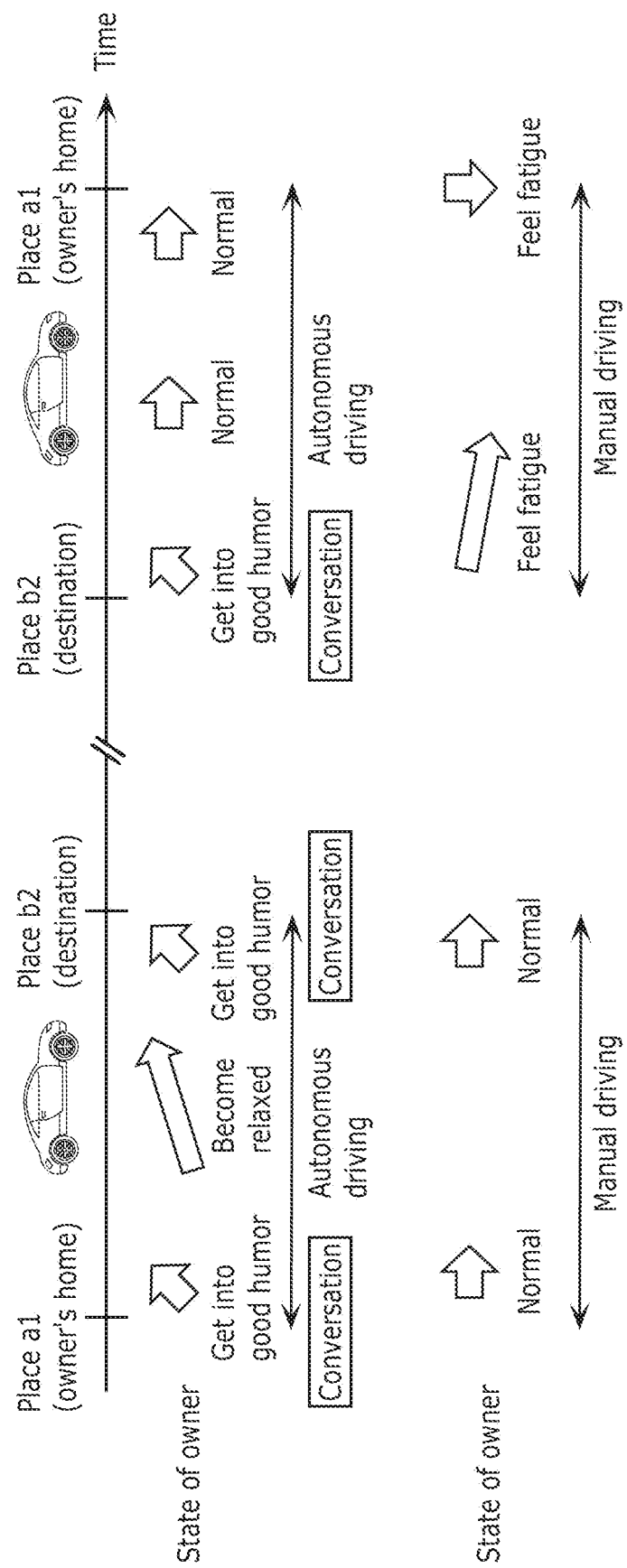
FIG. 3C is a diagram illustrating another example of states of the owner while in the vehicle.

Part (a) of FIG. 3B illustrates an example in which the owner manually drives near the owner's house, vehicle 50 then autonomously drives for some time, and the owner manually drives again near the owner's workplace. Part (b) of FIG. 3B illustrates an example in which the owner manually drives near the owner's workplace, vehicle 50 autonomously drives for some time, and the owner manually drives again near the owner's house.

As shown in Part (a) of FIG. 3B, when the owner is going to work, the owner is relaxed once vehicle 50 switches to the autonomous driving, and becomes tense as the owner gets near the workplace. On the other hand, as shown in Part (b) of FIG. 38, when the owner is going home, the owner first feels fatigue, gets back to a normal state as time passes, and then becomes relaxed. Although this is just an example, if vehicle 50 performs fixed-point observation of the owner on a daily basis and accumulates data about the states of the owner, the level of happiness of the owner that varies with time and place can be determined.

FIG. 3C is a diagram illustrating another example of states of the owner while in vehicle 50. The upper half of FIG. 3C illustrates an example of autonomous driving on a day off, and the lower half of FIG. 3C illustrates an example of manual driving on a day off.

As shown in the upper half of FIG. 3C, the owner in vehicle 50 autonomously driving gets into a good disposition through conversations with the owner's family members or the like when going to the destination, and does not feel much fatigue and maintains a normal state when going home. On the other hand, as shown in the lower half of FIG. 3C, the owner manually driving vehicle 50 has a limited time for conversation with the owner's family members or the like in order to put the owner's energies into driving, and feels fatigue when going home. That is, the manual driving makes the owner mentally and physically tired, whereas the autonomous driving frees the owner from driving and allows the owner to fully enjoy the time with the owner's family.

Although this is just an example, if vehicle 50 performs fixed-point observation of the owner on a daily basis and accumulates data about the states of the owner, the level of happiness of the owner that depends on whether the driving mode is the autonomous driving or the manual driving can be determined, FIG. 3D is a diagram illustrating another example of states of the owner while in vehicle 50. As shown in FIG. 3D, the owner gets into a good disposition when the owner purchases vehicle 50 or when the owner drives with friends. On the other hand, when the owner sends vehicle 50 to vehicle inspection, the owner gets into a bad disposition because of the expenses. Furthermore, when the owner sells vehicle 50, if vehicle 50 is capable of autonomous driving, the owner gets into a good disposition because vehicle 50 can be sold at a good price. Although this is just an example, if vehicle 50 performs fixed-point observation of the owner on a daily basis and accumulates data about the states of the owner, the level of happiness of the owner that varies from purchase to sale of vehicle 50 can be determined.

As described above, the level of happiness of the owner can be determined by vehicle 50 performing fixed-point observation of the owner on a daily basis. The level of happiness has a predetermined variation, so that vehicle diagnostic device 10 can ask vehicle 50 a question about the level of happiness and determine whether vehicle 50 is being hacked based on the magnitude of the variation.

A second diagnosis example is an example in which a vehicle diagnosis is performed by checking the resilience of software that runs a travel system provided in vehicle 50. Diagnostic unit 16 performs the diagnosis by checking resilience of software which runs a travel system provided in vehicle 50, via communication unit 11. In addition, diagnostic unit 16 diagnoses that vehicle 50 is being hacked when a level of the resilience of the software is lower than a predetermined level. Note that in diagnosis of vehicle 50, checking the vulnerability of software is substantially the same as checking the resilience of software.

FIG. 4 is a diagram illustrating software resilience checking actions performed on vehicle 50 by vehicle diagnostic device 10.

For example, diagnostic unit 16 checks the resilience of the software by performing at least one of a denial-of-service (DoS) attack or a buffer overflow attack on vehicle 50 via communication unit 11. The DoS attack is to transmit a massive number of data packets or request packets to vehicle 50. The buffer overflow attack is to transmit an unallowable amount of data to a microprocessor of vehicle 50 to slow down the processing of the microprocessor.

When vehicle 50 is being hacked, such simulated attacks cause changes in vehicle 50, such as an extreme slowdown of the processing speed of software in vehicle 50. Therefore, diagnostic unit 16 performs such simulated attacks on vehicle 50, and determines that vehicle 50 is not being hacked when the resilience level of vehicle 50 does not decrease to below a predetermined level, and determines that vehicle 50 is being hacked when the resilience level decreases to below the predetermined level. As shown in Table 1, the resilience level of software means the level of resilience to the simulated attacks and transmission of trap data described later. The predetermined resilience level is set to level 5 or 4, for example.

TABLE 1

| Resilience level | Determination criterion |
|---|---|
| 5 | Resilient to both simulated attacks, DoS attack and buffer overflow attack, and transmission of trap data |
| 4 | Resilient to both simulated attacks, DoS attack and buffer overflow attack, and no backdoor is created to software |
| 3 | Resilient to both simulated attacks, DoS attack and buffer overflow attack, but a backdoor is created to software |
| 2 | Not resilient to both simulated attacks, DoS attack and buffer overflow attack |
| 1 | Not resilient to DoS attack |

For example, when the DoS attack causes the level of the resilience of the software to become lower than the predetermined level, diagnostic unit 16 may continue the DoS attack until the software of vehicle 50 ceases to function, to cause the travel system provided in vehicle 50 to shut down.

Furthermore, diagnostic unit 16 checks the resilience of the software by performing transmission of trap data to vehicle 50 via communication unit 11. The transmission of trap data is a measure against a backdoor created by a hacker. The trap data contains a trap for checking whether an important item, such as a log-in ID or vehicle inspection information, has been accessed by a hacker through a backdoor, or a trap for checking whether a hacker has intruded through a backdoor at the time of version up of software. Diagnostic unit 16 transmits trap data to vehicle 50, and determines that vehicle 50 is not being hacked when no unauthorized access or unauthorized intrusion has occurred, and determines that vehicle 50 is being hacked when the unauthorized access or unauthorized intrusion described above has occurred. For example, when a backdoor to the software is found through the transmission of the trap data, diagnostic unit 16 may diagnose that the level of the resilience of the software is lower than the predetermined level and that vehicle 50 is being hacked.

In this way, vehicle diagnostic device 10 can diagnose whether vehicle 50 is being hacked by checking the resilience of software in vehicle 50.

A third diagnosis example is an example in which an operation log of vehicle 50 is obtained, and a vehicle diagnosis is performed based on the operation log. Diagnostic unit 16 obtains an operation log of vehicle 50 via communication unit 11, and diagnoses that vehicle 50 is being hacked, when diagnostic unit 16 confirms that vehicle 50 is not following a predetermined operational regulation.

FIG. 5 is a diagram illustrating an example of an operation log of a vehicle obtained by diagnostic unit 16 of vehicle diagnostic device 10.

The operation log includes date and time, location (latitude and longitude), speed of vehicle 50, and steering wheel angle of vehicle 50, for example. The operational regulation is a regulation about sudden stop, the sudden start, the steering wheel turning angle, or the maximum speed of vehicle 50, for example, Diagnostic unit 16 determines whether vehicle 50 is driving according to the operational regulation. Diagnostic unit 16 determines that vehicle 50 has been hacked when vehicle 50 is not following a predetermined operational regulation, and determines that vehicle 50 has not been hacked when vehicle 50 is following the operational regulation.

In this way, whether vehicle 50 is being hacked can be diagnosed by diagnostic unit 16 obtaining an operation log of vehicle 50 and performing a vehicle diagnosis based on the operation log.

When diagnostic unit 16 has diagnosed that vehicle 50 is being hacked, controller 15 notifies that vehicle 50 is being hacked using illumination light from light emitter 12. For example, when light emitter 12 is a liquid crystal projector, controller 15 notifies information regarding hacking by illuminating vehicle 50 or parking space 91 with a static image or moving image projected by light emitter 12.

Figure 6:
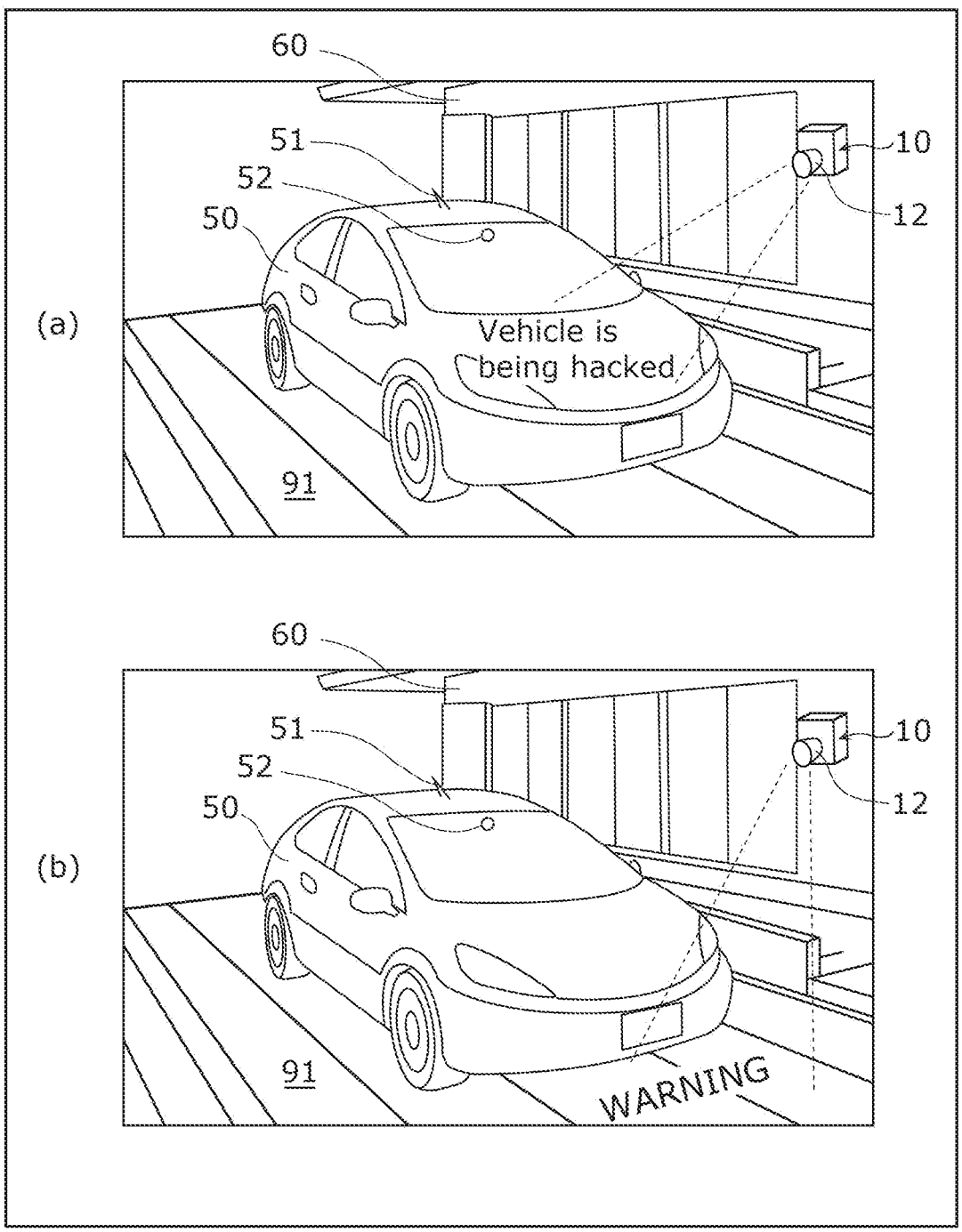
FIG. 6 is a diagram illustrating examples of the notification provided by a light emitter of the vehicle diagnostic device according to Embodiment 1.

FIG. 6 is a diagram illustrating examples of the notification provided by vehicle diagnostic device 10.

Part (a) of FIG. 6 illustrates an example in which light notifying that "vehicle is being hacked" is projected onto the hood of vehicle 50, and Part (b) of FIG. 6 illustrates an example in which light representing a word "WARNING" is projected onto the ground of parking space 91. The notification projected by light emitter 12 is not limited to characters but may be a mark, such as a figure, a symbol.

In this way, a user of vehicle 50 can visually know whether vehicle 50 is being hacked. Therefore, the user can take measures to cope with the hacked vehicle 50, and reduce damage due to the hacking of vehicle 50.

In another example of the notification of the diagnosis result, vehicle diagnostic device 10 may notify a computer communicatively connected to vehicle diagnostic device 10 via a network of the diagnosis result (see FIG. 2). For example, vehicle diagnostic device 10 may transmit the diagnosis result to a management server that is a computer owned by a dealer of vehicle 50. Vehicle diagnostic device 10 may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

[1-2. Operation of Vehicle Diagnostic Device]

Next, an operation of vehicle diagnostic device 10 according to Embodiment 1 will be described with reference to FIG. 7 TO FIG. 11.

Figure 7:
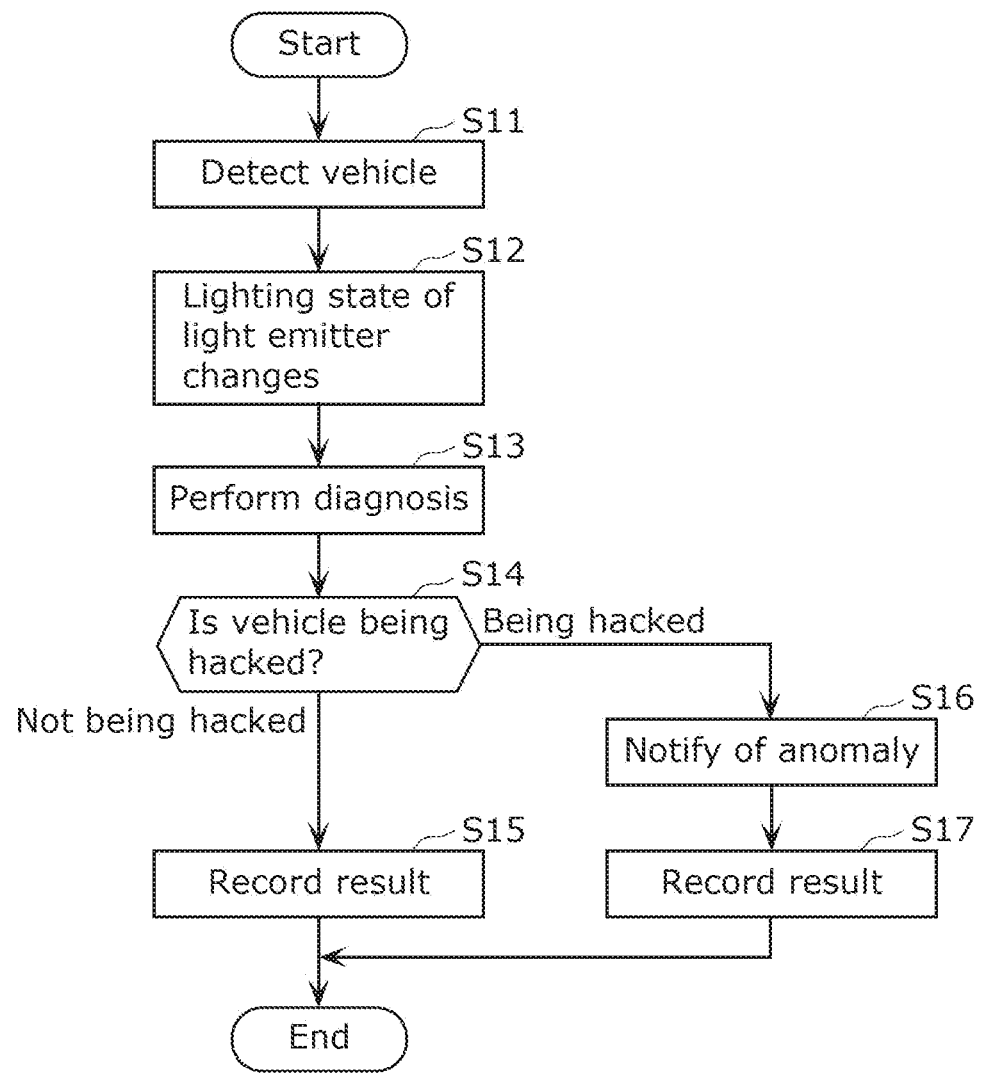
FIG. 7 is a flowchart illustrating an operation of the vehicle diagnostic device according to Embodiment 1.

FIG. 7 is a flowchart illustrating an operation of vehicle diagnostic device 10.

First, vehicle 50 is parked in parking space 91, and detector 13 of vehicle diagnostic device 10 detects vehicle 50 (Step S11).

In the present embodiment, when detector 13 detects vehicle 50, the lighting state of light emitter 12 changes (Step S12). Specifically, light emitter 12 changes from the off state to the on state.

When the lighting state of light emitter 12 changes, or detector 13 detects vehicle 50, diagnostic unit 16 of vehicle diagnostic device 10 performs diagnosis of vehicle 50 (Step S13), and determines whether vehicle 50 is being hacked (Step S14). When it is determined that vehicle 50 is not being hacked, controller 15 records a diagnosis result that vehicle 50 is not being hacked in memory 15*a* (Step S15).

On the other hand, when it is determined that vehicle 50 is being hacked, controller 15 notifies of an anomaly (Step S16). For example, controller 15 notifies of an anomaly by making light emitter 12 emit illumination light to vehicle 50 or parking space 91. Controller 15 then records a diagnosis result that vehicle 50 is being hacked in memory 15*a* (Step S17). This is the end of the diagnosis of the presence of hacking of vehicle 50 by vehicle diagnostic device 10.

Here, three examples of the operation of diagnostic unit 16 performed in Step S13 will be described with reference to FIG. 8 to FIG. 11.

Figure 8:
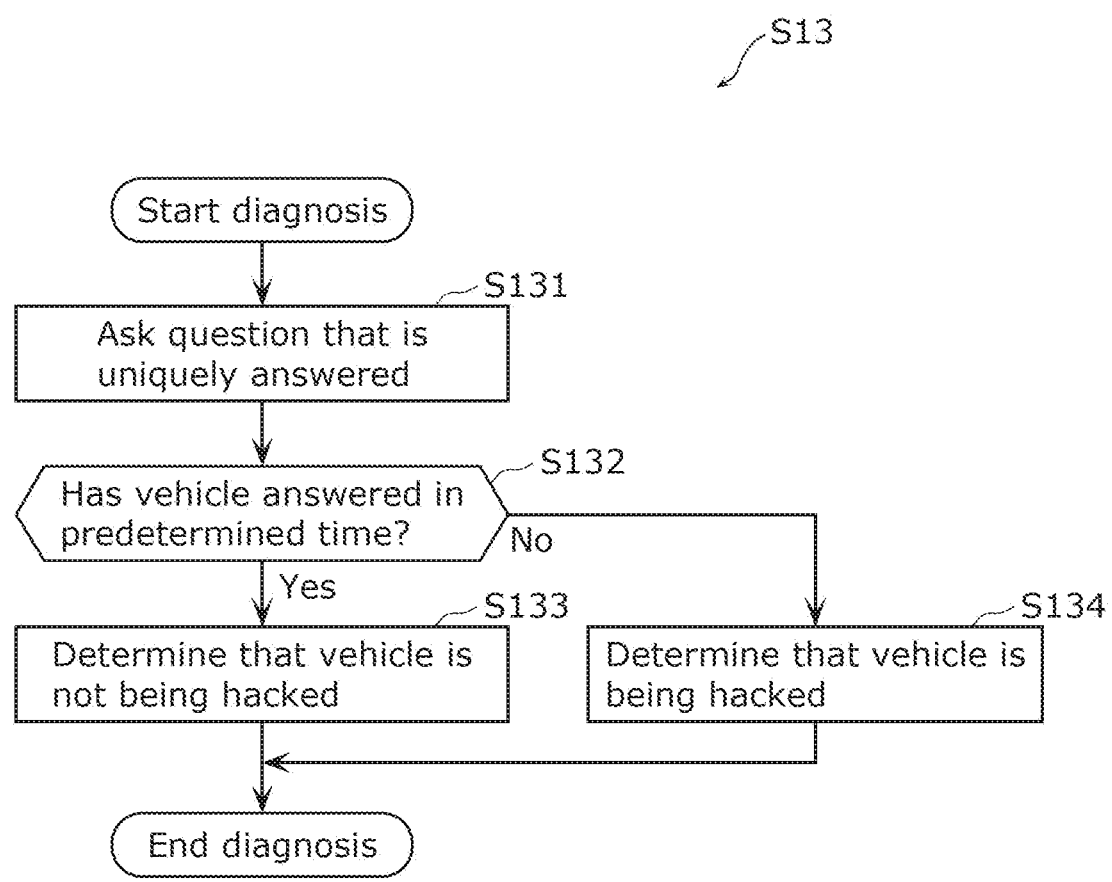
FIG. 8 is a flowchart illustrating an example of an operation of the diagnostic unit of the vehicle diagnostic device according to Embodiment 1.

FIG. 8 is a flowchart illustrating an example of the operation of diagnostic unit 16 of vehicle diagnostic device 10. FIG. 8 illustrates an example in which, among questions asked to vehicle 50, a question that is uniquely answered is asked.

First, diagnostic unit 16 asks vehicle 50 a plurality of questions that are uniquely answered (Step S131). These questions are randomly asked to vehicle 50 at different timings.

Diagnostic unit 16 then determines whether vehicle 50 has answered within a predetermined time (Step S132). When vehicle 50 has answered within the predetermined time (Yes in S132), diagnostic unit 16 determines that vehicle 50 is not being hacked (Step S133).

Figure 9:
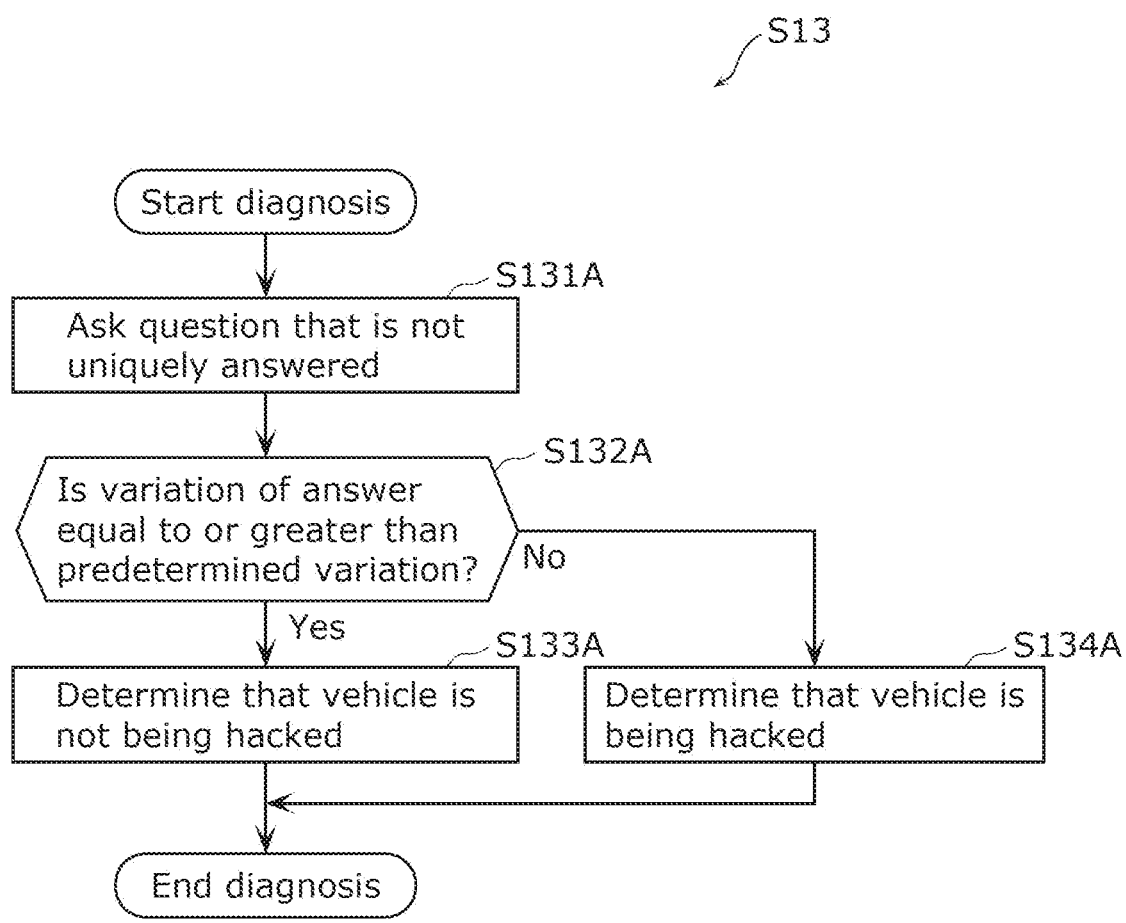
FIG. 9 is a flowchart illustrating another example of the operation of the diagnostic unit of the vehicle diagnostic device according to Embodiment 1.

On the other hand, when vehicle 50 has not answered within the predetermined time (No in S132), diagnostic unit 16 determines that vehicle 50 is being hacked (Step S134). In this way, the presence of hacking of vehicle 50 can be diagnosed by asking a question that is uniquely answered, FIG. 9 is a flowchart illustrating another example of the operation of diagnostic unit 16 of vehicle diagnostic device 10. FIG. 9 illustrates an example in which, of questions asked to vehicle 50, a question that is not uniquely answered is asked.

First, diagnostic unit 16 asks vehicle 50 a plurality of questions that are not uniquely answered (Step S131A). These questions are randomly asked to vehicle 50 at different timings.

Diagnostic unit 16 then determines whether or not the variation of the answers from vehicle 50 is greater than or equal to a predetermined variation (Step S132A). When the variation of the answers is greater than or equal to the predetermined variation (Yes in S132A), diagnostic unit 16 determines that vehicle 50 is not being hacked (Step S133A).

On the other hand, when the variation of the answers is smaller than the predetermined variation (No in S132A), diagnostic unit 16 determines that vehicle 50 is being hacked (Step S134A). In this way, the presence of hacking of vehicle 50 can be diagnosed by asking a question that is not uniquely answered.

Although questions that are uniquely answered and questions that are not uniquely answered have been separately described above, diagnostic unit 16 may diagnose the presence of hacking by asking the vehicle both questions that are uniquely answered and questions that are not uniquely answered in a random manner at different timings.

Figure 10:
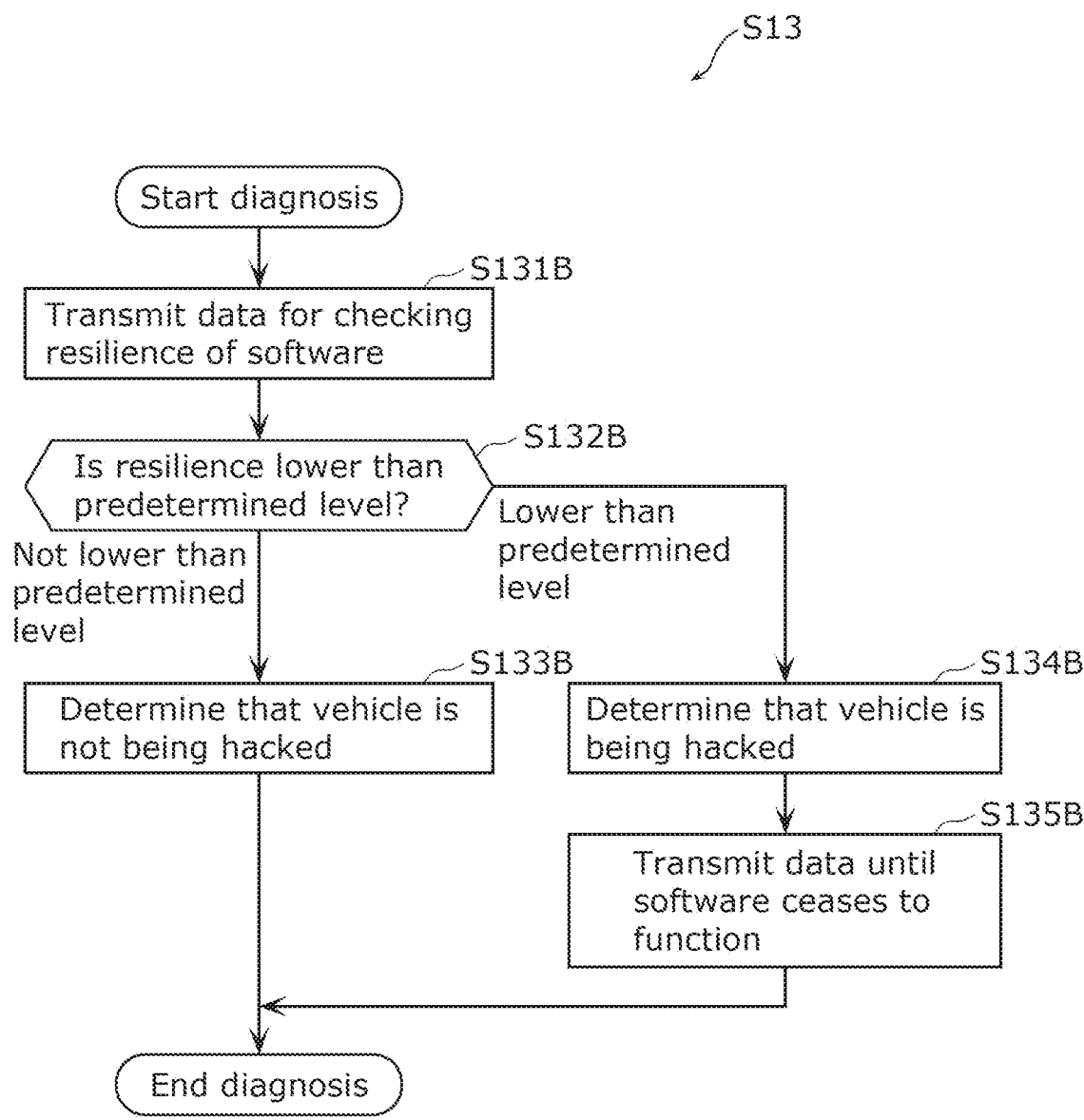
FIG. 10 is a flowchart illustrating another example of the operation of the diagnostic unit of the vehicle diagnostic device according to Embodiment 1.

FIG. 10 is a flowchart illustrating another example of the operation of diagnostic unit 16 of vehicle diagnostic device 10. FIG. 10 illustrates an example in which the resilience of software that runs a travel system provided in vehicle 50 is checked.

First, diagnostic unit 16 transmits, to vehicle 50, data for checking the resilience of software (Step S1318).

Diagnostic unit 16 then determines whether the resilience of the software is lower than a predetermined level (Step S132B).

When the resilience of the software is not lower than the predetermined level, diagnostic unit 16 determines that vehicle 50 is not being hacked (Step S133B).

On the other hand, when the resilience of the software is lower than the predetermined level, diagnostic unit 16 determines that vehicle 50 is being hacked (Step S1348). Diagnostic unit 16 then continues a simulated attack until the software ceases to function (Step S135B), thereby taking the travel system provided in vehicle 50 down. In this way, the presence of hacking of vehicle 50 can be diagnosed by checking the resilience of software.

Figure 11:
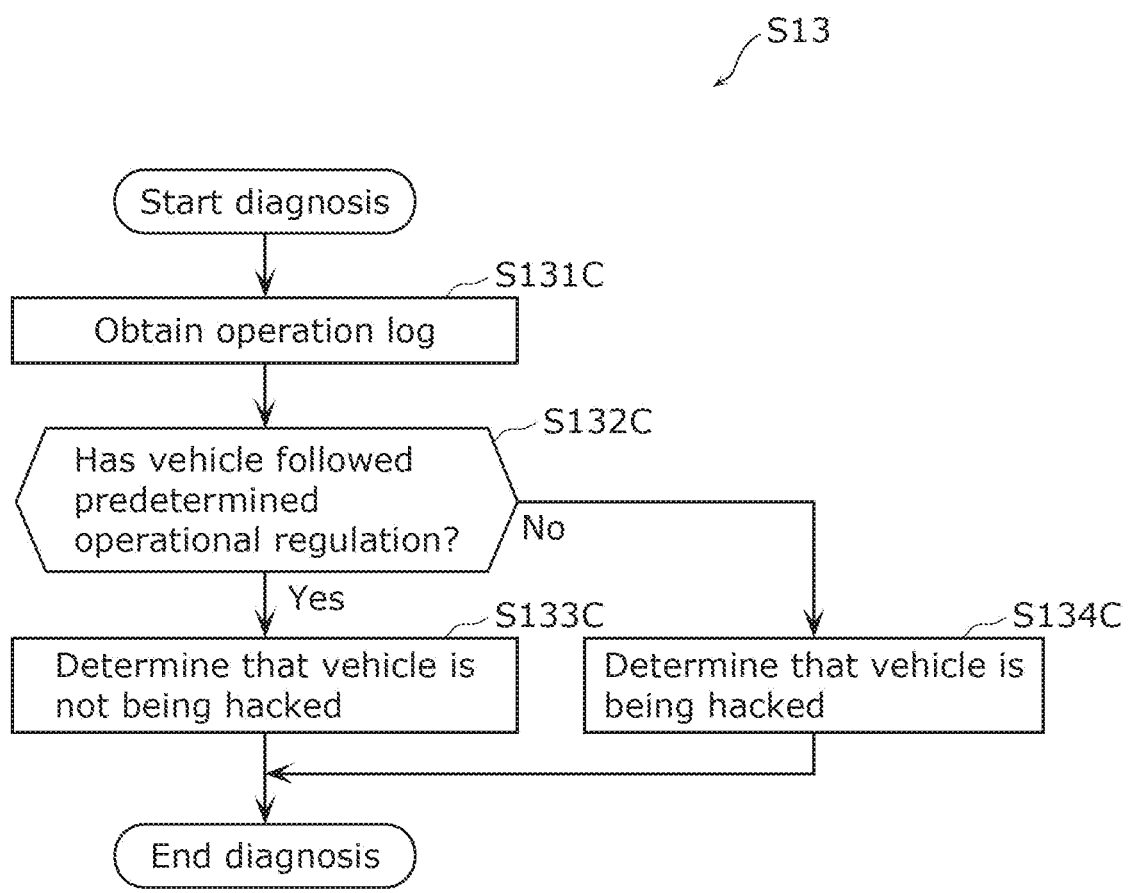
FIG. 11 is a flowchart illustrating another example of the operation of the diagnostic unit of the vehicle diagnostic device according to Embodiment 1.

FIG. 11 is a flowchart illustrating another example of the operation of diagnostic unit 16 of vehicle diagnostic device 10. FIG. 11 illustrates an example in which the presence of hacking of vehicle 50 is determined based on an operation log of vehicle 50.

First, diagnostic unit 16 obtains an operation log of vehicle 50 (Step S131C).

Diagnostic unit 16 then determines whether vehicle 50 has followed a predetermined operational regulation (Step S132C). When vehicle 50 has followed the predetermined operational regulation (Yes in S132C), diagnostic unit 16 determines that vehicle 50 is not being hacked (Step S133C).

On the other hand, when vehicle 50 has not followed the operational regulation (No in S132C), diagnostic unit 16 determines that vehicle 50 is being hacked (Step S134C). In this way, the presence of hacking of vehicle 50 can be determined based on an operation log.

As described above, vehicle diagnostic device 10 can diagnose the presence of hacking of vehicle 50 through the operations shown in FIG. 8 to FIG. 11. Therefore, damage due to the hacking of vehicle 50 can be reduced.

Embodiment 2

[2-1. Configuration of Vehicle Diagnostic Device]

A configuration of vehicle diagnostic device 10A according to Embodiment 2 will be described with reference to FIG. 12 to FIG. 14. In Embodiment 2, an example will be described in which vehicle diagnostic device 10A is a portable vehicle diagnostic device.

Figure 12:
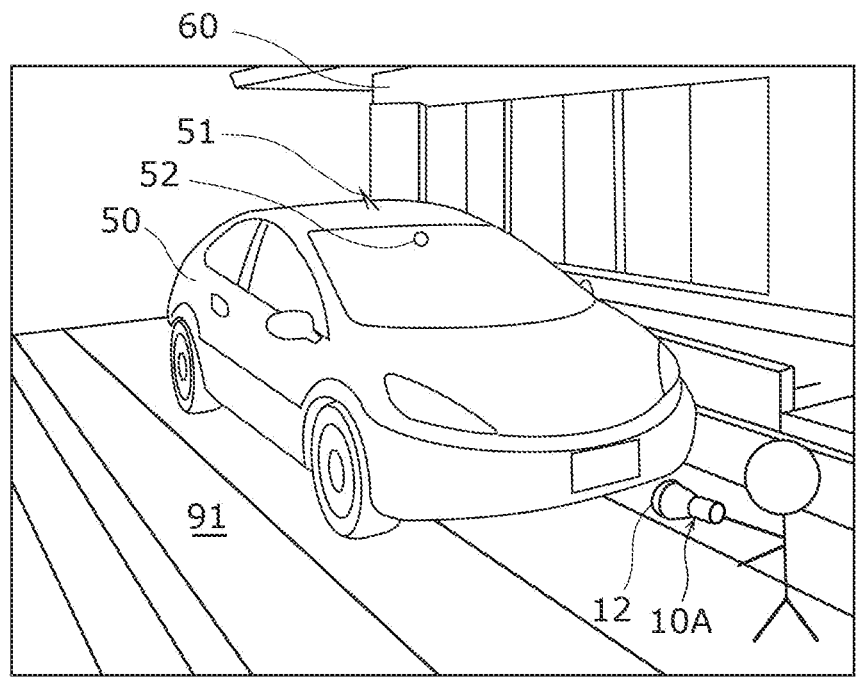
FIG. 12 is a diagram illustrating a use example of a vehicle diagnostic device according to Embodiment 2.
Figure 13:
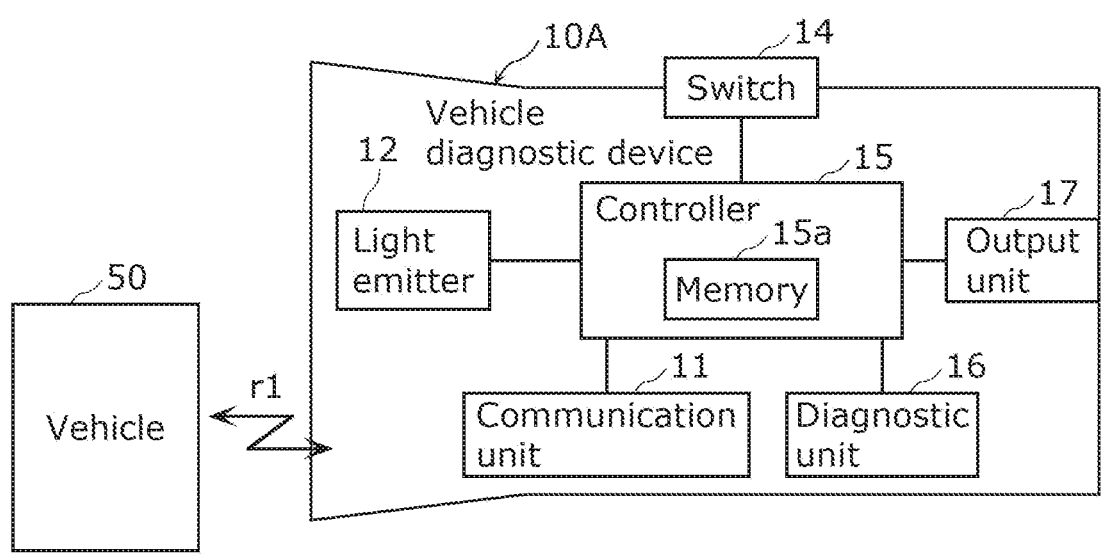
FIG. 13 is a block diagram illustrating a configuration of the vehicle diagnostic device according to Embodiment 2.

FIG. 12 is a diagram illustrating a use example of vehicle diagnostic device 10A according to Embodiment 2. FIG. 13 is a block diagram illustrating a configuration of vehicle diagnostic device 10A.

As shown in FIG. 12, vehicle diagnostic device 10A is a portable flashlight and has a cylindrical or truncated conical shape. As shown in FIG. 13, vehicle diagnostic device 10A includes communication unit 11 that communicates with vehicle 50, light emitter 12 that can emit illumination light, switch 14, diagnostic unit 16 that diagnoses vehicle 50 as to whether an autonomous driving program of vehicle 50 is being hacked, and output unit 17. Vehicle diagnostic device 10A further includes controller 15 that controls turning on and off, dimming, and toning of light emitter 12.

Light emitter 12 is a light source that emits illumination light, and is an LED light emitting module that emits light of red color, green color, or blue color, or synthetic light of these colors, for example. Light emitter 12 may be a combination of separate SMDs and COBs of RCB, incandescent bulb color, neutral white color, and other colors. Light emitter 12 is provided at an end of vehicle diagnostic device 10A in order to illuminate vehicle 50.

Switch 14 is an input unit for an input operation to turn on and off vehicle diagnostic device 10A. In the present embodiment, when switch 14 is turned on, light emitter 12 is turned on, and diagnostic unit 16 is enabled to diagnose vehicle 50 in response to the turning on of light emitter 12. When switch 14 is turned off, light emitter 12 is turned off, and diagnostic unit 16 ends the diagnosis of vehicle 50 in response to the turning off of light emitter 12.

Communication unit 11 is a communication module that communicates with vehicle 50 by radio r1. The communication scheme based on radio r1 has already been described above.

Output unit 17 is an output terminal for outputting a diagnosis result from diagnostic unit 16 to the outside, and is a universal serial bus (USB) terminal, for example.

Controller 15 is formed by a microprocessor, memory 15a, and a program stored in memory 15a, for example. Memory 15a stores identification information on vehicle 50, such as a license plate number. An operation log and a diagnosis result of vehicle 50 described later are also recorded in memory 15a. Controller 15 controls turning on and the like of light emitter 12, and controls operations of communication unit 11, diagnostic unit 16, and output unit 17.

When controller 15 receives an on operation for switch 14, for example, controller 15 transmits, to vehicle 50, a request signal that requests for the identification information on vehicle 50 via communication unit 11. Controller 15 issues a diagnosis command to diagnostic unit 16 to make diagnostic unit 16 diagnose vehicle 50, when the identification information on vehicle 50 transmitted from vehicle 50 agrees with identification information registered in advance. It should be noted that, instead of transmitting the request signal described above, controller 15 may establish a communication with vehicle 50, which is triggered by visible light communication from light emitter 12 to vehicle 50, and obtain the identification information on vehicle 50.

Diagnostic unit 16 is a circuit that diagnoses, via communication unit 11, whether vehicle 50 is being hacked. When the lighting state of light emitter 12 changes, for example, diagnostic unit 16 performs diagnosis of vehicle 50 parked in parking space 91. Specifically, diagnostic unit 16 performs diagnosis of the presence of hacking of vehicle 50 when light emitter 12 changes from an off state to an on state and diagnostic unit 16 has received a diagnosis command from controller 15.

The vehicle diagnosis by diagnostic unit 16 will be described with regard to three diagnosis examples.

A first diagnosis example is an example in which a vehicle diagnosis is performed based on an answer to a question asked to vehicle 50 by vehicle diagnostic device 10. Diagnostic unit 16 asks vehicle 50 a plurality of questions, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 16 checks the resilience of the software in vehicle 50 via communication unit 11, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 16 obtains an operation log of vehicle 50 via communication unit 11, and diagnoses that vehicle 50 is being hacked, when diagnostic unit 16 confirms that vehicle 50 is not following a predetermined operational regulation.

When diagnostic unit 16 has diagnosed that vehicle 50 is being hacked, controller 15 notifies that vehicle 50 is being hacked using illumination light from light emitter 12.

FIG. 14 is a diagram illustrating the lighting state of light emitter 12 of vehicle diagnostic device 10A.

As shown in FIG. 14, light emitter 12 is fully turned on when switch 14 is turned on and vehicle diagnostic device 10A starts diagnosis, and blinks while vehicle diagnostic device 10A is communicating with vehicle 50 and performing diagnosis. Light emitter 12 then emits light of blue color when the diagnosis result is that vehicle 50 is not being hacked, and emits light of red color when the diagnosis result is that vehicle 50 is being hacked.

In this way, a user of vehicle 50 can visually know whether vehicle 50 is being hacked. Therefore, the user can take measures to cope with the hacked vehicle 50, and reduce damage due to the hacking of vehicle 50.

[2-2. Operation of Vehicle Diagnostic Device]

Next, an operation of vehicle diagnostic device 10A according to Embodiment 2 will be descried.

Figure 15:
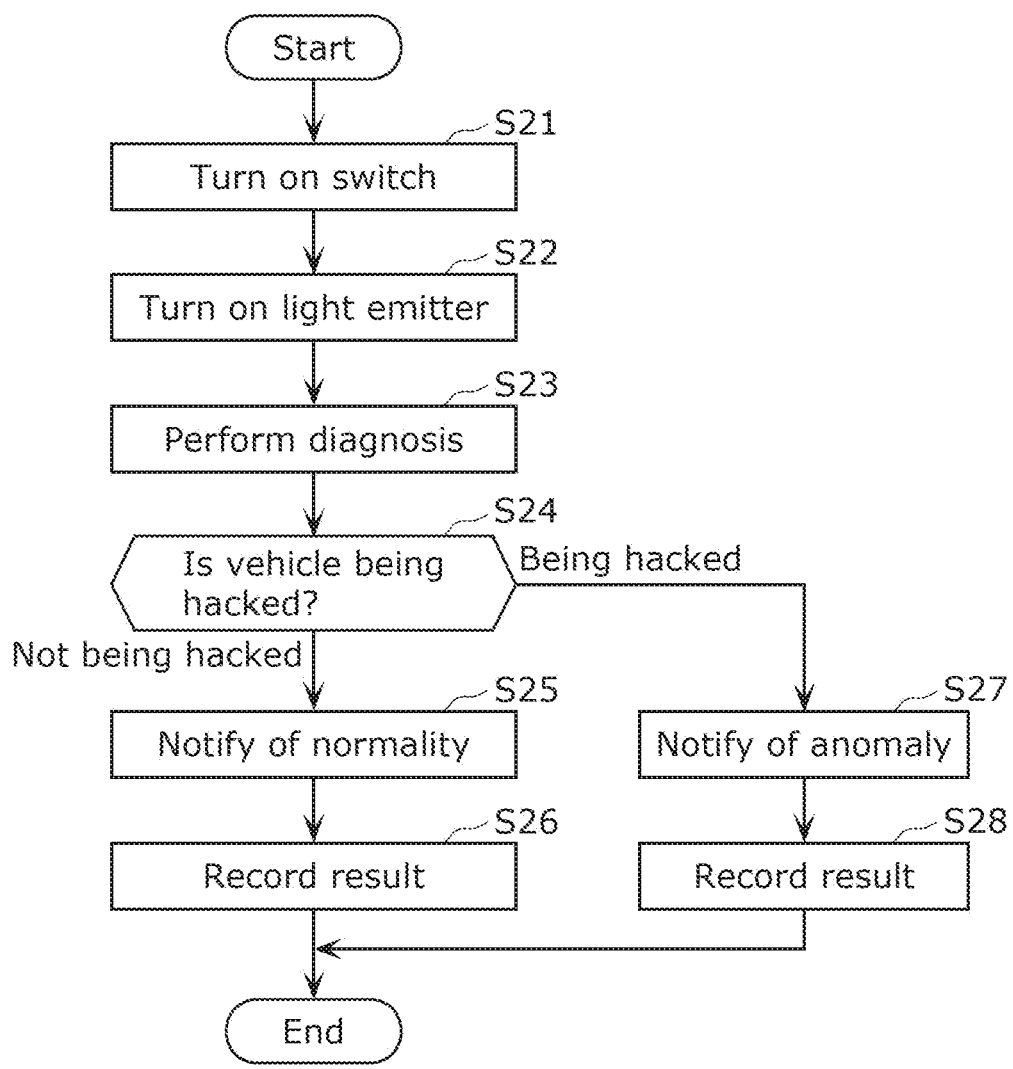
FIG. 15 is a flowchart illustrating an operation of the vehicle diagnostic device according to Embodiment 2.

FIG. 15 is a flowchart illustrating an operation of vehicle diagnostic device 10A.

First, vehicle diagnostic device 10A receives a turn-on operation of switch 14 by a user (Step S21). In response to this, light emitter 12 is turned on (Step S22).

Diagnostic unit 16 of vehicle diagnostic device 10A then performs diagnosis of vehicle 50 (Step S23), and determines whether vehicle 50 is being hacked (Step S24). When it is determined that vehicle 50 is not being hacked, controller 15 notifies of a normality through light emitter 12 (Step S25), and records a diagnosis result that vehicle 50 is not being hacked in memory 15a (Step S26).

On the other hand, when it is determined that vehicle 50 is being hacked, controller 15 notifies of an anomaly (Step S27), and records a diagnosis result that vehicle 50 is being hacked in memory 15a (Step S28). When vehicle diagnostic device 10A receives a turn-off operation of switch 14, vehicle diagnostic device 10A turns off light emitter 12, and ends the diagnosis of the presence of hacking of vehicle 50.

In this manner, vehicle diagnostic device 10A can diagnose the presence of hacking of vehicle 50 through the operations indicated in steps S21 to S28. Therefore, damage due to the hacking of vehicle 50 can be reduced.

Embodiment 3

[3-1. Configuration of Vehicle Diagnostic System]

A configuration of vehicle diagnostic system 1 according to Embodiment 3 will be described with reference to FIG. 16 and FIG. 17. In Embodiment 3, an example will be described in which vehicle diagnostic device 10 having a vehicle diagnostic function forms a part of an Internet-of-things (IoT) system, FIG. 16 is a schematic diagram illustrating vehicle diagnostic system 1 according to Embodiment 3.

Figure 16:
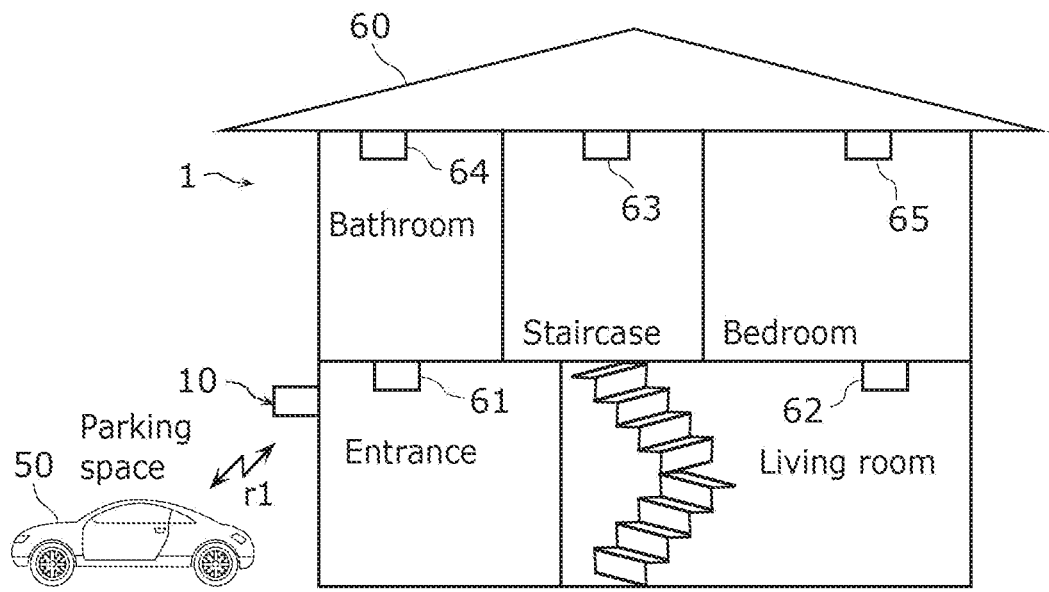
FIG. 16 is a schematic diagram illustrating a vehicle diagnostic system according to Embodiment 3.

As shown in FIG. 16, vehicle diagnostic system 1 is formed by vehicle diagnostic device 10 and a plurality of lighting apparatuses. Vehicle diagnostic device 10 is installed on an exterior wall of building 60. Of the plurality of lighting apparatuses, entrance light 61, living-room light 62, staircase light 63, bathroom light 64, and bedroom light 65 are installed in an entrance, a living room, a staircase, a bathroom, and a bedroom of building 60, respectively. Each of these lighting apparatuses has a radio communication function.

Figure 17:
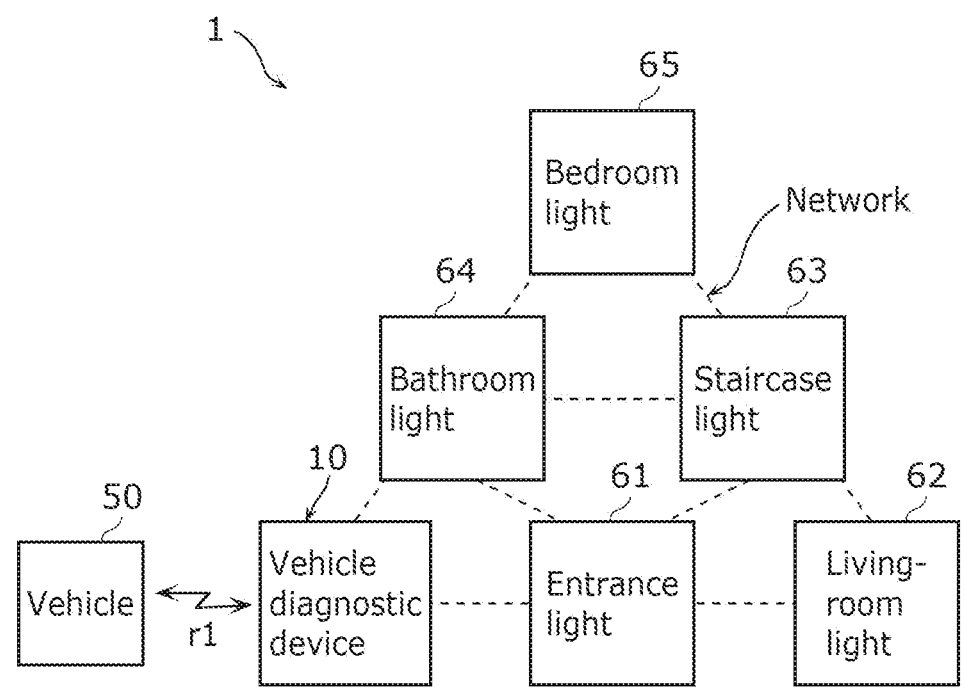
FIG. 17 is a diagram illustrating a communication connection relationship between a vehicle diagnostic device and lighting apparatuses included in the vehicle diagnostic system according to Embodiment 3.

FIG. 17 is a diagram illustrating a communication connection relationship between vehicle diagnostic device 10 and the plurality of lighting apparatuses forming vehicle diagnostic system 1.

As shown in FIG. 17, vehicle diagnostic device 10, entrance light 61, living-room light 62, staircase light 63, bathroom light 64, and bedroom light 65 form a mesh network and can communicate with each other. Examples of the mesh network referred to herein include a Bluetooth®low energy (BLE) ad hoc network.

With vehicle diagnostic system 1 according to the present embodiment, diagnostic unit 16 of vehicle diagnostic device 10 starts or ends diagnosis in response to the lighting state of a lighting apparatus provided in building 60. In the following, an operation of vehicle diagnostic system 1 having the configuration described above will be described.

[3-2. Operation of Vehicle Diagnostic System]

An operation of vehicle diagnostic system 1 according to Embodiment 3 will be described with reference to FIG. 18 and FIG. 19.

FIG. 18 is a flowchart illustrating an example of an operation of vehicle diagnostic system 1.

First, when the owner of vehicle 50 gets home, light emitter 12 of vehicle diagnostic device 10 and entrance light 61 are turned on in response to the owner's getting home (Step S31). The owner then enters the house, and turns on a light in the house (Step S32).

For example, at 24 o'clock (0 o'clock), which is the owner's bedtime, the owner enters the bedroom and turns off bedroom light 65 (Step S33). When going to bed, living-room light 62, staircase light 63, and bedroom light 65 of the plurality of lighting apparatuses included in vehicle diagnostic system 1 are turned off in the listed order, that is, in order of increasing proximity to the bedroom, and therefore, vehicle diagnostic system 1 can recognize that the owner is going to bed. That is, when lighting apparatuses are turned off in sequence in order of increasing proximity to the bedroom, the owner is going to bed, and vehicle 50 will not be used for a long time. Thus, vehicle diagnostic system 1 uses this time to perform a vehicle diagnosis (Step S34).

At 6:00, which is the owner's wake-up time, the owner turns on bedroom light 65 (Step S35). The turning on of bedroom light 65 notifies vehicle diagnostic system 1 that the owner will use vehicle 50 to go to work in several tens of minutes. Thus, vehicle diagnostic system 1 ends the vehicle diagnosis when bedroom light 65 is turned on around the wake-up time (Step S36). When ending the vehicle diagnosis, vehicle diagnostic system 1 records the diagnosis result in memory 15a of vehicle diagnostic device 10.

With vehicle diagnostic system 1, the presence of hacking of vehicle 50 can be diagnosed by taking advantage of turning on or off of a lighting apparatus or other events in daily life. In this way, damage due to the hacking of vehicle 50 can be reduced.

FIG. 19 is a flowchart illustrating another example of the operation of vehicle diagnostic system 1. Steps S31 to S34 are the same as those in FIG. 18, and descriptions thereof will be omitted.

Referring to FIG. 19, a case will be described where at 2:00 at night, the owner needs to go out for some reason. The owner gets up late at night, and turns on lighting apparatuses in the house, such as bedroom light 65 (Step S35A). For example, when the owner goes to work, the owner turns on bedroom light 65, living-room light 62, and entrance light 61 among the lighting apparatuses in the listed order while the owner goes to parking space 91. Since bedroom light 65, living-room light 62, and entrance light 61 are turned on in the listed order, vehicle diagnostic system 1 can recognize that the owner will use vehicle 50 to go out soon. Therefore, when the lighting apparatuses are turned on in order of increasing proximity to the entrance, vehicle diagnostic system 1 ends the vehicle diagnosis even though late at night (Step S36A). When ending the vehicle diagnosis, if the vehicle diagnosis is still in process, vehicle diagnostic system 1 records the partial diagnosis result in memory 15a. In this way, a load on the system and an adverse effect on the system due to the forced termination of the vehicle diagnosis can be prevented.

With vehicle diagnostic system 1, the presence of hacking of vehicle 50 can be diagnosed by taking advantage of turning on or off of a lighting apparatus or other events in daily life. In this way, damage due to the hacking of vehicle 50 can be reduced.

Although an example has been shown above in which a plurality of lighting apparatuses forms an IoT system, the present disclosure is not limited to this, and a smartphone, a smart speaker, or an alarm clock may be linked with the IoT system. In that case, vehicle diagnostic system 1 may determine the start time and the end time of the vehicle diagnosis based on a schedule recorded in the smartphone, words or actions detected by the smart speaker, or the wake-up time set in the alarm dock, for example.

3-3. Variation 1 of Embodiment 3

Next, a configuration of vehicle diagnostic system 1A according to Variation 1 of Embodiment 3 will be described with reference to FIG. 20 and FIG. 21. In Variation 1 of Embodiment 3, again, an example will be described in which vehicle diagnostic device 10 having a vehicle diagnostic function forms a part of an IoT system.

Figure 20:
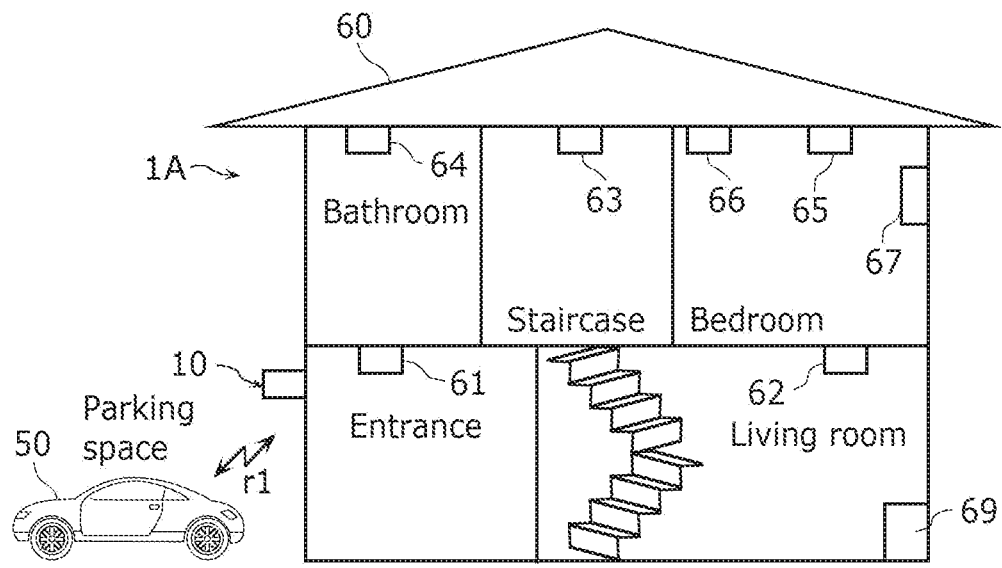
FIG. 20 is a schematic diagram illustrating a vehicle diagnostic system according to Variation 1 of Embodiment 3.

FIG. 20 is a schematic diagram illustrating vehicle diagnostic system 1A according to Variation 1 of Embodiment 3.

As shown in FIG. 20, vehicle diagnostic system 1A is formed by vehicle diagnostic device 10 and a plurality of electrical apparatuses. Vehicle diagnostic device 10 is installed on an exterior wall of building 60. Of the plurality of electrical apparatuses, entrance light 61, living-room light 62, staircase light 63, bathroom light 64, and bedroom light 65 are installed in an entrance, a living room, a staircase, a bathroom, and a bedroom of building 60, respectively. In this variation, in building 60, motion sensor 66 and bedroom switch 67 are installed in the bedroom, and lighting controller 69 is installed in the living room.

Figure 21:
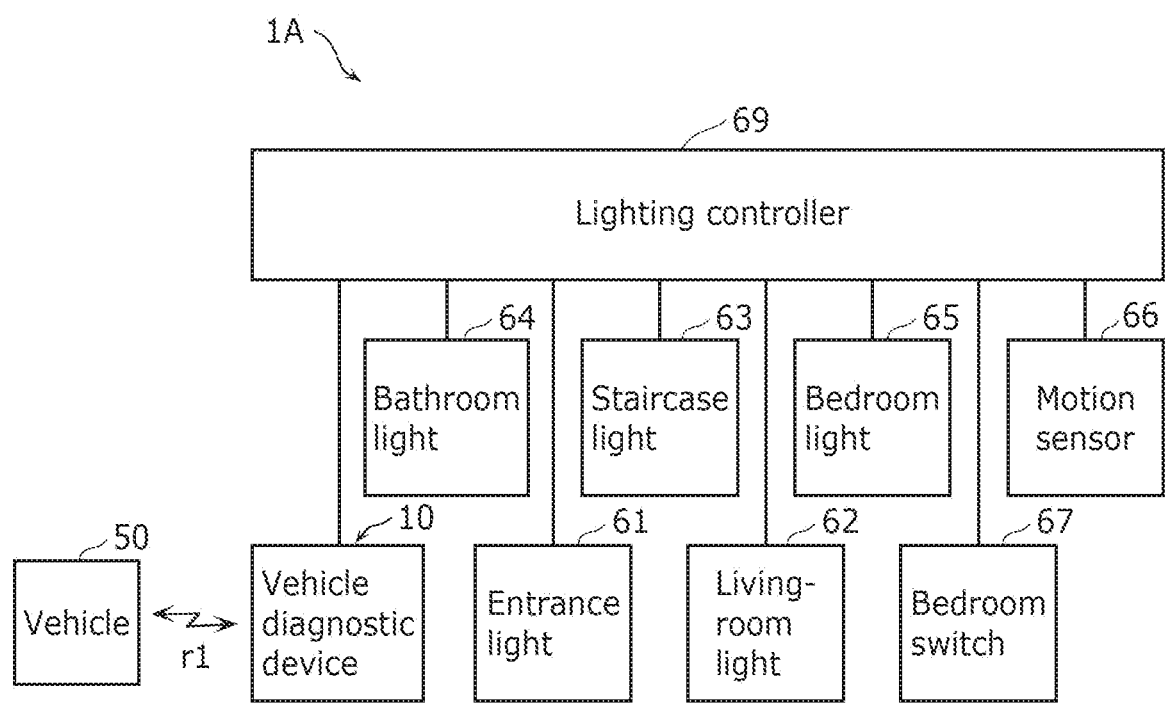
FIG. 21 is a diagram illustrating a communication connection relationship between a vehicle diagnostic device and electrical apparatuses included in the vehicle diagnostic system according to Variation 1 of Embodiment 3.

FIG. 21 is a diagram illustrating a communication connection relationship between vehicle diagnostic device 10 and the plurality of electrical apparatuses forming vehicle diagnostic system 1A.

As shown in FIG. 21, entrance light 61, living-room light 62, staircase light 63, bathroom light 64, bedroom light 65, motion sensor 66, and bedroom switch 67 are each communicatively connected to lighting controller 69 via a network. Operations of electrical apparatuses including the plurality of lighting apparatuses, motion sensor 66, and bedroom switch 67 are each controlled by lighting controller 69.

For example, when motion sensor 66 in the bedroom detects a person, and bedroom switch 67 is turned off, lighting controller 69 turns off bedroom light 65, and diagnosis of vehicle 50 is started by vehicle diagnostic device 10. Vehicle diagnostic system 1A according to the variation performs diagnosis of vehicle 50 when the operational state of at least one of the electrical apparatuses changes.

Specifically, diagnostic unit 16 of vehicle diagnostic device 10 starts or ends diagnosis in response to the lighting state or operational state of another electrical apparatus provided in building 60. In this variation, again, the presence of hacking of vehicle 50 is being hacked can be diagnosed by taking advantage of turning on or off of a lighting apparatus or other events in daily life. In this way, damage due to the hacking of vehicle 50 can be reduced.

3-4. Variation 2 of Embodiment 3

Next, a configuration of vehicle diagnostic system 1B according to Variation 2 of Embodiment 3 will be described with reference to FIG. 22 and FIG. 23. In Variation 2 of Embodiment 3, an example will be described in which vehicle diagnostic device 10B of vehicle diagnostic system 13 performs diagnosis of vehicle 50 in a state where the communication with the apparatuses other than vehicle 50 is disconnected, FIG. 22 is a schematic diagram illustrating vehicle diagnostic system 1B according to Variation 2 of Embodiment 3.

Figure 22:
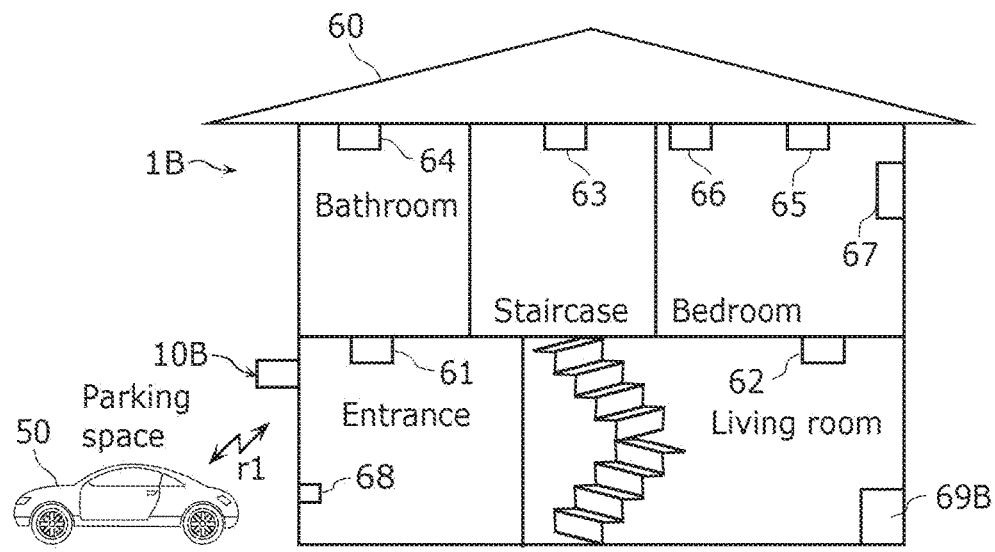
FIG. 22 is a schematic diagram illustrating a vehicle diagnostic system according to Variation 2 of Embodiment 3.

As shown in FIG. 22, vehicle diagnostic system 13 is formed by a plurality of electrical apparatuses, controller 693, and vehicle diagnostic device 103. Vehicle diagnostic device 103 is installed on an exterior wall of building 60. Of the plurality of electrical apparatuses, entrance light 61, living-room light 62, staircase light 63, bathroom light 64, and bedroom light 65 are installed in an entrance, a living room, a staircase, a bathroom, and a bedroom of building 60, respectively. Motion sensor 66 and bedroom switch 67 are installed in the bedroom, door switch 68 is installed on the door of the entrance, and controller 69B is installed in the living room.

Figure 23:
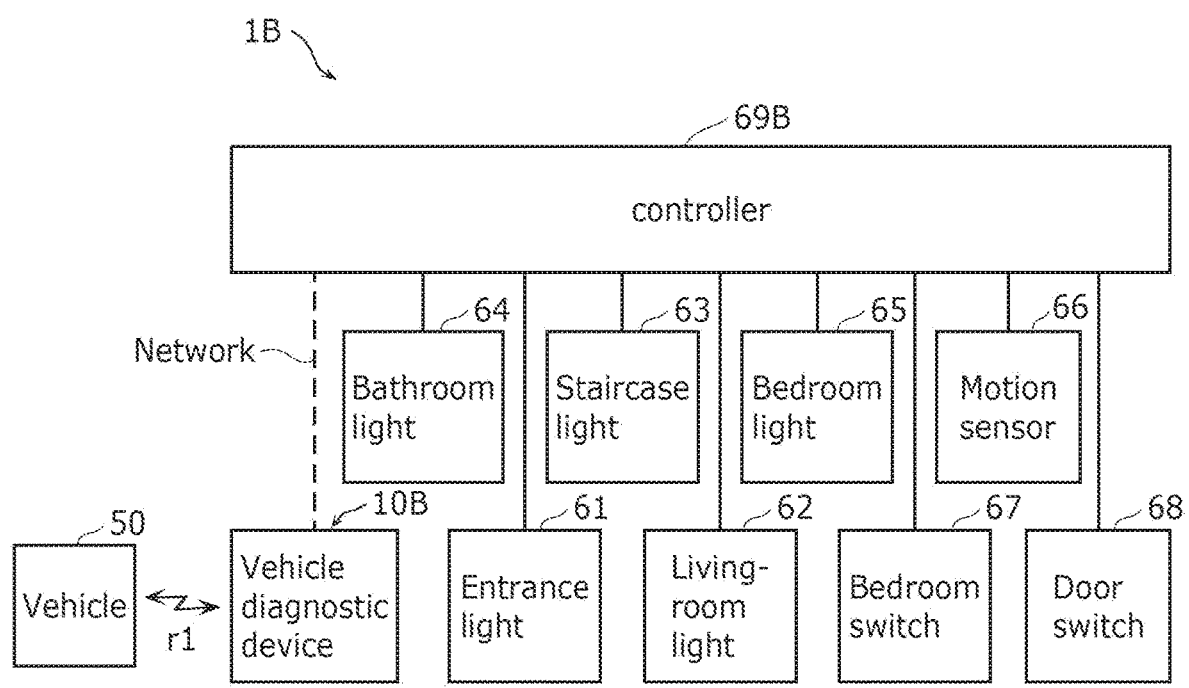
FIG. 23 is a diagram illustrating a communication connection relationship between electrical apparatuses, a controller, and a vehicle diagnostic device included in the vehicle diagnostic system according to Variation 2 of Embodiment 3.
Figure 24:
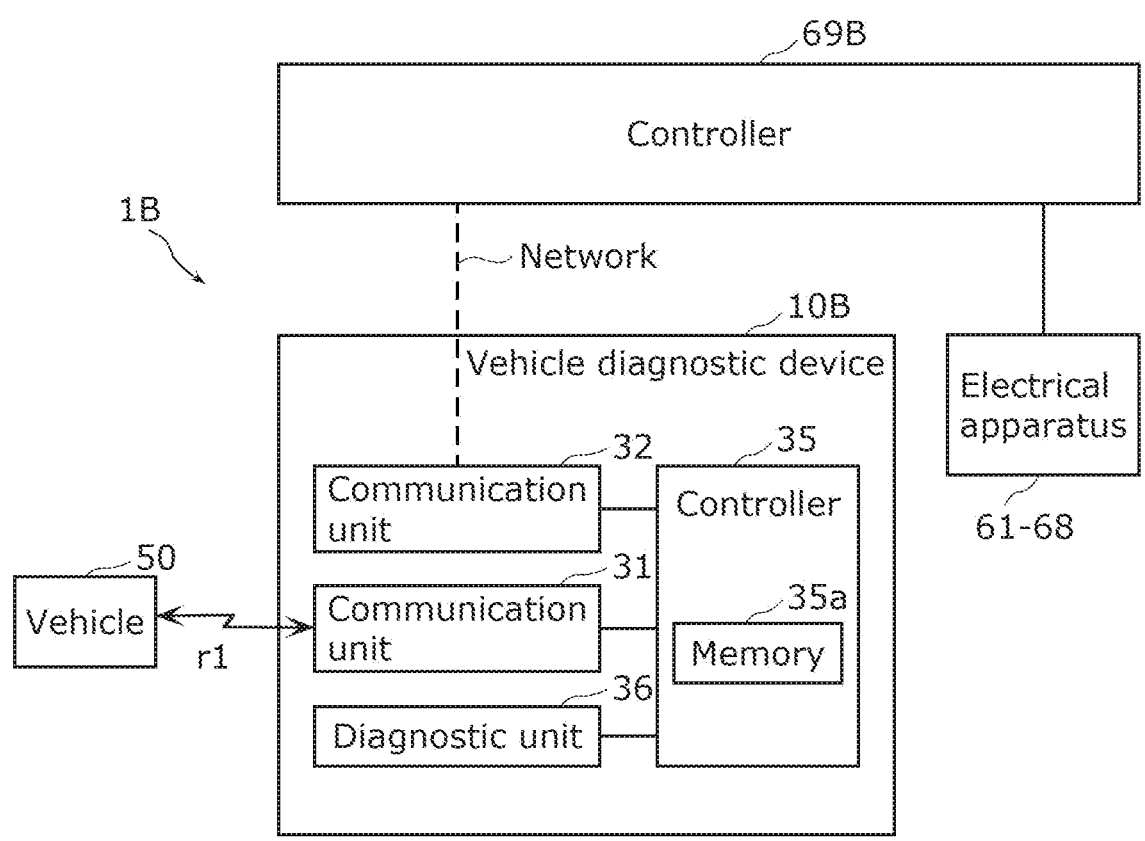
FIG. 24 is a block diagram illustrating a part of the configuration of the vehicle diagnostic system according to Variation 2 of Embodiment 3.

FIG. 23 is a diagram illustrating a communication connection relationship between the plurality of electrical apparatuses, controller 693, and vehicle diagnostic device 10B forming vehicle diagnostic system 1B, FIG. 24 is a block diagram illustrating a part of the configuration of vehicle diagnostic system 1B.

As shown in FIG. 23, vehicle diagnostic device 108, entrance light 61, living-room light 62, staircase light 63, bathroom light 64, bedroom light 65, motion sensor 66, door switch 68, and bedroom switch 67 are each communicatively connected to controller 698.

As shown in FIG. 24, vehicle diagnostic device 103 includes communication unit 31 that communicates with vehicle 50, another communication unit 32 that communicates with a plurality of electrical apparatuses via a network, diagnostic unit 36 that diagnoses vehicle 50 as to whether an autonomous driving program of vehicle 50 is being hacked, and controller 35 that controls operations of communication unit 31, communication unit 32, and diagnostic unit 36.

Controller 35 of vehicle diagnostic device 106 controls diagnostic unit 36 to perform diagnosis of vehicle 50 when the operational state of at least one of the plurality of electrical apparatuses changes. For example, "when the operational state of an electrical apparatus changes" means when the lighting state of a lighting apparatus, which is an electrical apparatus, changes, when motion sensor 66, which is an electrical apparatus, detects the owner, when bedroom switch 67, which is an electrical apparatus, is turned off, or when door switch 68, which is an electrical apparatus, is turned on.

When diagnostic unit 36 perform the diagnosis described above via communication unit 31, vehicle diagnostic device 10B according to Variation 2 limits the communication with the plurality of electrical apparatuses via the network and communication unit 32 to only a predetermined communication, such as identification (ID) authentication, and controls diagnostic unit 36 to perform the diagnosis in this state. After the diagnosis ends, vehicle diagnostic device 10B returns the communication with the plurality of electrical apparatuses to the original communication state through communication unit 32. In this way, by limiting the communication with the plurality of electrical apparatuses to only a predetermined communication when performing diagnosis of hacking of vehicle 50, the hacked vehicle 50 can be prevented from adversely affecting the plurality of electrical apparatuses, for example.

Although an example has been shown above in which, in vehicle diagnostic system 1B according to Variation 2, vehicle diagnostic device 10B performs diagnosis of vehicle 50 while limiting the communication with a plurality of electrical apparatuses to only a predetermined communication, the present disclosure is not limited to this. For example, vehicle diagnostic device 10B may limit the communication with a plurality of electrical apparatuses to only a predetermined communication, then download an operation log of vehicle 50 by communicating with vehicle 50, and then diagnose vehicle 50 based on the operation log in the state where the communication with vehicle 50 is limited to only a predetermined communication.

Embodiment 4

A configuration of vehicle diagnostic system 1C according to Embodiment 4 will be described with reference to FIG. 25 and FIG. 26. In Embodiment 4, an example will be described in which vehicle diagnostic system 1C is formed by lighting device LC and vehicle diagnostic device 10C.

Figure 25:
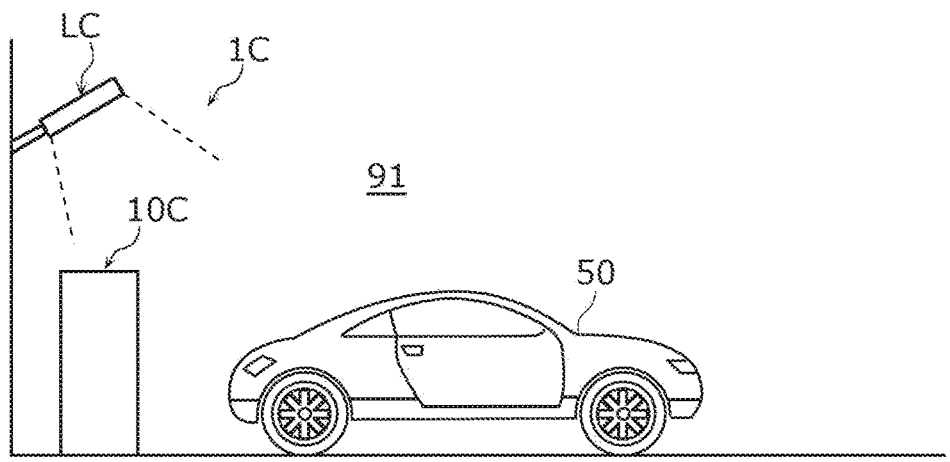
FIG. 25 is a schematic diagram illustrating a vehicle diagnostic system according to Embodiment 4.

FIG. 25 is a schematic diagram illustrating vehicle diagnostic system 1C according to Embodiment 4.

Lighting device LC and vehicle diagnostic device 10C of vehicle diagnostic system 1C are installed in parking space 91 in which vehicle 50 is parked. Although lighting device LC is installed on a wall of parking space 91 in FIG. 25, the present disclosure is not limited to this, and lighting device LC may be installed on a ceiling, a pillar or the like of parking space 91, FIG. 26 is a block diagram illustrating a configuration of vehicle diagnostic system 1C. FIG. 26 also illustrates a computer communicatively connected to vehicle diagnostic system 1C via a network.

Figure 26:
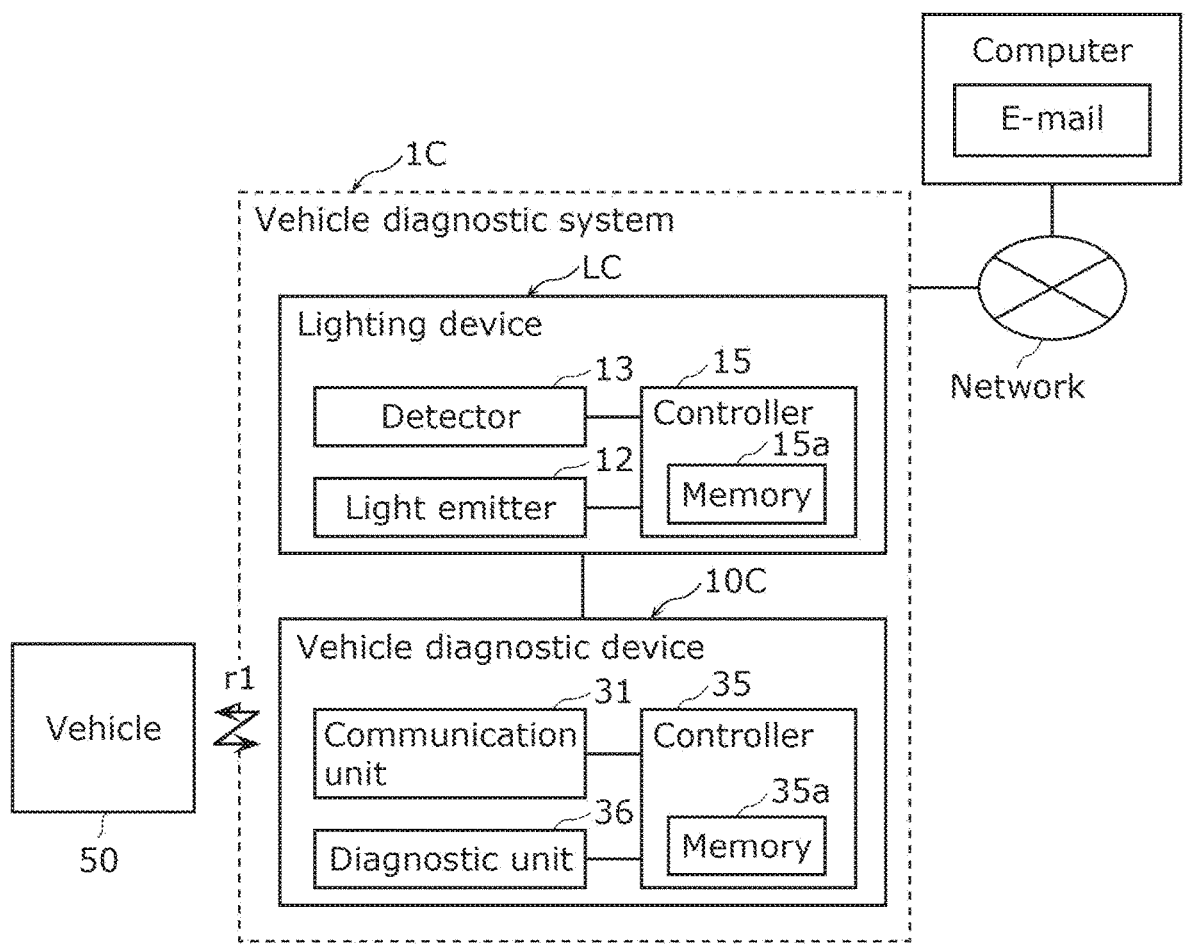
FIG. 26 is a block diagram illustrating a configuration of the vehicle diagnostic system according to Embodiment 4.

As shown in FIG. 26, vehicle diagnostic system 1C is formed by lighting device LC and vehicle diagnostic device 10C. Lighting device LC includes light emitter 12 that can emit illumination light, detector 13 that detects vehicle 50, and controller 15 that controls operations of light emitter 12 and detector 13. Vehicle diagnostic device 10C includes communication unit 31 that communicates with vehicle 50, diagnostic unit 36 that diagnoses vehicle 50 as to whether an autonomous driving program of vehicle 50 is being hacked, and controller 35 that controls operations of communication unit 31 and diagnostic unit 36.

Light emitter 12 of lighting device LC is a light source that emits illumination light, and is a liquid crystal projector that projects a static image or moving image, or an LED light emitting module that emits light of red color, green color, or blue color, or synthetic light of these colors, for example. Light emitter 12 may be a combination of separate SMDs and COBs of RGB, incandescent bulb color, neutral white color, and other colors. Light emitter 12 is provided at a position higher than the height of vehicle 50, in order to illuminate vehicle 50 and surroundings of vehicle 50.

Detector 13 of lighting device LC is a sensor that detects the presence or absence of vehicle 50 in parking space 91, such as an image sensor, an infrared sensor, or a laser sensor. Detector 13 is constantly operating, and detects whether vehicle 50 is parked in parking space 91. In the present embodiment, light emitter 12 is turned on in response to detector 13 detecting vehicle 50, and vehicle diagnostic device 10C is enabled to diagnose vehicle 50 in response to turning on of light emitter 12.

Communication unit 31 of vehicle diagnostic device 10C is a communication module that communicates with vehicle 50 by radio r1. The communication scheme based on radio r1 has already been described above.

Controller 35 of vehicle diagnostic device 10C is formed by a microprocessor, memory 35a, and a program stored in memory 35a, for example. Memory 35a stores identification information on vehicle 50, such as a license plate number. An operation log and a diagnosis result of vehicle 50 described later are also recorded in memory 35a.

When detector 13 detects vehicle 50, and controller 35 obtains the detection information from lighting device LC, for example, controller 35 transmits, to vehicle 50, a request signal that requests for the identification information on vehicle 50 via communication unit 31. Controller 35 issues a diagnosis command to diagnostic unit 36 to make diagnostic unit 36 diagnose vehicle 50, when the identification information on vehicle 50 transmitted from vehicle 50 agrees with identification information registered in advance.

Instead of transmitting the request signal described above, controller 35 may establish a communication with vehicle 50, which is triggered by visible light communication from light emitter 12 to vehicle 50, and obtain the identification information on vehicle 50. Alternatively, controller 35 may obtain the identification information on vehicle 50 by imaging the license plate by means of detector 13. Instead of using detector 13, controller 35 may obtain the identification information on vehicle 50 by requesting for transmission of the identification information from vehicle 50 by regularly transmitting a beacon signal from communication unit 31. That is, controller 35 may detect vehicle 50 by means of communication unit 31 and then perform diagnosis via communication unit 31.

Diagnostic unit 36 is a circuit that diagnoses, via communication unit 31, whether vehicle 50 is being hacked. When the lighting state of light emitter 12 changes, for example, diagnostic unit 36 perform diagnosis of vehicle 50 parked in parking space 91. Specifically, diagnostic unit 36 performs diagnosis of the presence of hacking of vehicle 50 when light emitter 12 changes from the off state to the on state and diagnostic unit 36 has received a diagnosis command from controller 35.

Diagnostic unit 36 may perform the diagnosis not only when light emitter 12 changes from the off state to the on state but also when light emitter 12 changes from the on state to the off state or the dimmed state or when the lighting color changes. Furthermore, diagnostic unit 36 may end the diagnosis of the presence of hacking of vehicle 50 when the lighting state changes again after light emitter 12 changes from the on state to the off state or the dimmed state or after the lighting color changes.

There are three examples of the vehicle diagnosis by diagnostic unit 36.

A first diagnosis example is an example in which a vehicle diagnosis is performed based on an answer to a question asked to vehicle 50 by vehicle diagnostic device 10C. Diagnostic unit 36 asks vehicle 50 a plurality of questions, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 36 checks the resilience of the software in vehicle 50 via communication unit 31, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 36 obtains the operation log of vehicle 50 via communication unit 31, and diagnoses that vehicle 50 has been hacked when vehicle 50 is not following a predetermined operational regulation.

When diagnostic unit 36 has diagnosed that vehicle 50 is being hacked, controller 35 notifies that vehicle 50 is being hacked using illumination light from light emitter 12. For example, when light emitter 12 is a liquid crystal projector, controller 35 notifies information regarding hacking by illuminating vehicle 50 or parking space 91 with a static image or moving image projected by light emitter 12.

In this way, the user of vehicle 50 can know whether vehicle 50 is being hacked. Therefore, the user can take measures to cope with the hacked vehicle 50, and reduce damage due to the hacking of vehicle 50.

In another example of the notification of the diagnosis result, vehicle diagnostic system 1C may notify a computer communicatively connected to vehicle diagnostic system 1C via a network of the diagnosis result (see FIG. 26). For example, vehicle diagnostic system 1C may transmit the diagnosis result to a management server that is a computer owned by a dealer of vehicle 50. Vehicle diagnostic system 1C may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

Embodiment 5

5-1. Configuration of Vehicle Diagnostic System

A configuration of vehicle diagnostic system 1D according to Embodiment 5 will be described with reference to FIG. 27 to FIG. 29. In Embodiment 5, an example will be described in which vehicle diagnostic device 10D diagnoses vehicle 50 parked in parking space 91 that is a public parking space.

Figure 27:
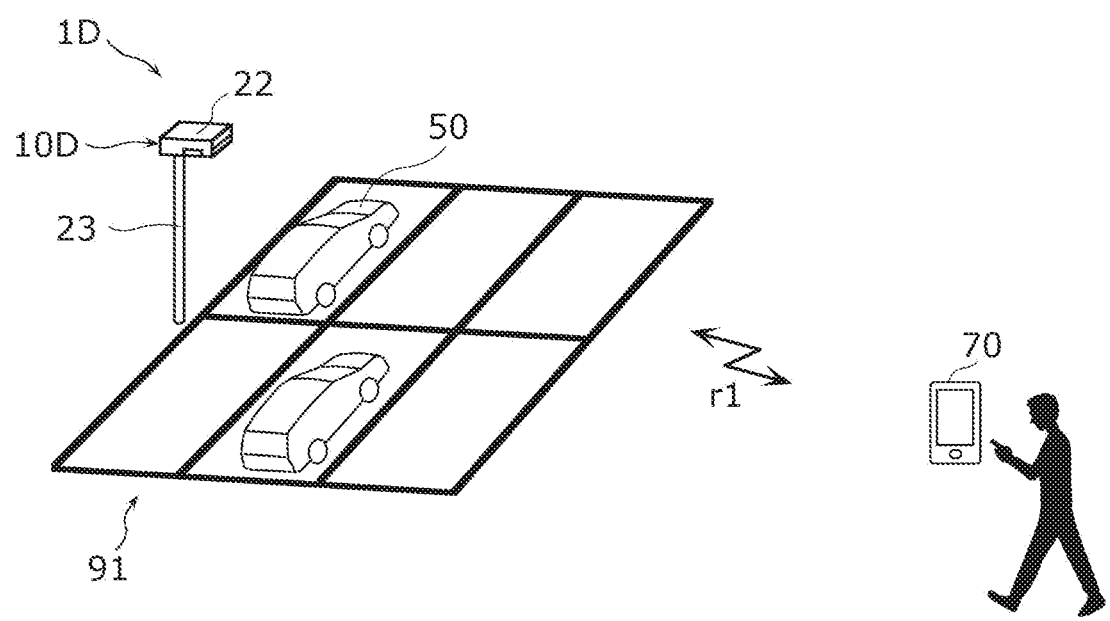
FIG. 27 is a schematic diagram illustrating a vehicle diagnostic system according to Embodiment 5.

FIG. 27 is a schematic diagram illustrating vehicle diagnostic system 1D according to Embodiment 5.

As shown in FIG. 27, vehicle diagnostic system 1D includes vehicle diagnostic device 10D provided at a side of parking space 91, and information terminal 70 that communicates with vehicle diagnostic device 10D. Information terminal 70 is a portable terminal held by the owner of vehicle 50. Although FIG. 27 illustrates one vehicle diagnostic device 10D, vehicle diagnostic system 1D may include a plurality of vehicle diagnostic devices 10D.

Vehicle diagnostic device 10D further has a function of emitting illumination light to parking space 91. Vehicle diagnostic device 10D may be a street light or a security light in the outdoors, for example. Vehicle diagnostic device 10D may be installed in a parking space of a park, the premises of an apartment building, or the premises of a factory, for example.

Vehicle diagnostic device 10D includes pole body 23 installed at a side of parking space 91, and lamp 22 provided on pole body 23. Pole body 23 is a columnar member, and is a utility pole on which a distribution line is provided, a pole of a street light, or a pole to which a security camera is attached, for example, Pole body 23 may have an L-shape or T-shape, FIG. 28 is a block diagram illustrating a configuration of vehicle diagnostic system 1D. FIG. 29 is a schematic diagram illustrating vehicle diagnostic device 10D of vehicle diagnostic system 1D. FIG. 28 also illustrates a computer communicatively connected to vehicle diagnostic system 1D via a network.

Figure 28:
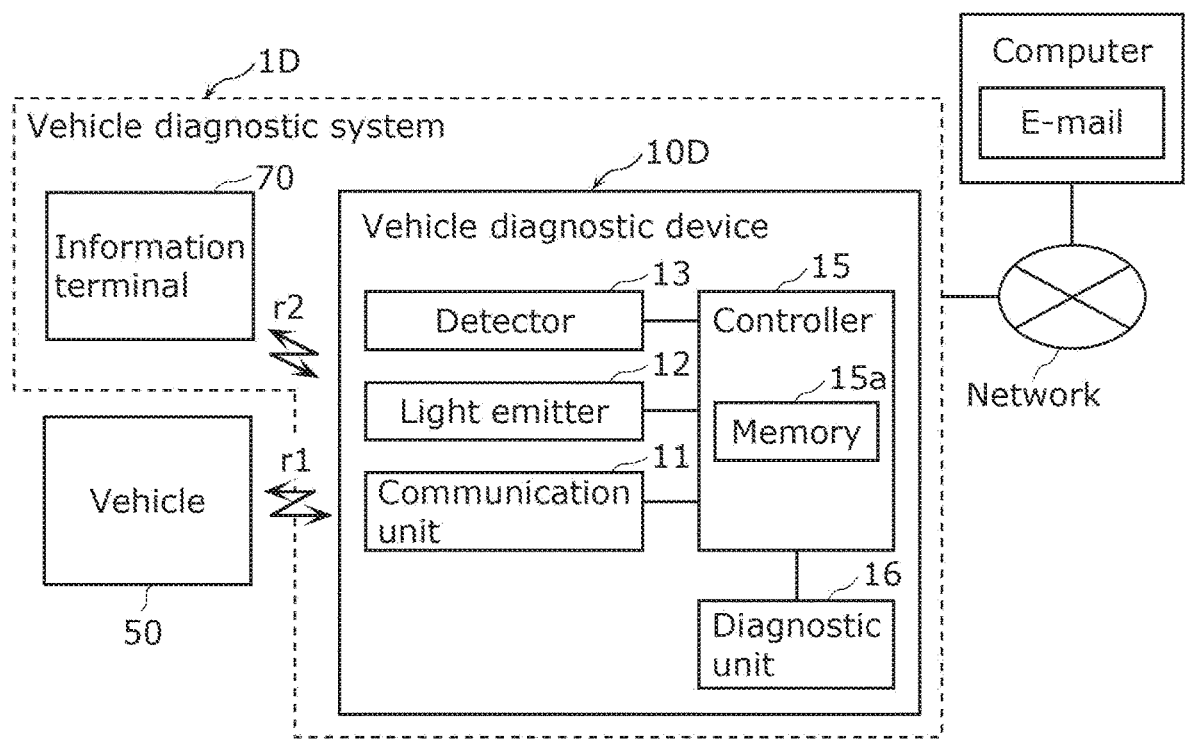
FIG. 28 is a block diagram illustrating a configuration of the vehicle diagnostic system according to Embodiment 5.

As shown in FIG. 28, vehicle diagnostic device 10D includes communication unit 11, light emitter 12, detector 13, controller 15, and diagnostic unit 16.

Communication unit 11 is a communication module that communicates with vehicle 50 by radio r1, and communicates with information terminal 70 by radio r2. The communication scheme based on radio r2 may be Bluetooth®, Zigbee®, or WiFi®, for example. Communication unit 11 may be capable of communicating with information terminal 70 via a network (not shown), such as the Internet, Communication unit 11 transmits a diagnosis result obtained by diagnostic unit 16 to information terminal 70 using radio r2, for example.

Figure 29:
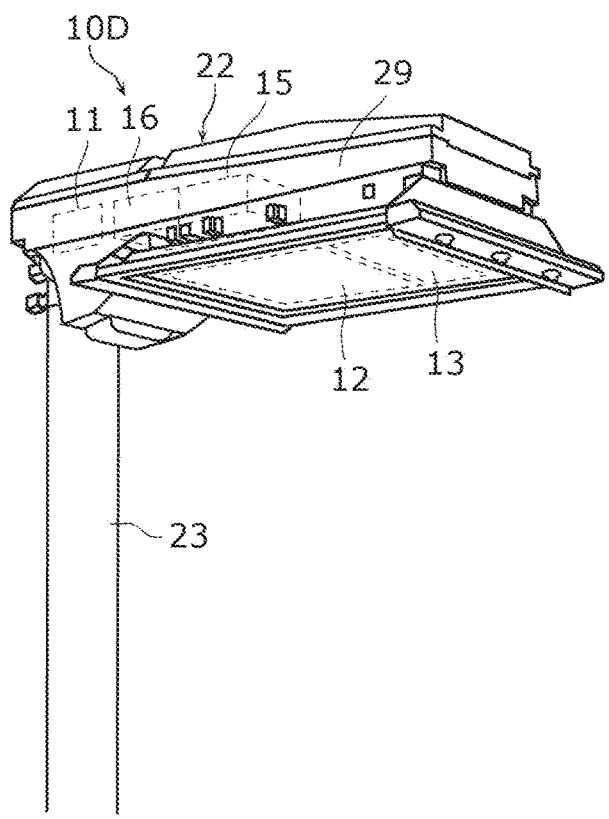
FIG. 29 is a schematic diagram illustrating a vehicle diagnostic device of the vehicle diagnostic system according to Embodiment 5.

As shown in FIG. 29, vehicle diagnostic device 10D has housing 29, which is a housing case. Communication unit 11, light emitter 12, detector 13, controller 15, and diagnostic unit 16 are provided in housing 29 or on an outer surface of housing 29. Housing 29 is fixed to pole body 23 with a ring member or a fastener member; for example. Communication unit 11, light emitter 12, detector 13, controller 15, and diagnostic unit 16 may be housed in pole body 23, rather than in housing 29, or may be provided in a notch or hole formed on pole body 23.

Housing 29 is provided at an upper part of pole body 23, for example, at a height of at least 4.5 m and at most 15 m from the ground surface of parking space 91. Housing 29 has a rectangular parallelepiped shape, for example, and is made of metal, resin or other materials.

Light emitter 12 emits illumination light to vehicle 50 or parking space 91. Light emitter 12 is a liquid crystal projector that projects a static image or moving image, or an LED light emitting module that emits white light. Light emitter 12 may be a combination of separate SMDs and COBS of RGB, incandescent bulb color, neutral white color or other colors. When light emitter 12 is a liquid crystal projector, vehicle diagnostic device 10D can notify information regarding the hacking of vehicle 50 by using a static image or moving image.

Detector 13 is a sensor that detects vehicle 50 in parking space 91. Detector 13 is an image sensor, an infrared sensor, or a laser sensor, for example. Detector 13 is constantly operating, and constantly detects the presence or absence of vehicle 50 in a predetermined area of parking space 91. Detection information from detector 13 is output to controller 15.

Controller 15 is a circuit that controls operations of communication unit 11, light emitter 12, detector 13, and diagnostic unit 16. Controller 15 is formed by a microprocessor, memory 15a, and a program stored in memory 15a, for example. Memory 15a stores identification information on information terminal 70.

When detector 13 detects vehicle 50 capable of autonomous driving, controller 15 issues a diagnosis command to diagnostic unit 16 to start diagnosis of vehicle 50.

Instead of using detector 13 to detect whether or not vehicle is autonomously driving, controller 15 may establish a communication with vehicle 50, which is triggered by visible light communication from light emitter 12 to vehicle 50, and obtain information for determining whether or not vehicle 50 is autonomously driving. Alternatively, instead of using detector 13 to detect whether or not vehicle 50 is autonomously driving, controller 15 may determine whether or not vehicle 50 autonomously driving by requesting for information for determining whether or not vehicle 50 is autonomously driving from parked vehicle 50 by regularly transmitting a beacon signal from communication unit 11.

Diagnostic unit 16 is a circuit that diagnoses, via communication unit 11, whether vehicle 50 is being hacked. Diagnostic unit 16 performs diagnosis of the presence of hacking when light emitter 12 is in the off state or on state, and diagnostic unit 16 has received a diagnosis command from controller 15, for example.

There are three examples of the vehicle diagnosis by diagnostic unit 16.

A first diagnosis example is an example in which a vehicle diagnosis is performed based on an answer to a question asked to vehicle 50 by vehicle diagnostic device 10D. Diagnostic unit 16 asks vehicle 50 a plurality of questions, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 16 checks the resilience of the software in vehicle 50 via communication unit 11, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 16 obtains the operation log of vehicle 50 via communication unit 11, and diagnoses that vehicle 50 has been hacked when vehicle 50 is not following a predetermined operational regulation.

When diagnostic unit 16 has diagnosed that vehicle 50 is being hacked, controller 15 notifies information terminal 70 that vehicle 50 is being hacked.

Information terminal 70 is a terminal, such as a smartphone, a tablet terminal, or a personal computer (PC). Application software for browsing information on the diagnosis result of vehicle 50 is installed in information terminal 70. Information terminal 70 obtains information on the diagnosis result from vehicle diagnostic device 10D by radio r2, and displays the information on a screen.

The owner having obtained information on the diagnosis result from information terminal 70 can immediately take measures to cope with the hacked vehicle 50. In this way, damage due to the hacking of vehicle 50 can be reduced.

In another example of the notification of the diagnosis result, vehicle diagnostic system 1D may notify a computer communicatively connected to vehicle diagnostic system 1D via a network of the diagnosis result (see FIG. 28). For example, vehicle diagnostic system 1D may transmit the diagnosis result to a management server that is a computer owned by a dealer of vehicle 50. Vehicle diagnostic system 1D may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

5-2. Operation of Vehicle Diagnostic System

Next, an operation of vehicle diagnostic system 1D according to Embodiment 5 will be described, FIG. 30 is a flowchart illustrating an example of an operation of vehicle diagnostic system 1D.

First, the owner of vehicle 50 parks vehicle 50 in parking space 91 (Step S41).

After vehicle 50 is parked in parking space 91, when the owner holding information terminal 70 leaves a predetermined distance or more from parking space 91 (Step S42), vehicle diagnostic system 1D starts diagnosis of vehicle 50 (Step S43). The predetermined distance is a distance from an entrance/exit of parking space 91 to a different place than parking space 91 or a passage, and is greater than or equal to 5 m or greater than or equal to 10 m, for example. Vehicle diagnostic system 1D can obtain information on whether the owner has left parking space 91 the predetermined distance or more from parking space 91 by loading position information on information terminal 70.

When the owner comes within a predetermined distance from parking space 91 in order to use vehicle 50 (Step S44), vehicle diagnostic system 1D ends the diagnosis of vehicle 50 (Step S45). When ending the vehicle diagnosis, vehicle diagnostic system 1D records the diagnosis result in memory 15*a*. With vehicle diagnostic system 1D, the presence of hacking of vehicle 50 can be diagnosed at an opportunity where vehicle 50 is parked in parking space 91. In this way, damage due to the hacking of vehicle 50 can be reduced.

Embodiment 6

Figure 31:
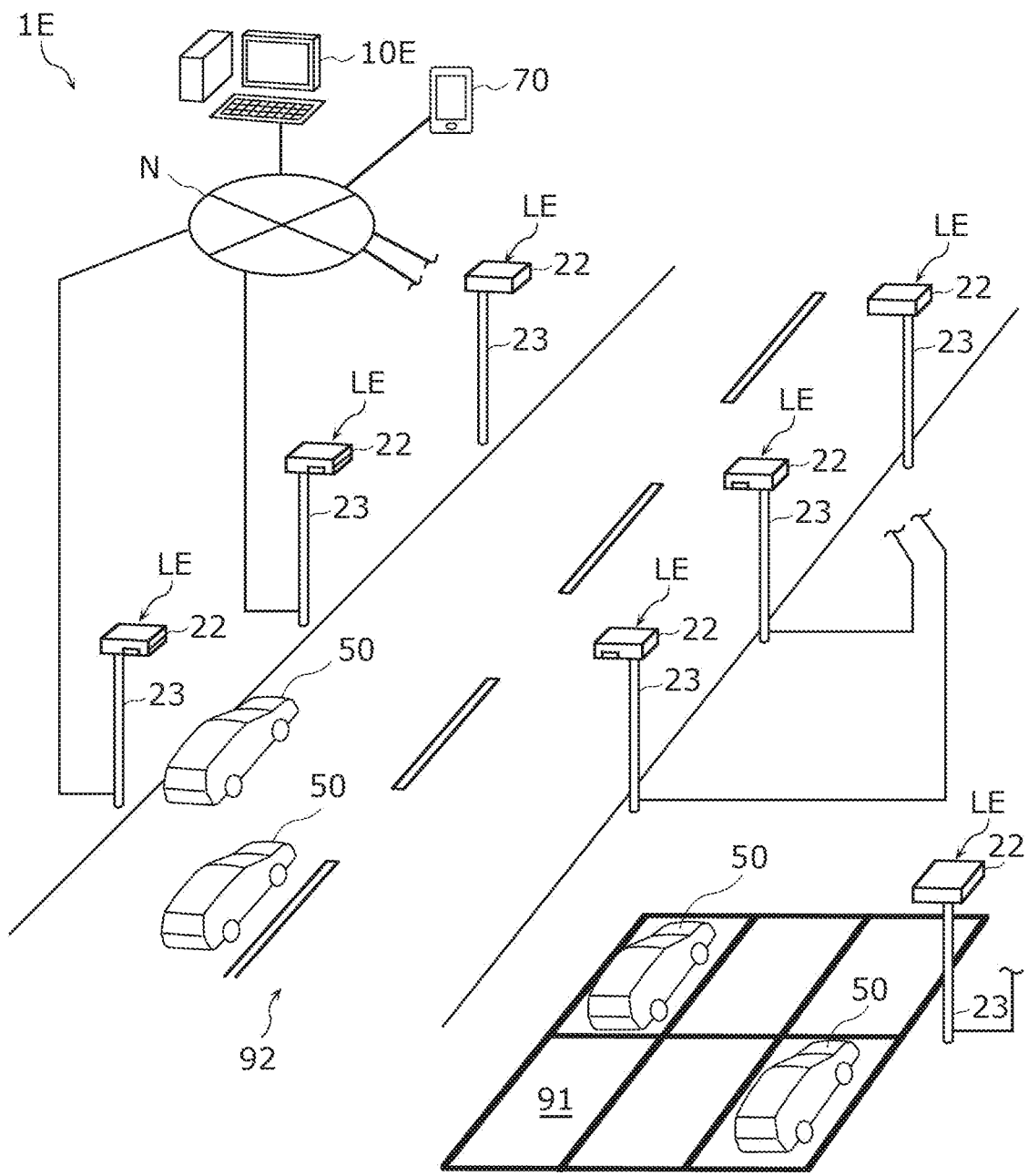
FIG. 31 is a schematic diagram illustrating a vehicle diagnostic system according to Embodiment 6.

A configuration of vehicle diagnostic system 1E according to Embodiment 6 will be described with reference to FIG. 31 to FIG. 32. In Embodiment 6, an example will be described in which vehicle 50 that is traveling, vehicle 50 that is stopped, and vehicle 50 that is parked are diagnosed, FIG. 31 is a schematic diagram illustrating vehicle diagnostic system 1E. As shown in FIG. 31. Vehicle diagnostic system 1E includes a plurality of lighting devices LE provided at a side of road and parking space 91, and vehicle diagnostic device 10E communicatively connected to the plurality of lighting devices LE via network N, such as the Internet. FIG. 31 also illustrates information terminal 70 communicatively connected to vehicle diagnostic device 10E via network N.

Lighting device LE is a device that emits illumination light to road 92 and parking space 91, and is an outdoor lighting device, such as a street light or a security light.

Lighting device LE includes pole body 23 installed at a side of road 92 or parking space 91, and lamp 22 provided on pole body 23.

Pole body 23 is a columnar member, and is a utility pole on which a distribution line is provided, a pole of a street light, or a pole to which a security camera is attached, for example. Pole body 23 may have an L-shape or T-shape. A plurality of pole bodies 23 are arranged at predetermined intervals, such as intervals of at least 20 m and at most 50 m, along an edge of road 92, and a plurality of lamps 22 are also arranged at the same predetermined intervals.

Figure 32:
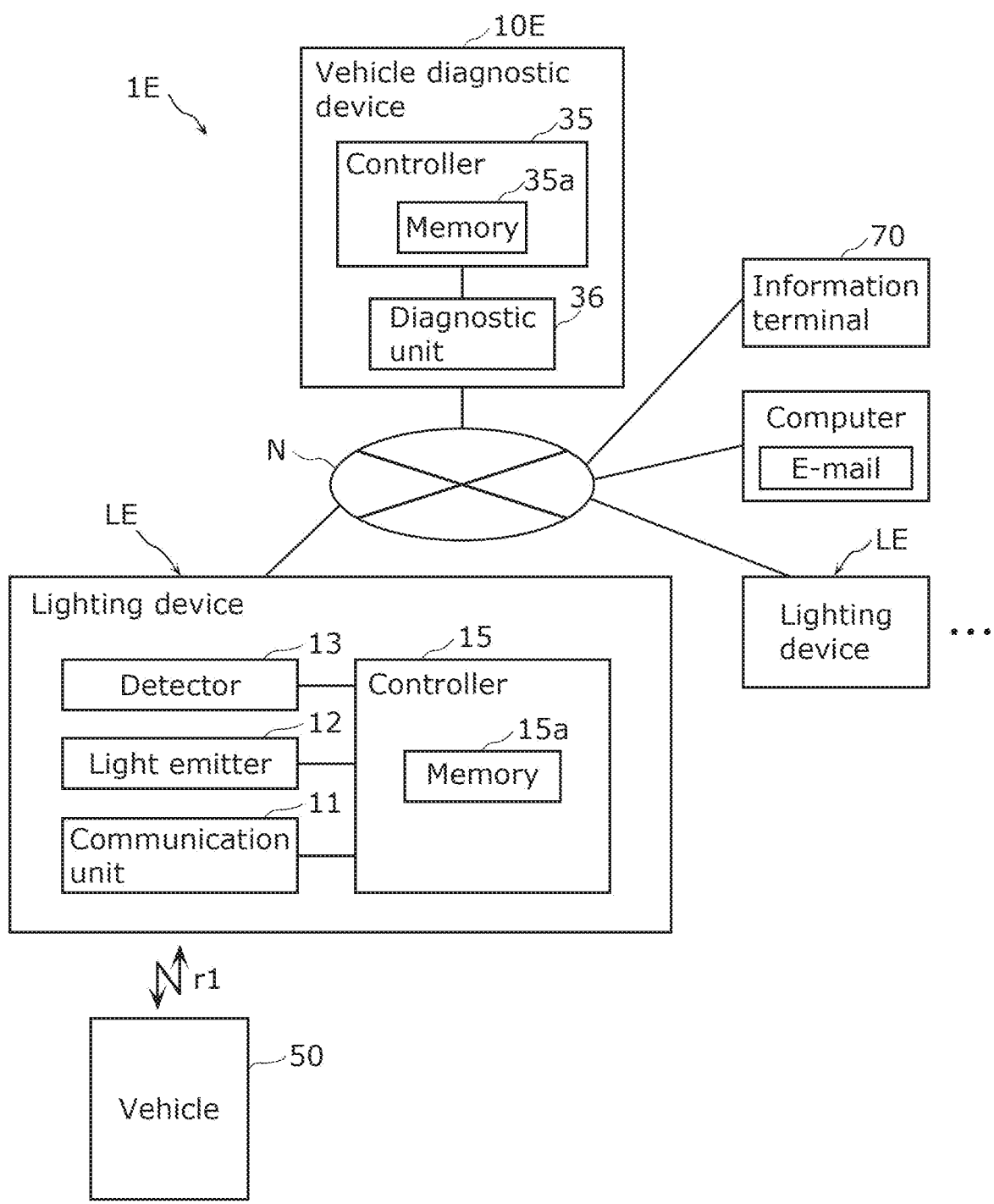
FIG. 32 is a block diagram illustrating a configuration of the vehicle diagnostic system according to Embodiment 6.

FIG. 32 is a block diagram illustrating a configuration of vehicle diagnostic system 1E. FIG. 32 also illustrates a computer communicatively connected to vehicle diagnostic system 1E via a network.

As shown in FIG. 32, lighting device LE includes communication unit 11, light emitter 12, detector 13, and controller 15. Vehicle diagnostic device 10E includes controller 35 and diagnostic unit 36.

Communication unit 11 is a communication module that communicates with vehicle 50 by radio r1, and communicates with vehicle diagnostic device 10E by wire. Communication unit 11 transmits detection information from detector 13 to vehicle diagnostic device 10E via network N, for example.

Lamp 22 has housing 29, which is a housing case. Communication unit 11, light emitter 12, detector 13, and controller 15 are provided in housing 29 or on an outer surface of housing 29. Housing 29 is fixed to pole body 23 with a ring member or a fastener member, for example. Communication unit 11, light emitter 12, detector 13, and controller 15 may be housed in pole body 23, rather than in housing 29, or may be provided in a notch or hole formed on pole body 23.

Housing 29 is provided at an upper part of pole body 23, for example, at a height of at least 4.5 m and at most 15 m from the ground surface of road 92. Housing 29 has a rectangular parallelepiped shape, for example, and is provided on pole body 23 so as to protrude toward the center of road 92 from pole body 23. Housing 29 is made of metal, resin or other materials.

Light emitter 12 emits illumination light to road 92, parking space 91, and vehicle 50. Light emitter 12 is a liquid crystal projector that projects a static image or moving image, or an LED light emitting module that emits white light. Light emitter 12 may be a combination of separate SMDs and COBs RGB, incandescent bulb color, neutral white color or other colors. When light emitter 12 is a liquid crystal projector, lighting device LE can notify information regarding the hacking of vehicle 50 by using a static image or moving image.

Detector 13 is a sensor that detects vehicle 50 on road 92 or in parking space 91. Detector 13 is provided in each of a plurality of pole bodies 23 installed along road 92 and a plurality of pole bodies 23 installed in parking space 91 as shown in FIG. 31. Detector 13 is an image sensor, an infrared sensor, or a laser sensor, for example, Detector 13 is constantly operating, and constantly detects the presence or absence of vehicle 50 in a predetermined area of road 92 or parking space 91. Detection information from detector 13 is output to vehicle diagnostic device 10E via controller 15 and communication unit 11.

Controller 15 of lighting device LE is a circuit that controls operations of communication unit 11, light emitter 12, and detector 13. Controller 15 is formed by a microprocessor, memory 15a, and a program stored in memory 15a, for example.

Controller 35 of vehicle diagnostic device 10E is formed by a microprocessor, memory 35a, and a program stored in memory 35a, for example. Memory 35a stores identification information on vehicle 50, such as a license plate number. An operation log and a diagnosis result of vehicle 50 are also recorded in memory 35a.

When detector 13 detects vehicle 50 capable of autonomous driving and controller 35 obtains the detection information via network N, controller 35 issues a diagnosis command to diagnostic unit 36 to start diagnosis of vehicle 50.

Controller 35 may use detector 13 to determine whether vehicle 50 is traveling, stopped, or parked. Controller 35 may also use an acceleration sensor or the like provided in vehicle 50 to determine whether vehicle 50 is traveling, stopped, or parked.

Instead of using detector 13 to detect whether or not vehicle is autonomously driving, controller 35 may establish a communication with vehicle 50, which is triggered by visible light communication from light emitter 12 to vehicle 50, and obtain information for determining whether or not vehicle 50 is autonomously driving. Alternatively, instead of using detector 13 to detect whether or not vehicle 50 is autonomously driving, controller 35 may determine whether or not vehicle 50 is autonomously driving by requesting for information for determining whether or not vehicle 50 is autonomously driving from traveling or parked vehicle 50 by regularly transmitting a beacon signal from communication unit 11.

Diagnostic unit 36 is a circuit that diagnoses, via network N and communication unit 11, whether vehicle 50 is being hacked. When diagnostic unit 36 has received a diagnosis command from controller 35, for example, diagnostic unit 36 performs transmission and reception of data between diagnostic unit 36 and vehicle 50 via network N and communication unit 11 and performs diagnosis the presence of hacking of vehicle 50 based on the transmitted and received data. When diagnosing the presence of hacking of traveling vehicle 50, diagnostic unit 36 may perform the diagnosis by sequentially changing from one lighting device LE to another lighting device LE of the plurality of lighting devices LE to communicate with vehicle 50.

There are three examples of the vehicle diagnosis by diagnostic unit 36.

A first diagnosis example is an example in which a vehicle diagnosis is performed based on an answer to a question asked to vehicle 50 by lighting device LE. Diagnostic unit 36 asks vehicle 50 a plurality of questions via lighting device LE, and determines whether vehicle 50 is being hacked based on at least one of the answering time or the answer tendency to the questions.

A second diagnosis example is an example in which a vehicle diagnosis is performed by checking the resilience of software that runs a travel system provided in vehicle 50. Diagnostic unit 36 checks the resilience of the software in vehicle 50 via communication unit 11 of lighting device LE, and diagnoses that vehicle 50 is being hacked when the resilience level is lower than a predetermined level.

A third diagnosis example is an example in which an operation log of vehicle 50 is obtained, and a vehicle diagnosis is performed based on the operation log. Diagnostic unit 36 obtains the operation log of vehicle 50 via communication unit 11 of lighting device LE, and diagnoses that vehicle 50 has been hacked when vehicle 50 is not following a predetermined operational regulation.

When diagnostic unit 36 has diagnosed that vehicle 50 is being hacked, controller 35 notifies information terminal 70 that vehicle 50 is being hacked.

Information terminal 70 is a terminal, such as a smartphone, a tablet terminal, or a PC. Application software for browsing information on the diagnosis result of vehicle 50 is installed in information terminal 70. Information terminal 70 obtains information on the diagnosis result via network N, and displays the information on a screen.

The owner having obtained information on the diagnosis result from information terminal 70 can immediately take measures to cope with the hacked vehicle 50. In this way, damage due to the hacking of vehicle 50 can be reduced.

In another example of the notification of the diagnosis result, vehicle diagnostic system 1E may notify a computer communicatively connected to vehicle diagnostic system 1E via network N of the diagnosis result (see FIG. 32). For example, vehicle diagnostic system 1E may transmit the diagnosis result to a management server that is a computer owned by a dealer of vehicle 50. Vehicle diagnostic system 1E may also notify of the diagnosis result by transmitting an e-mail to an e-mail address registered by the owner or dealer in advance. This allows the owner or dealer to take measures to cope with the hacked vehicle 50 and reduce damage due to the hacking of vehicle 50.

Figure 33:
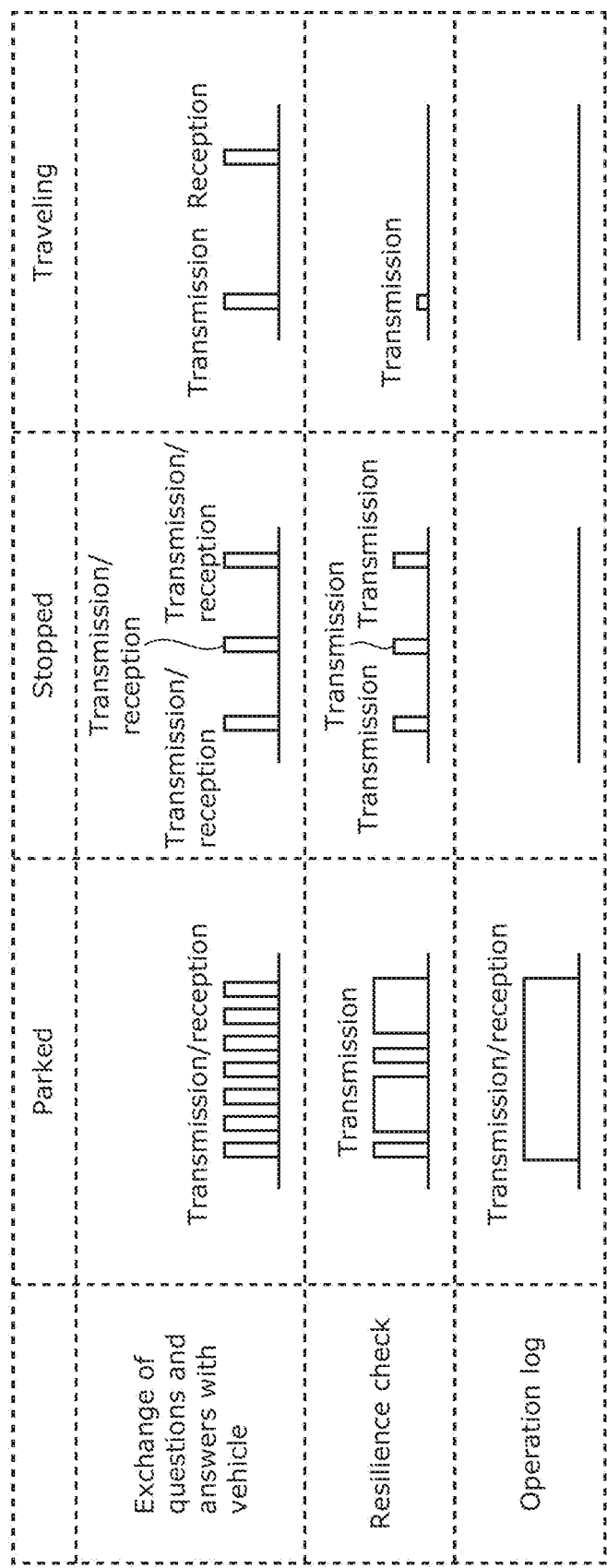
FIG. 33 is a diagram illustrating an example of operations of the vehicle diagnostic system according to Embodiment 6.

FIG. 33 is a diagram illustrating an example of operations of vehicle diagnostic system 1E. FIG. 33 illustrates that the amount of data and the timing of communication of the communication with vehicle 50 vary depending on whether vehicle 50 is parked, stopped, or traveling. That is, in the diagnosis by diagnostic unit 36 of vehicle diagnostic system 1E, at least one of the duration of diagnosis or the amount of diagnosis varies depending on whether vehicle 50 is parked, stopped, or traveling.

For example, when diagnostic unit 36 has determined that vehicle 50 is parked, diagnostic unit 36 may perform diagnosis by setting at least one of the duration of diagnosis or the amount of diagnosis to be greater than when vehicle 50 is traveling or stopped. When diagnostic unit 36 has determined that vehicle 50 is stopped, diagnostic unit 36 may perform diagnosis by setting at least one of the duration of diagnosis or the amount of diagnosis to be greater than when vehicle 50 is traveling and setting at least one of the duration of diagnosis or the amount of diagnosis to be smaller than when vehicle 50 is parked. When diagnostic unit 36 has determined that vehicle 50 is traveling, diagnostic unit 36 may perform diagnosis by setting at least one of the duration of diagnosis or the amount of diagnosis to be smaller than when vehicle 50 is stopped or parked.

For example, when vehicle 50 is parked, a longer duration of diagnosis and a larger amount of diagnosis can be secured, so that of the three diagnosis examples described above, the diagnosis based on questions and answers exchanged with the vehicle, the diagnosis based on the resilience check, or the diagnosis based on the operation log is performed. When vehicle 50 is stopped, the duration of diagnosis and the amount of diagnosis have to be reduced compared with when the vehicle is parked, only the diagnosis based on questions and answers or the diagnosis based on the resilience check is performed, and the diagnosis based on the operation log is not performed. When vehicle 50 is traveling, the duration of diagnosis and the amount of diagnosis have to be reduced compared with when the vehicle is stopped, the number of questions and answers exchanged with the vehicle, or the amount of data transmitted and received for checking the resilience or the number of data transmissions and receptions for checking the resilience is reduced compared with when the vehicle is stopped. When vehicle 50 is traveling, the diagnosis based on the operation log is not performed.

In this way, vehicle 50 can be appropriately diagnosed when vehicle 50 is parked, stopped, and traveling.

Embodiment 7

Figure 34:
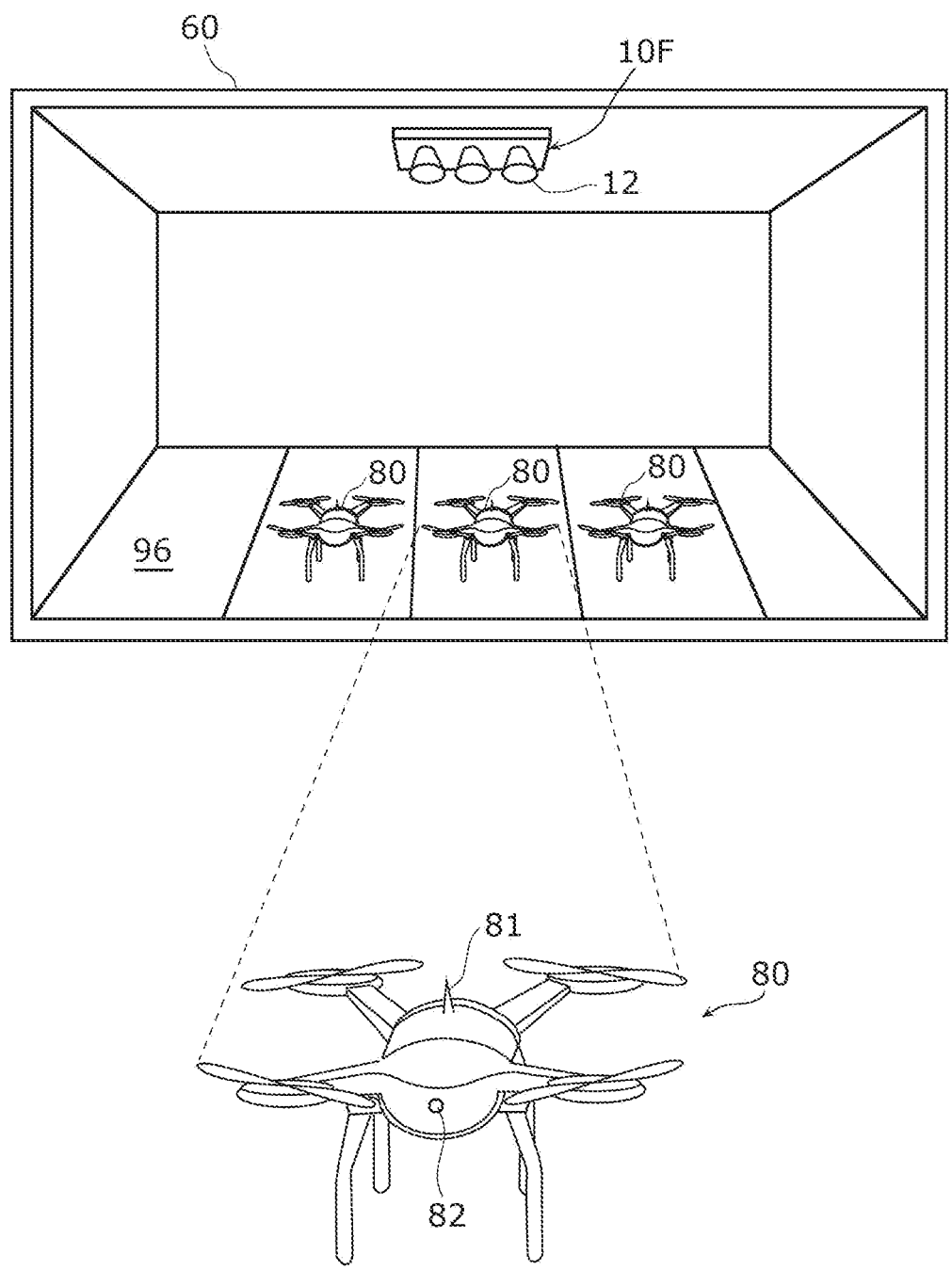
FIG. 34 is a diagram illustrating an example installation of a mobile body diagnostic device according to Embodiment 7.

A configuration of mobile body diagnostic device 10F according to Embodiment 7 will be described with reference to FIG. 34 and FIG. 35. In Embodiment 7, an example will be described in which not only vehicle 50 but also mobile body 80, such as an unmanned aircraft, is diagnosed, FIG. 34 is a diagram illustrating an example installation of mobile body diagnostic device 10F according to Embodiment 7.

Mobile body diagnostic device 10F is installed in waiting area 96 in which mobile body 80 is waiting, and emits illumination light to mobile body 80 and waiting area 96. Although mobile body diagnostic device 10F is installed on an exterior wall of a takeoff and landing site, which is an example of building 60, in FIG. 34, the present disclosure is not limited to this, and mobile body diagnostic device 10F may be installed on a roof, a fence, a pillar or the like of the takeoff and landing site.

Mobile body 80 is an unmanned aircraft capable of autonomous driving, such as a drone or other air vehicles. The autonomous driving means that the mobile body drives autonomously and includes not only unmanned driving but also that the driver is assisted in manipulating the mobile body. Mobile body 80 may be an air vehicle that can switch between a manual driving mode and an autonomous driving mode. Mobile body 80 is provided with communication antenna 81 for communicating with mobile body diagnostic device 10F and camera 82 that recognizes illumination light from mobile body diagnostic device 10F. Mobile body 80 has an AI assistant function.

Figure 35:
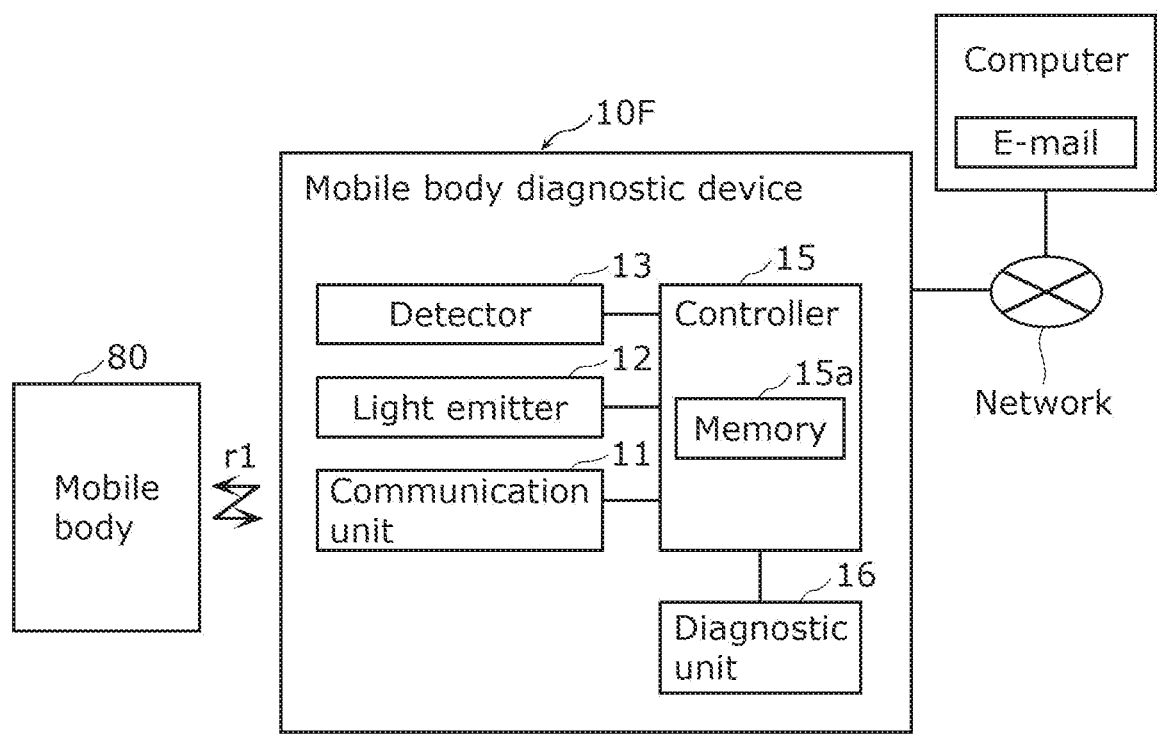
FIG. 35 is a block diagram illustrating a configuration of the mobile body diagnostic device according to Embodiment 7.

FIG. 35 is a block diagram illustrating a configuration of mobile body diagnostic device 10F. FIG. 35 also illustrates a computer communicatively connected to mobile body diagnostic device 10F via a network.

As shown in FIG. 35, mobile body diagnostic device 10F includes communication unit 11 that communicates with mobile body 80, light emitter 12 that can emit illumination light, detector 13 that detects mobile body 80, and diagnostic unit 16 that diagnoses mobile body 80 as to whether an autonomous driving program of mobile body 80 is being hacked. Mobile body diagnostic device 10F further includes controller 15 that controls turning on and off, dimming, and toning of light emitter 12.

Light emitter 12 is a light source that emits illumination light, and is a liquid crystal projector that projects a static image or moving image or an LED light emitting module that emits light of red color, green color, or blue color, or synthetic light of these colors, for example, Light emitter 12 may be a combination of separate SMDs and COBs of RGB, incandescent bulb color, neutral white color, or other colors. Light emitter 12 is provided at a position higher than the height of mobile body 80 waiting on the ground, in order to illuminate mobile body 80 and surroundings of mobile body 80.

Detector 13 is a sensor that detects the presence or absence of mobile body 80 in waiting area 96, such as an image sensor, an infrared sensor, or a laser sensor. Detector 13 is constantly operating, and detects whether mobile body 80 is waiting in waiting area 96. In the present embodiment, light emitter 12 is turned on in response to detector 13 detecting mobile body 80, and diagnostic unit 16 is enabled to diagnose mobile body 80 in response to turning on of light emitter 12.

Communication unit 11 is a communication module that communicates with mobile body 80 by radio r1. The communication scheme based on radio r1 may be Bluetooth®, a specified low power radio using a frequency in the 920 MHz band, Zigbee®, or WiFi®, for example.

Controller 15 is formed by a microprocessor, memory 15a, and a program stored in memory 15a, for example, Memory 15a stores identification information on mobile body 80, such as a mobile body number. An operation log and a diagnosis result of mobile body 80 described later are also recorded in memory 15a. Controller 15 controls turning on and the like of light emitter 12, and controls operations of communication unit 11, detector 13, and diagnostic unit 16.

When detector 13 detects mobile body 80, for example, controller 15 transmits, to mobile body 80, a request signal that requests for the identification information on mobile body 80 via communication unit 11. Controller 15 issues a diagnosis command to diagnostic unit 16 to make diagnostic unit 16 diagnose mobile body 80, when the identification information on mobile body 80 transmitted from mobile body 80 agrees with identification information registered in advance.

Instead of transmitting the request signal described above, controller 15 may establish a communication with mobile body 80, which is triggered by visible light communication from light emitter 12 to mobile body 80, and obtain the identification information on mobile body 80. Controller 15 may obtain the identification information on mobile body 80 by imaging the mobile body number plate by means of detector 13. Instead of using detector 13, controller 15 may obtain the identification information on mobile body 80 by requesting for transmission of the identification information from mobile body 80 by regularly transmitting a beacon signal from communication unit 11. That is, controller 15 may detect mobile body 80 by means of communication unit 11 and then perform diagnosis via communication unit 11.

Diagnostic unit 16 is a circuit that diagnoses, via communication unit 11, whether mobile body 80 is being hacked. When the lighting state of light emitter 12 changes, for example, diagnostic unit 16 performs diagnosis of mobile body 80 waiting in waiting area 96. Specifically diagnostic unit 16 performs diagnosis of the presence of hacking of mobile body 80 when light emitter 12 changes from the off state to the on state and diagnostic unit 16 has received a diagnosis command from controller 15.

Diagnostic unit 16 may perform diagnosis of the presence of hacking of mobile body 80 not only when light emitter 12 changes from the off state to the on state but &so when light emitter 12 changes from the on state to the off state or the dimmed state or when the lighting color changes. Furthermore, diagnostic unit 16 may end the diagnosis of the presence of hacking of mobile body 80 when the lighting state changes again after light emitter 12 changes from the on state to the off state or the dimmed state or after the lighting color changes. Note that the dimmed state is a state in which a toning control is being performed so that the brightness of the light is less than or equal to a predetermined brightness, for example, a state where the lighting is controlled so that the illuminance is 30%. That the lighting color changes means a state where a toning control is performed so that the color temperature changes.

There are three examples of the diagnosis of mobile body 80 by diagnostic unit 16, which are the same as those described above.

A first diagnosis example is an example in which diagnosis of mobile body 80 is performed based on an answer to a question asked to mobile body 80 by mobile body diagnostic device 10F. Diagnostic unit 16 asks mobile body 80 a plurality of questions, and determines whether mobile body 80 is being hacked based on at least one of the answering time or the answer tendency to the questions.

A second diagnosis example is an example in which diagnosis of mobile body 80 is performed by checking the resilience of software that runs a travel system (flight system) provided in mobile body 80. Diagnostic unit 16 checks the resilience of the software in mobile body 80 via communication unit 11, and diagnoses that mobile body 80 is being hacked when the resilience level is lower than a predetermined level.

A third diagnosis example is an example in which an operation log (flight record) of mobile body 80 is obtained, and diagnosis of mobile body 80 is performed based on the operation log. Diagnostic unit 16 obtains the operation log of mobile body 80 via communication unit 11, and diagnoses that mobile body 80 has been hacked when mobile body 80 is not following a predetermined operational regulation.

When diagnostic unit 16 has diagnosed that mobile body 80 is being hacked, controller 15 notifies of the hacking of mobile body 80 using illumination light from light emitter 12. For example, when light emitter 12 is a liquid crystal projector, controller 15 notifies information regarding hacking by illuminating mobile body 80 or waiting area 96 with a static image or moving image projected by light emitter 12.

In this way, a user of mobile body 80 can visually know whether mobile body 80 is being hacked. Therefore, the user can take measures to cope with the hacked mobile body 80, and reduce damage due to the hacking of mobile body 80.

In another example of the notification of the diagnosis result, mobile body diagnostic device 10F may notify a computer communicatively connected to mobile body diagnostic device 10F via a network of the diagnosis result (see FIG. 35). For example, mobile body diagnostic device 10F may transmit the diagnosis result to a management server that is a computer owned by a dealer of mobile body 80. Mobile body diagnostic device 10F may also notify of the diagnosis result by transmitting an e-mail to an e-mail address registered by the owner or dealer in advance. This allows the owner or dealer to take measures to cope with the hacked mobile body 80 and reduce damage due to the hacking of mobile body 80.

Embodiment 8

A configuration of mobile body diagnostic system 1G according to Embodiment 8 will be described with reference to FIG. 36 and FIG. 37. In Embodiment 8, an example will be described in which mobile body 80 that is moving, mobile body 80 that is stopped, and mobile body 80 that is waiting are diagnosed.

FIG. 36 is a schematic diagram illustrating rnobile body diagnostic system 1G according to Embodiment 8. FIG. 36 illustrates a plurality of mobile bodies 80 flying along travel path 97 above a road, and a plurality of mobile bodies 80 having landed in waiting area 96 provided outside the road.

Mobile body diagnostic system 1G according to Embodiment 8 includes a plurality of lighting devices LG, and mobile body diagnostic device 10G communicatively connected to the plurality of lighting devices LG via network N, such as the Internet, FIG. 36 also illustrates information terminal 70 communicatively connected to mobile body diagnostic device 10G via network N.

Lighting device LG is a device that emits illumination light to road 92 that is parallel with travel path 97 along which mobile body 80 moves, and waiting area 96 in which mobile body 80 is waiting, and is an outdoor lighting device, such as a street light or a security light.

Lighting device LG includes pole body 23 installed at a side of road 92 below travel path 97 or waiting area 96, and lamp 22 provided on pole body 23.

Pole body 23 is a columnar member, and is a utility pole on which a distribution line is provided, a pole of a street light, or a pole to which a security camera is attached, for example. Pole body 23 may have an L-shape or T-shape. A plurality of pole bodies 23 are arranged at predetermined intervals, such as intervals of at least 20 m and at most 50 m, along an edge of road 92, and a plurality of lamps 22 are also arranged at the same predetermined intervals. Mobile body 80 may select travel path 97 based on light emitted by a plurality of lamps 22.

Figure 37:
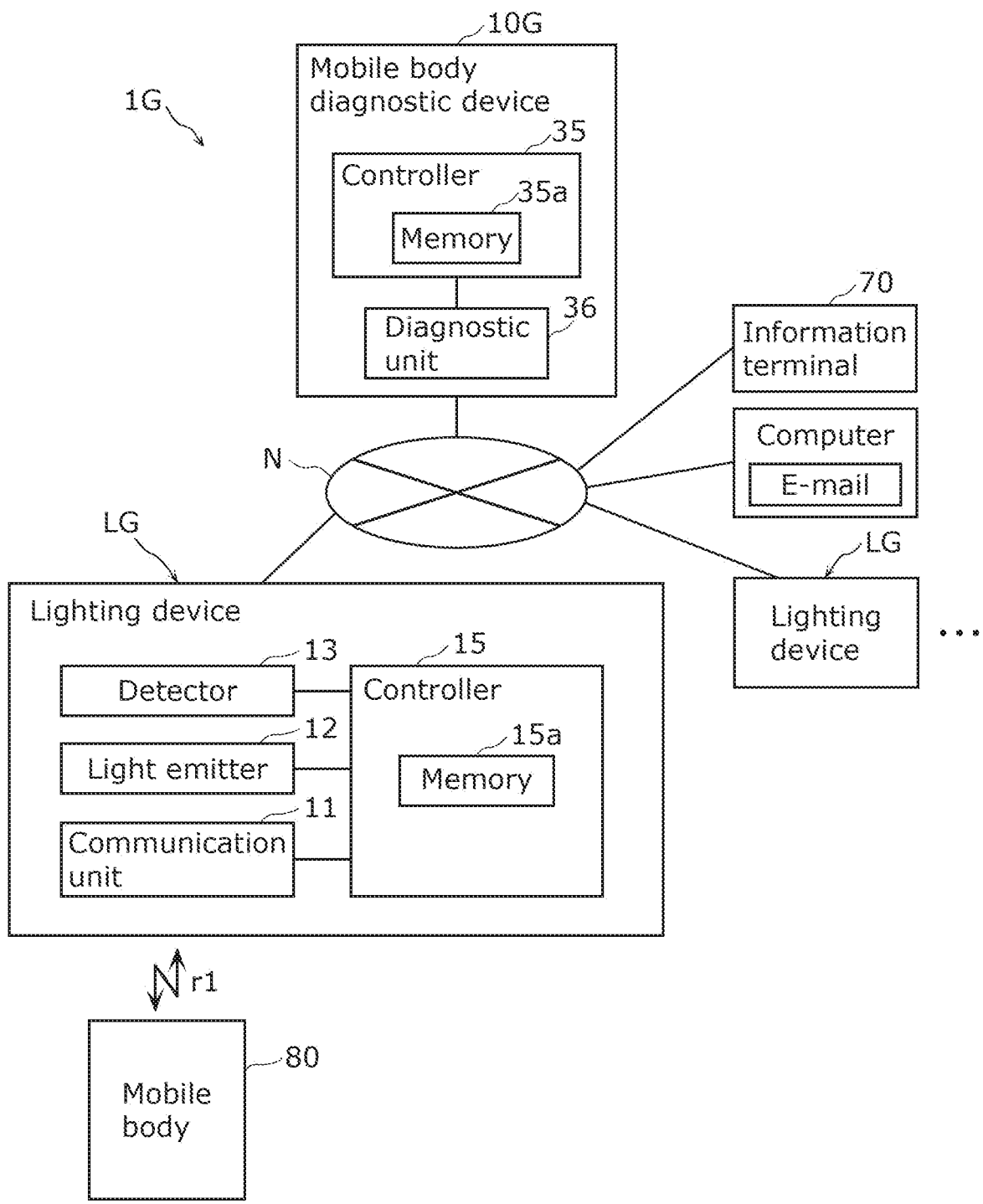
FIG. 37 is a block diagram illustrating a configuration of the mobile body diagnostic system according to Embodiment 8.

FIG. 37 is a block diagram illustrating a configuration of mobile body diagnostic system 1G. FIG. 37 also illustrates a computer communicatively connected to mobile body diagnostic system 1G via a network.

As shown in FIG. 37, lighting device LG includes communication unit 11, light emitter 12, detector 13, and controller 15. Mobile body diagnostic device 10G includes controller 35 and diagnostic unit 36.

Communication unit 11 is a communication module that communicates with mobile body 80 by radio r1, and communicates with mobile body diagnostic device 10G by wire.

Communication unit 11 transmits detection information from detector 13 to mobile body diagnostic device 10G via network N, for example.

Lamp 22 has housing 29, which is a housing case.

Communication unit 11, light emitter 12, detector 13, and controller 15 are provided in housing 29 or on an outer surface of housing 29. Housing 29 is fixed to pole body 23 with a ring member or a fastener member, for example. Communication unit 11, light emitter 12, detector 13, and controller 15 may be housed in pole body 23, rather than in housing 29, or may be provided in a notch or hole formed on pole body 23.

Housing 29 is provided at an upper part of pole body 23 that is lower than travel path 97 of mobile body 80. Housing 29 has a rectangular parallelepiped shape, for example, and is provided on pole body 23 so as to protrude toward the center of travel path 97 from pole body 23. Housing 29 is made of metal, resin or other materials.

Light emitter 12 emits illumination light to road 92 that is parallel with travel path 97, waiting area 96, or mobile body 80. Light emitter 12 is a liquid crystal projector that projects a static image or moving image, or an LED light emitting module that emits white light. Light emitter 12 may be a combination of separate RGB, incandescent, neutral or other SMDs and COBs. When light emitter 12 is a liquid crystal projector, lighting device LG can notify information regarding the hacking of mobile body 80 by using a static image or moving image.

Detector 13 is a sensor that detects mobile body 80 on travel path 97 or in waiting area 96. Detector 13 is provided in each of a plurality of pole bodies 23 installed along travel path 97 or road 92 and a plurality of pole bodies 23 installed in waiting area 96 as shown in FIG. 36. Detector 13 is an image sensor; an infrared sensor, or a laser sensor, for example. Detector 13 is constantly operating, and constantly detects the presence or absence of mobile body 80 in a predetermined area of travel path 97 or waiting area 96. Detection information from detector 13 is output to mobile body diagnostic device 10G via controller 15 and communication unit 11.

Controller 15 of lighting device LG is a circuit that controls operations of communication unit 11, light emitter 12, and detector 13. Controller 15 is formed by a microprocessor, memory 15a, and a program stored in memory 15a, for example.

Controller 35 of mobile body diagnostic device 10G is formed by a microprocessor, memory 35a, and a program stored in memory 35a, for example. Memory 35a stores identification information on mobile body 80, such as a mobile body number. An operation log and a diagnosis result of mobile body 80 are also recorded in memory 35a.

When detector 13 detects mobile body 80 capable of autonomous driving, and controller 35 receives the detection information via network N, controller 35 issues a diagnosis command to diagnostic unit 36 to start diagnosis of mobile body 80.

Controller 35 may use detector 13 to determine whether mobile body 80 is moving, stopped, or waiting. Controller 35 may also use an acceleration sensor or the like provided in mobile body 80 to determine whether mobile body 80 is moving, stopped, or waiting.

Instead of using detector 13 to detect whether or not mobile body 80 is autonomously driving, controller 35 may establish a communication with mobile body 80, which is triggered by visible light communication from light emitter 12 to mobile body 80, and obtain information for determining whether or not mobile body 80 is autonomously driving.

Alternatively, instead of using detector 13 to detect whether or not mobile body 80 is autonomously driving, controller 35 may determine whether or not mobile body 80 is autonomously driving by requesting for information for determining whether or not mobile body 80 is autonomously driving from moving or waiting mobile body 80 by regularly transmitting a beacon signal from communication unit 11.

Diagnostic unit 36 is a circuit that diagnoses, via network N and communication unit 11, whether mobile body 80 is being hacked. When diagnostic unit 36 has received a diagnosis command from controller 35, for example, diagnostic unit 36 performs transmission and reception of data between diagnostic unit 36 and mobile body 80 via network N and communication unit 11 and performs diagnosis of the presence of hacking of mobile body based on the transmitted and received data. When diagnosing the presence of hacking of moving mobile body 80, diagnostic unit 36 may perform the diagnosis by sequentially changing from one lighting device LG to another lighting device LG of the plurality of lighting devices LG to communicate with mobile body 80.

There are three examples of the diagnosis of mobile body 80 by diagnostic unit 36, which are the same as those described above.

A first diagnosis example is an example in which diagnosis of mobile body 80 is performed based on an answer to a question asked to mobile body 80 by lighting device LG. Diagnostic unit 36 asks mobile body 80 a plurality of questions via lighting device LG, and determines whether mobile body 80 is being hacked based on at least one of the answering time or the answer tendency to the questions.

A second diagnosis example is an example in which diagnosis of mobile body 80 is performed by checking the resilience of software that runs a travel system provided in mobile body 80. Diagnostic unit 36 checks the resilience of the software in mobile body 80 via communication unit 11 of lighting device LG, and diagnoses that mobile body 80 is being hacked when the resilience level is lower than a predetermined level.

A third diagnosis example is an example in which an operation log (flight record) of mobile body 80 is obtained, and diagnosis of mobile body 80 is performed based on the operation log. Diagnostic unit 36 obtains the operation log of mobile body 80 via communication unit 11 of lighting device LG, and diagnoses that mobile body 80 has been hacked when mobile body 80 is not following a predetermined operational regulation.

When diagnostic unit 36 has diagnosed that mobile body 80 is being hacked, controller 35 notifies information terminal 70 that mobile body 80 is being hacked.

Information terminal 70 is a terminal, such as a smartphone, a tablet terminal, or a PC. Application software for browsing information on the diagnosis result of mobile body 80 is installed in information terminal 70. Information terminal 70 obtains information on the diagnosis result via network N, and displays the information on a screen.

The owner having obtained information on the diagnosis result from information terminal 70 can immediately take measures to cope with the hacked mobile body 80. In this way, damage due to the hacking of mobile body 80 can be reduced.

In another example of the notification of the diagnosis result, mobile body diagnostic system 1G may notify a computer communicatively connected to mobile body diagnostic system 1G via network N of the diagnosis result (see FIG. 37). For example, mobile body diagnostic system 1G may transmit the diagnosis result to a management server that is a computer owned by a dealer of mobile body 80.

Mobile body diagnostic system 1G may also notify of the diagnosis result by transmitting an e-mail to an e-mail address registered by the owner or dealer in advance. This allows the owner or dealer to take measures to cope with the hacked mobile body 80 and reduce damage due to the hacking of mobile body 80.

SUMMARY

As described above, vehicle diagnostic device 10 according to the foregoing embodiments includes: communication unit 11 that communicates with vehicle 50 which drives autonomously; and diagnostic unit 16 that performs, via communication unit 11, diagnosis as to whether vehicle 50 is being hacked. Diagnostic unit 16 performs the diagnosis by checking resilience of software which runs a travel system provided in vehicle 50.

Accordingly, it is possible to diagnose whether vehicle 50 is being hacked based on the resilience of the software. With this, it is possible to reduce damage due to the hacking of vehicle 50.

Furthermore, diagnostic unit 16 may diagnose that vehicle 50 is being hacked when a level of the resilience of the software is lower than a predetermined level.

Accordingly, it is possible to certainly diagnose whether vehicle 50 is being hacked. With this, it is possible to reduce damage due to the hacking of vehicle 50.

Furthermore, diagnostic unit 16 may check the resilience of the software by performing at least one of a DoS attack or a buffer overflow attack on the software.

Accordingly, it is possible to prevent a hacker from hacking vehicle 50. With this, it is possible to reduce damage due to the hacking of vehicle 50.

Furthermore, when the DoS attack causes the level of the resilience of the software to become lower than the predetermined level, diagnostic unit 16 may continue the DoS attack until the software ceases to function.

Accordingly, since the travel function of vehicle 50 can be deprived, it is possible to reduce damage due to the hacking of vehicle 50.

Furthermore, diagnostic unit 16 may check the resilience of the software by performing transmission of trap data to the software.

Accordingly, the hacker performing the hacking can be lured out. With this, it is possible to reduce damage due to the hacking of vehicle 50.

Furthermore, when a backdoor to the software is found through the transmission of the trap data, diagnostic unit 16 may diagnose that the level of the resilience of the software is lower than the predetermined level and that vehicle 50 is being hacked.

Accordingly, it is possible to diagnose the presence of hacking through the presence of a backdoor in the software. With this, it is possible to reduce damage due to the hacking of vehicle 50.

Furthermore, diagnostic unit 16 may further obtain an operation log of vehicle 50 via communication unit 11, and perform the diagnosis based on the operation log.

Accordingly, sufficient diagnosis can be performed using the operation log. With this, it is possible to reduce damage due to the hacking of vehicle 50.

Furthermore, diagnostic unit 16 may diagnose that vehicle 50 is being hacked when diagnostic unit 16 confirms, based on the operation log, that vehicle 50 is not following a predetermined operational regulation.

In this manner, sufficient diagnosis can be performed by confirming that an operational regulation is not being followed. With this, it is possible to reduce damage due to the hacking of vehicle 50.

Furthermore, diagnostic unit 16 may perform the diagnosis with at least one of a diagnosis time or a diagnosis amount which is different depending on whether vehicle 50 is parked, stopped, or traveling.

Accordingly, it is possible to perform an appropriate diagnosis that is suited to the state in which vehicle 50 is in, such as parked, stopped, traveling, etc. With this, damage due to the hacking of vehicle 50 can be reduced.

Furthermore, when vehicle 50 is determined to be parked, diagnostic unit 16 may perform the diagnosis with the at least one of the diagnosis time or the diagnosis amount set to a greater value than when vehicle 50 is traveling or stopped.

Accordingly, it is possible to perform a sufficient diagnosis on vehicle 50 which is parked. With this, it is possible to reduce damage due to the hacking of vehicle 50.

Furthermore, when vehicle 50 is determined to be stopped, diagnostic unit 16 may performs the diagnosis with the at least one of the diagnosis time or the diagnosis amount set to value which is greater than a value set when vehicle 50 is traveling and less than a value set when vehicle 50 is parked.

Accordingly, it is possible to perform an appropriate diagnosis on vehicle 50 which is stopped. With this, it is possible to reduce damage due to the hacking of vehicle 50.

Furthermore, when vehicle 50 is determined to be traveling, diagnostic unit 16 may perform the diagnosis with the at least one of the diagnosis time or the diagnosis amount set to a lesser value than when vehicle 50 is stopped or parked.

Accordingly, even when vehicle 50 is traveling, a matching appropriate diagnosis can be performed. With this, it is possible to reduce damage due to the hacking of vehicle 50.

Vehicle diagnostic system 1D according to the foregoing embodiments includes: the vehicle diagnostic device described above; and information terminal 70 that communicates with the vehicle diagnostic device.

Accordingly, information as to whether vehicle 50 is being hacked can be sent to information terminal 70. With this, a user which obtains the information can immediately take measures to cope with vehicle 50 that has been hacked. With this, it is possible to reduce damage due to the hacking of vehicle 50.

Vehicle diagnostic system 1E according to the foregoing embodiments includes: lighting device LE including communication unit 11 that communicates with vehicle 50 which drives autonomously, and light emitter 12 that emits illumination light onto at least one of vehicle 50, road 92 on which vehicle 50 travels, or parking space 91 in which vehicle 50 parks; and vehicle diagnostic device 10E that is communicatively connected to communication unit 11 and includes diagnostic unit 36 that performs, via communication unit 11, diagnosis as to whether vehicle 50 is being hacked. Diagnostic unit 36 performs the diagnosis by checking resilience of software which runs a travel system provided in vehicle 50.

Accordingly, even when vehicle 50 is traveling on road 92 or is parked in parking space 91, it is possible to perform diagnosis as to whether vehicle 50 is being hacked. With this, it is possible to reduce damage due to the hacking of vehicle 50.

Vehicle diagnostic system 1C according to the foregoing embodiments includes: lighting device LC that emits illumination light onto at least one of vehicle 50 which drives autonomously, road 92 on which vehicle 50 travels, or parking space 91 in which vehicle 50 parks; and vehicle diagnostic device 10C including communication unit 31 that communicates with lighting device LC and vehicle 50, and diagnostic unit 36 that performs, via communication unit 31, diagnosis as to whether vehicle 50 is being hacked. Diagnostic unit 36 performs the diagnosis by checking resilience of software which runs a travel system provided in vehicle 50.

Vehicle diagnostic system 1C can also appropriately perform diagnosis as to whether vehicle 50 is being hacked. With this, it is possible to reduce damage due to the hacking of vehicle 50.

Mobile body diagnostic device 10F according to the foregoing embodiments includes: communication unit 11 that communicates with mobile body 80 which drives autonomously; and diagnostic unit 16 that performs, via communication unit 11, diagnosis as to whether mobile body 80 is being hacked. Diagnostic unit 16 performs the diagnosis by checking resilience of software which runs a travel system provided in mobile body 80.

Since mobile body diagnostic device 10F can perform diagnosis as to whether mobile body 80 is being hacked, it is possible to reduce damage due to the hacking of mobile body 80.

Furthermore, mobile body 80 may be an unmanned aircraft.

Accordingly, since it is possible to diagnose whether the unmanned aircraft is being hacked, it is possible to reduce damage due to the hacking of the unmanned aircraft.

Furthermore, diagnostic unit 16 may perform the diagnosis based on an answer to a question asked to mobile body 80 via communication unit 11. Furthermore, diagnostic unit 16 may obtain an operation log of mobile body 80 via communication unit 11, and perform the diagnosis based on the operation log.

Furthermore, mobile body diagnostic system 1G according to the foregoing embodiment includes: lighting device LG which includes communication unit 11 that communicates with mobile body 80 which drives autonomously, and light emitter 12 that emits illumination light onto at least one of mobile body 80, travel path 97 in which mobile body 80 travels, or waiting area 96 at which mobile body 80 waits; and mobile body diagnostic device 10G that is communicatively connected to communication unit 11 and performs, via communication unit 11, diagnosis as to whether mobile body 80 is being hacked.

Accordingly, even when mobile body 80 is traveling along travel path 97, or waiting at waiting area 96, it is possible to perform diagnosis as to whether mobile body 80 is being hacked. With this, it is possible to reduce damage due to the hacking of mobile body 80.

Other Embodiments

Although Embodiments 1 to 8 of the present disclosure have been described above, the present disclosure is not limited to the vehicle diagnostic devices and the mobile body diagnostic devices described above.

Although diagnostic unit 16 or 36 diagnoses vehicle 50 or the like when the lighting state of light emitter 12 changes in Embodiments 1 to 8, the present disclosure is not limited to this. For example, diagnostic unit 16 or 36 may perform diagnosis when detector 13 detects vehicle 50 or the like, even if the lighting state of light emitter 12 has not changed.

When performing diagnosis of vehicle 50 or the like by asking a question that is uniquely answered shown in FIG. 3, diagnostic unit 16 or 36 according to Embodiments 1 to 8 may diagnose that vehicle 50 or the like is being hacked when the answer to the question contains a wrong answer, a misspelling, a wrong language, or the like.

Although vehicle diagnostic devices including diagnostic unit 16 that diagnoses whether vehicle 50 or the like is being hacked have been described in the above embodiments, the embodiments described above can be applied to other diagnoses of vehicle 50 or the like.

For example, the vehicle diagnostic device may include communication unit 11 that communicates with vehicle 50 that is autonomously driving, diagnostic unit 16 that diagnoses, via communication unit 11, whether vehicle 50 has been zombified, and light emitter 12 that can emit illumination light to at least one of vehicle 50, road 92 on which vehicle 50 travels, or parking space 91 in which vehicle 50 is parked. That "vehicle 50 is zombified" means at least one of a state of vehicle 50 being hacked or a state of vehicle 50 being infected with a computer virus. Whether vehicle 50 is infected with a computer virus can be diagnosed by detecting whether a computer program that makes vehicle 50 travel is normally operating.

The operations of the vehicle diagnostic devices and the mobile body diagnostic devices according to Embodiments 1 to 8 described above may be implemented by a program stored in memory 15a. That is, a program including a step of changing the lighting state of light emitter 12 that emits illumination light to vehicle 50, and a step of communicating with vehicle 50 using communication unit 11 to diagnose whether vehicle 50 is being hacked after the step described above may be stored in memory 15a, and the operations of vehicle diagnostic devices and the mobile body diagnostic devices may be implemented by the program stored in memory 15a.

Furthermore, each of the controllers according to above-described Embodiments 1 to Bis implemented typically as a large-scale integration (LSI), which is an integrated circuit (IC). They may take the form of individual chips, or some or all of them may be encapsulated into a single chip.

Moreover, the integrated circuit is not limited to an LSI, and may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

It should be noted that, in foregoing Embodiments 1 to 8, the respective structural components may be implemented as dedicated hardware or may be realized by executing a software program suited to such structural components. Alternatively, the respective structural components may be implemented by a program executor such as a CPU or a processor reading out and executing the software program recorded in a recording medium such as a hard disk or a semiconductor memory.

Furthermore, the numeric& figures used above are all given as examples to specifically describe the present disclosure, and thus the embodiments of the present disclosure are not limited by the numerical figures that have been given as examples.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Moreover, the functions of a plurality of functional blocks having similar functions may be processed by single hardware or software in a parallelized or time-divided manner.

Furthermore, the processing order of executing the respective steps shown in the flowcharts is a mere illustration for specifically describing the present disclosure, and thus may be an order other than the shown order. Moreover, one or more of the steps may be executed simultaneously (in parallel) with another step.

The present disclosure includes forms obtained by making various modifications to Embodiments 1 to 8 which can be conceived by those skilled in the art, as well as forms realized by arbitrarily combining structural components and functions in Embodiments 1 to 8 without departing from the essence of the present disclosure.

REFERENCE SIGNS LIST 1, 1A, 1B, 1C, 1D, 1E vehicle diagnostic system
1G mobile body diagnostic system
10, 10A, 10B, 10C, 10D, 10E vehicle diagnostic device
10F, 10G mobile body diagnostic device
11, 31, 32 communication unit
12 light-emitter
13 detector
16, 36 diagnostic unit
50 vehicle
70 information terminal
80 mobile body
91 parking space
92 road
96 waiting area
97 travel path
LC, LE, LG lighting device

The invention claimed is:

1. A vehicle diagnostic device comprising:
a communication unit that communicates with a vehicle which drives autonomously;
a light emitter that emits illumination light onto at least one of the vehicle, a road on which the vehicle travels, or a parking space in which the vehicle parks; and
a diagnostic unit that performs, via the communication unit, diagnosis of resilience of software which runs a travel system provided in the vehicle,
wherein the diagnostic unit performs the diagnosis of the resilience of the software by checking each of following states (1) to (5), respectively, as to whether the software is falls under any of the states:
(1) not resilient to a denial-of-service (DoS) attack;
(2) not resilient to simulated attacks of both the DoS attack and a buffer overflow attack;
(3) resilient to simulated attacks of both the DoS attack and the buffer overflow attack, but a backdoor is created to the software;
(4) resilient to simulated attacks of both the DoS attack and the buffer overflow attack, and no backdoor is created to the software; and
(5) resilient to simulated attacks of both the DoS attack and the buffer overflow attack, and to transmission of trap data.

2. The vehicle diagnostic device according to claim 1, wherein when the DoS attack causes a level of the resilience of the software to become lower than a predetermined level, the diagnostic unit further continues the DoS attack until the software ceases to function.

3. The vehicle diagnostic device according to claim 1, wherein the diagnostic unit further checks the resilience of the software by performing the transmission of the trap data to the software.

4. The vehicle diagnostic device according to claim 3, wherein when a backdoor to the software is found through the transmission of the trap data, the diagnostic unit diagnoses that the level of the resilience of the software is lower than the predetermined level.

5. The vehicle diagnostic device according to claim 1, wherein the diagnostic unit further obtains an operation log of the vehicle via the communication unit, and performs the diagnosis based on the operation log.

6. The vehicle diagnostic device according to claim 5, wherein the diagnostic unit diagnoses that the vehicle is being hacked when the diagnostic unit confirms, based on the operation log, that the vehicle is not following a predetermined operational regulation.

7. The vehicle diagnostic device according to claim 1, wherein:
the diagnostic unit performs the diagnosis with at least one of a diagnosis time or a diagnosis amount which is different depending on whether the vehicle is parked, stopped, or traveling,
the vehicle is parked refers to a state in which the vehicle is in a parking space,
the vehicle is stopped refers to a state in which the vehicle is stopped on a road, and
the vehicle is traveling refers to a state in which the vehicle is traveling on a road.

8. The vehicle diagnostic device according to claim 7, wherein when the vehicle is determined to be parked, the diagnostic unit performs the diagnosis with the at least one of the diagnosis time or the diagnosis amount set to a greater value than when the vehicle is traveling or stopped.

9. The vehicle diagnostic device according to claim 7, wherein when the vehicle is determined to be stopped, the diagnostic unit performs the diagnosis with the at least one of the diagnosis time or the diagnosis amount set to value which is greater than a value set when the vehicle is traveling and less than a value set when the vehicle is parked.

10. The vehicle diagnostic device according to claim 7, wherein when the vehicle is determined to be traveling, the diagnostic unit performs the diagnosis with the at least one of the diagnosis time or the diagnosis amount set to a lesser value than when the vehicle is stopped or parked.

11. The vehicle diagnostic device according to claim 1, further comprising:
an information terminal that communicates with the vehicle diagnostic device.

12. A vehicle diagnostic system comprising:
a lighting device including:
a communication unit that communicates with a vehicle which drives autonomously; and
a light emitter that emits illumination light onto at least one of the vehicle, a road on which the vehicle travels, or a parking space in which the vehicle parks; and
a vehicle diagnostic device that is communicatively connected to the communication unit and includes a diagnostic unit that performs, via the communication unit, diagnosis of resilience of software which runs a travel system provided in the vehicle,
wherein the diagnostic unit performs the diagnosis of the resilience of the software by checking each of following states (1) to (5), respectively, as to whether the software falls under any of the states:

(1) not resilient to a denial-of-service (DoS) attack;
(2) not resilient to simulated attacks of both the DoS attack and a buffer overflow attack;
(3) resilient to simulated attacks of both the DoS attack and the buffer overflow attack, but a backdoor is created to the software;
(4) resilient to simulated attacks of both the DoS attack and the buffer overflow attack, and no backdoor is created to the software; and
(5) resilient to simulated attacks of both the DoS attack and the buffer overflow attack, and to transmission of trap data.

13. A vehicle diagnostic system comprising:
a lighting device that emits illumination light onto at least one of a vehicle which drives autonomously, a road on which the vehicle travels, or a parking space in which the vehicle parks; and
a vehicle diagnostic device including:
a communication unit that communicates with the lighting device and the vehicle; and
a diagnostic unit that performs, via the communication unit, diagnosis of resilience of software which runs a travel system provided in the vehicle,
wherein the diagnostic unit performs the diagnosis of the resilience of the software by checking each of following states (1) to (5), respectively, as to whether the software falls under any of the states:
(1) not resilient to a denial-of-service (DoS) attack;
(2) not resilient to simulated attacks of both the DoS attack and a buffer overflow attack;
(3) resilient to simulated attacks of both the DoS attack and the buffer overflow attack, but a backdoor is created to the software;
(4) resilient to simulated attacks of both the DoS attack and the buffer overflow attack, and no backdoor is created to the software; and
(5) resilient to simulated attacks of both the DoS attack and the buffer overflow attack, and to transmission of trap data.

14. A mobile body diagnostic device comprising:
a communication unit that communicates with a mobile body which drives autonomously;
a light emitter that emits illumination light onto at least one of the mobile body, a road on which the mobile body travels, or a parking space in which the mobile body parks; and
a diagnostic unit that performs, via the communication unit, diagnosis of resilience of software which runs a travel system provided in the mobile body,
wherein the diagnostic unit performs the diagnosis of the resilience of the software by checking each of following states (1) to (5), respectively, as to whether the software falls under any of the states:
(1) not resilient to a denial-of-service (DoS) attack;
(2) not resilient to simulated attacks of both the DoS attack and a buffer overflow attack;
(3) resilient to simulated attacks of both the DoS attack and the buffer overflow attack, but a backdoor is created to the software;
(4) resilient to simulated attacks of both the DoS attack and the buffer overflow attack, and no backdoor is created to the software; and
(5) resilient to simulated attacks of both the DoS attack and the buffer overflow attack, and to transmission of trap data.

15. The mobile body diagnostic device according to claim 14, wherein the mobile body is an unmanned aircraft.

* * * * *